US006466654B1

United States Patent
Cooper et al.

(10) Patent No.: US 6,466,654 B1
(45) Date of Patent: Oct. 15, 2002

(54) PERSONAL VIRTUAL ASSISTANT WITH SEMANTIC TAGGING

(75) Inventors: Robert S. Cooper; Jeff F. McElroy; Walter Rolandi; Derek Sanders; Richard M. Ulmer, all of Columbia, SC (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/519,217

(22) Filed: Mar. 6, 2000

(51) Int. Cl.[7] .................................................. H04M 1/64
(52) U.S. Cl. ................................ 379/88.01; 379/88.16; 704/270.1; 704/275
(58) Field of Search ........................... 379/88.01–88.04, 379/88.13, 88.15, 88.17, 88.16; 704/231, 246, 251, 270, 270.1, 275

(56) References Cited

U.S. PATENT DOCUMENTS

| | | | |
|---|---|---|---|
| 4,488,005 A | | 12/1984 | Frantz |
| 5,276,731 A | | 1/1994 | Arbel et al. |
| 5,283,818 A | | 2/1994 | Klausner et al. |
| 5,469,491 A | | 11/1995 | Morley, Jr. et al. |
| 5,568,540 A | | 10/1996 | Greco et al. |
| 5,613,036 A | * | 3/1997 | Strong .......................... 704/243 |
| 5,632,002 A | * | 5/1997 | Hashimoto et al. .......... 704/231 |
| 5,642,519 A | * | 6/1997 | Martin ............................ 704/9 |
| 5,652,789 A | | 7/1997 | Miner et al. |
| 5,687,220 A | | 11/1997 | Finnigan |
| 5,797,124 A | | 8/1998 | Walsh et al. |
| 5,799,279 A | * | 8/1998 | Gould et al. .................. 704/275 |
| 5,819,220 A | * | 10/1998 | Sarukkai et al. .......... 704/270.1 |
| 5,832,221 A | | 11/1998 | Jones |
| 6,233,559 B1 | * | 5/2001 | Balakrishnan ............... 704/275 |

OTHER PUBLICATIONS

Raptis, S. et al., A Speech Agent for Remote E–mail Access, Sep. 1998, Interactive Voice Technology for Telecommunication Applications Proceedings, pp. 151–154, ISBN 0–7803–5028–6.*

* cited by examiner

*Primary Examiner*—Fan Tsang
*Assistant Examiner*—Roland G. Foster
(74) *Attorney, Agent, or Firm*—Brian K. Dinicola

(57) ABSTRACT

A computer based method for performing a command via a voice user interface on a subset of objects. The subset is selected from a set of objects, each having an object type. At least one taggable field is associated with the object type and has a corresponding value. The set of objects is stored in the computer memory. An utterance is received from the user and includes a command, an object type selection, a taggable field selection, and a value for the taggable field. Responsive to the utterance, at least one object is retrieved from the set of objects, the object of the type selected by the user and having a value in the taggable field selection that matches the taggable field value received from the user. The command is performed on the object. The object consists of text which is converted to voice output.

12 Claims, 32 Drawing Sheets

FIG. 7

VIRTUAL ASSISTANT REPORT

Report Run Date:  3/4/00 11:57:36 AM
For Dates-Times:  3/1/00 to 3/4/00 11:59:59 PM
For User:  cooper Number Of Sessions:  42

Average Time/Session:  330

Recognition Attempts:  523

Recognition Successes:  346

Recognition Errors:  177

Recognition Accuracy:  66.16%

Sessions List For User:  cooper

| | Session ID | Date - Time | Duration | User |
|---|---|---|---|---|
| Detail | cooper-4DA1A0AC-EF31-11d3-8568-00508B9B2503 | 3/1/00 1:28:36 AM | 0 Hr 2 Min 36 Sec | cooper |
| Detail | cooper-531B89FD-EF31-11d3-8568-00508B9B2503 | 3/1/00 8:00:03 AM | 0 Hr 4 Min 50 Sec | cooper |
| Detail | cooper-57E03D2C-EF31-11d3-8568-00508B9B2503 | 3/1/00 8:16:15 AM | 0 Hr 2 Min 31 Sec | cooper |
| Detail | cooper-57E03ED1-EF31-11d3-8568-00508B9B2503 | 3/1/00 8:28:16 AM | 0 Hr 5 Min 59 Sec | cooper |
| Detail | cooper-57E0466A-EF31-11d3-8568-00508B9B2503 | 3/1/00 10:01:54 AM | 0 Hr 0 Min 40 Sec | cooper |
| Detail | cooper-B5479257-EF96-11d3-8568-00508B9B2503 | 3/1/00 1:05:17 PM | 0 Hr 1 Min 12 Sec | cooper |
| Detail | cooper-D6CC40CA-EF96-11d3-8568-00508B9B2503 | 3/1/00 1:39:34 PM | 0 Hr 2 Min 26 Sec | cooper |
| Detail | cooper-DB06AEFF-EF96-11d3-8568-00508B9B2503 | 3/1/00 1:43:46 PM | 0 Hr 16 Min 41 Sec | cooper |
| Detail | cooper-D6CC4307-EF96-11d3-8568-00508B9B2503 | 3/1/00 2:01:23 PM | 0 Hr 23 Min 39 Sec | cooper |
| Detail | cooper-D6CC4566-EF96-11d3-8568-00508B9B2503 | 3/1/00 2:42:04 PM | 0 Hr 0 Min 11 Sec | cooper |
| Detail | cooper-DF4D0984-EF96-11d3-8568-00508B9B2503 | 3/1/00 3:10:08 PM | 0 Hr 2 Min 18 Sec | cooper |

PERSONAL VIRTUAL ASSISTANT WITH SEMANTIC TAGGING

This application is related to application Ser. No. 09/519,075, entitled Personal Virtual Assistant, Ser. No. 09/519,234, entitled Virtual Assistant Engine, and Ser. No. 09/519,486, entitled Virtual Assistant with Temporal Selectivity, which are filed simultaneously herewith, assigned to a common assignee, and are hereby incorporated by reference.

FIELD OF THE INVENTION

The present invention relates to a computer application with a voice user interface, such as a virtual assistant, that allows a user to semantically tag a set of objects so that the user can easily navigate and selectively retrieve objects from the set.

BACKGROUND OF THE INVENTION

Mobile professionals, such as physicians, attorneys, sales representatives and other highly mobile professionals often find it difficult to communicate with clients, customers, colleagues and assistants. These mobile professionals travel frequently and are not accessible via a desk phone or traditional, wired computer network. They typically employ human assistants to relay important information, maintain their schedules and filter out all unnecessary interruptions. A virtual assistant is a computer application that allows the mobile professional to access personal, company, and public information, including contacts, schedules, and databases from any interactive device, such as telephone.

One important function provided by a virtual assistant, which is also used ubiquitously by busy professionals who do not have a virtual assistant, is voice mail. Conventional voicemail systems, as well as virtual assistants with voice-mail functionality, however, have disadvantages that limit their usefulness. For example, a professional, such as a physician or an attorney, is a person that many people attempt to contact throughout the day. Such persons, however, cannot for various reasons be reached directly by telephone. Thus, many such professionals have voicemail. If the professional is not able to regularly access his or her voicemail, at the end of the day, or whenever the voicemail is accessed, the number of voicemail messages may be so large so as to be virtually unmanageable because the only option is to listen to the messages one at time in sequential fashion. This can cause the voicemail user to simply abandon use of the voicemail system because the user does not have time to listen to a large number of messages one at a time. This makes it even more difficult for persons attempting to contact the busy professional, the only remaining options being to contact the professional in person, which is impractical, sending a page, sending an email or other know contact methods. If the volume of pages or emails becomes so great, the cycle is repeated.

Navigating large databases of non-messaging information, such as a contacts database is also quite cumbersome and difficult with conventional voicemail systems and virtual assistants, particularly, when the database is large and the user is attempting to access the database with a voice user interface.

U.S. Pat. No. 4,488,005 to Frantz discloses a telephone answering system that provide some limited ability for the selective retrieval of messaging information, but Frantz system has several disadvantages. One disadvantage of Frantz is that the user of the answer system is required to manually input the word or words that are to be used later for selective retrieval of the messages. Moreover, the system disclosed in Frantz is limited to retrieval of recorded voice messages. It does not permit selective retrieval of non-messaging information, such as information in a contacts database or any other electronically accessible database.

U.S. Pat. No. 5,558,540 to Greco, et al. discloses a graphical user interface for the display of voice mail messages and playing voice mail messages through a computer speaker. Using a mouse, the messages can be manipulated individually or in groups. The user can listen to the messages in any order at any time. A disadvantage of the system disclosed in Greco et al. is that the user is required to have a personal computer to manipulate the message information.

U.S. Pat. No. 5,469,491 to Morley, Jr., et al. discloses a telephone answering system that allows selective retrieval of the messages by dialing an operator DTMF tone to have the recorded textual messages read by the operator and/or activating the playback of the recorded voice messages by inputting appropriate DTMF tones. A disadvantage of the system disclosed in Morley, Jr., et al. is that the user is required to memorize or have access to the proper DTMF tones to selectively retrieve messages.

SUMMARY OF INVENTION

A solution to the above-described problem without the disadvantages of the prior art is offered by the present invention, which relates to a virtual assistant system with many discrete features, each of which comprises a separate but related invention. Thus, the present invention is a virtual assistant application with a voice user interface that employs the concept of semantically tagging electronic information, such as voicemail messages, email messages, contacts, or any other type of electronically accessible information. Messages, for example, can be tagged with information that the user would find helpful in navigating a large set of messages. The field to be tagged might be status, that is, whether the message is urgent. Voicemail messages also can be tagged based on the sender of the message, which could be determined either by automatic caller identification or by the sender stating his or her name, the delivery date of the message, or the status of the message, that is, whether it has been read. When messages are marked with this semantic information a virtual assistant is able to make use of these tags and present the user with a more organized method of accessing his or her messages.

Another aspect of the present invention is a computer based method for performing a first command via a voice user interface on information stored in a computer memory, wherein the information upon which the first command is to be performed is comprised of a subset of objects specified by the user, the subset being selected from a set of objects, wherein each object in the set of objects has an object type, at least one taggable field associated with the object type, and a corresponding value for the at least one taggable field. The method is comprised of the steps of storing the set of objects in the computer memory, receiving from the user via the voice user interface an utterance, the utterance being comprised of a first command, an object type selection, a taggable field selection, and a value for the selected taggable field, responsive to the utterance, retrieving a subset of objects from the set of objects, the subset containing at least one object, the at least one object being of the object type selected by the user, having a value in the taggable field selection that matches the taggable field value received from the user, performing the first command on the retrieved subset of objects performed on an active object in the subset of objects, the at least one active object being the object upon which the first command was performed, receiving a second command from the user, the second command to be performed on an active object in the subset of objects, the object being the object upon which the first command was performed, and performing the second command on the active object.

The object type is a voicemail message, email message, meeting request, task request or fax. The taggable field for the voicemail message type is caller's name, callback number, delivery date, subject or status. The taggable field for the email message type is sender, delivery date, subject or status. The taggable field for the meeting request message type is sender, delivery date, subject, location, start time, end time or status. The taggable field for the task request message type is sender, delivery date, subject, due date, owner, status or percentage complete. The taggable field for the fax message type is selected from the group consisting of telephone number of the machine that sent the fax, sender, delivery date, subject and status. The taggable field value for the status field is first, last, new, old, read, unread, deleted or urgent.

The first command is count, browse, list or read. The second command is next, previous, first, last, read, get more detail, file, delete or restore.

The object type also can be a contact, wherein the taggable field is first name, last name or nickname.

Other features and advantages will become apparent based on the following detailed description of the preferred embodiments and the claims.

BRIEF DESCRIPTION OF THE DRAWINGS

FIG. 7 is a screen shot of a web page that uses Active Server Pages to manage the VA Server Manager;

DESCRIPTION OF THE PREFERRED EMBODIMENTS

The subheadings used herein are meant only so as to aid the reader and are not meant to be limiting or controlling upon the invention. Generally, the contents of each subheading are readily utilized in the other subheadings.

Overview

Mobile professionals, such as physicians, attorneys, sales representatives and other highly mobile professionals often find it difficult to communicate with clients, customers, colleagues and assistants. These mobile professionals travel frequently and are not accessible via a desk telephone or traditional, wired computer network. They typically employ human assistants to relay important information, maintain their schedules and filter out all unnecessary interruptions. The virtual assistant of the present invention allows the mobile professional to access personal, company, and public information, including contacts, schedules, and databases from any interactive device, such as telephone.

The virtual assistant ("VA") system of the present invention is comprised of two main components: (1) the VA Server, which is built on a Windows NT telephony server platform, and (2) the VA Studio, which allows skilled information technology professionals to develop VA applications that interface with electronic messaging systems, such as Microsoft Exchange and Lotus Notes. The VA Server is a component of the Service Deployment Environment ("SDE"), which is discussed in more detail below. The VA Studio is a component of the Service Creation Environment ("SCE"), which is also discussed in more detail below.

Figure 1:
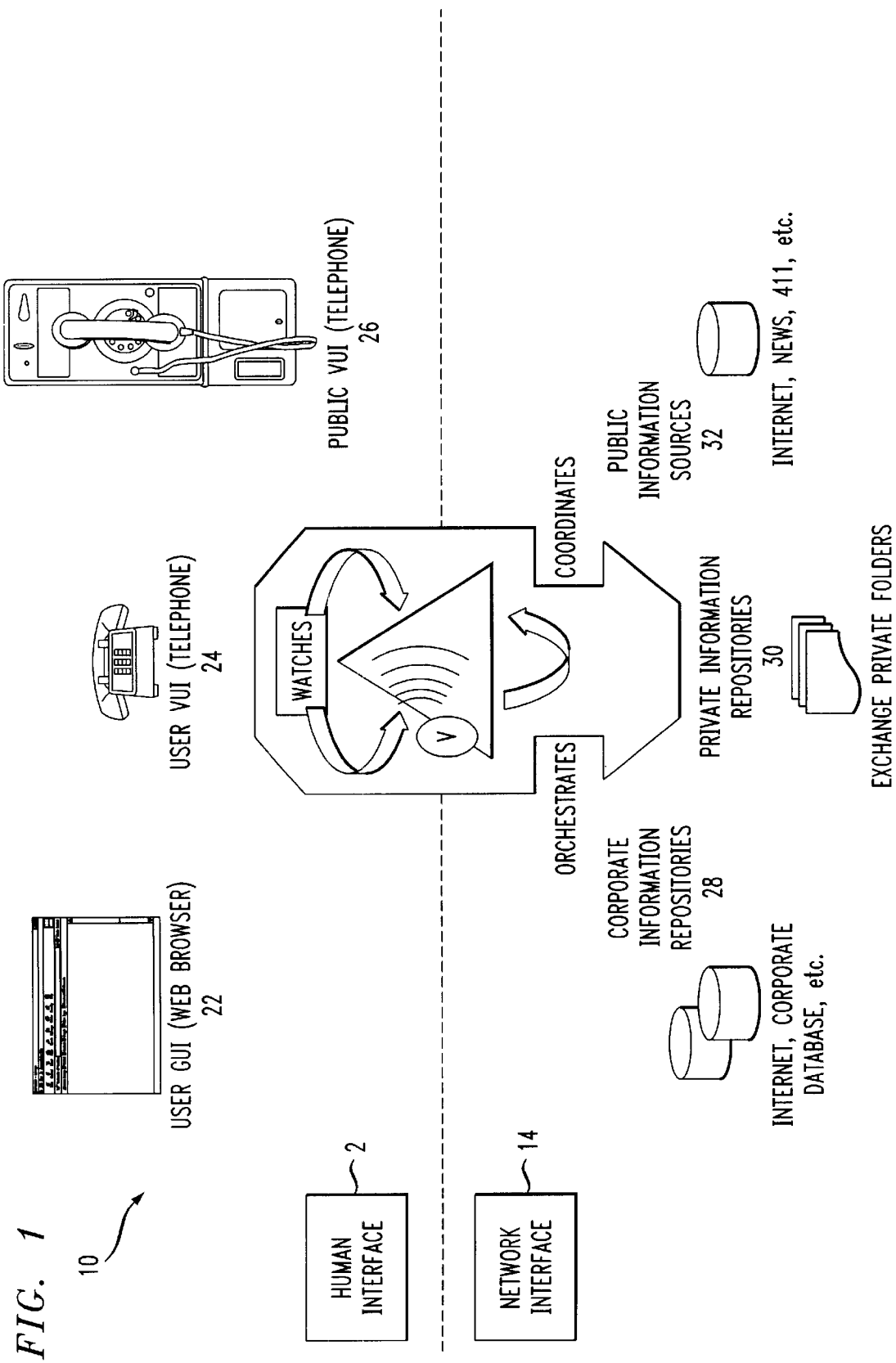
FIG. 1 is an overview of the virtual assistant (VA) of the present invention.

As shown in FIG. 1, the VA Server 10 is comprised of a human interface 12 and a network interface 14 for handling calls and providing automated access to information to corporate 28, private 30 and pubic 32 information repositories and sources. The human interface 12 is comprised of a graphical user interface 22, which may be a web browser, a subscriber (or user) voice user interface 24, generally accessed by a telephone, and a public voice user interface 26. The virtual assistant allows a user to use a voice interactive device, such as a telephone, either wired or wireless, to access and update such information. The VA Server also manages all incoming communications by sorting, prioritizing, and filtering such communications, while providing notice to the user of important messages and events.

VA Server

Figure 2:
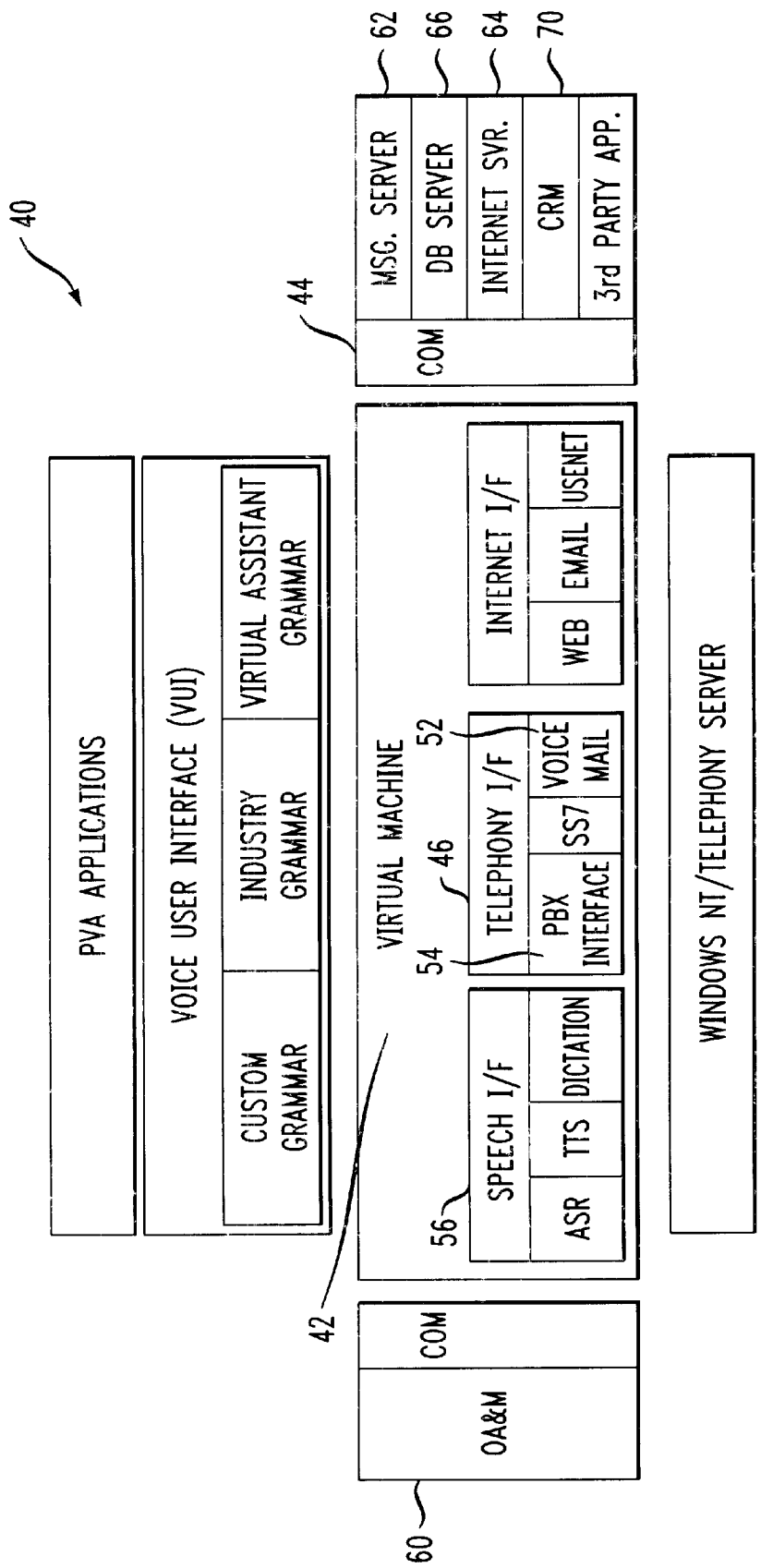
FIG. 2 is a diagram of the VA Server.

As seen in FIG. 2, a core component of the VA Server 40 is the voice-enabled Virtual Machine 42, which is also referred to as the VA Engine. The VA Engine receives spoken commands, interprets and executes them. The VA Engine supports a COM interface 44, which in turn enables VA applications to provide voice access to network applications.

The VA Engine also supports a telephony interface 46 to voice messaging 52 and private branch exchange systems 54, enabling third-party systems to be integrated with the VA Server.

The VA Server conforms to Windows NT telephony and speech interface specifications. The voice messaging interface 56 supports the VPIM (Voice Profile for Internet Mail) standard, and provides a gateway between proprietary voice messaging systems and VA Server.

The VA system management services provide operations, administration and maintenance capability (OA&M) 60. The OA&M applications also provide a Simple Network Management Protocol ("SNMP") interface to third party management applications, such as HP Openview and CA Unicenter.

In the preferred embodiment, the VA Server is operable on Windows NT Server, release 4.0 or higher, in both single and multiprocessor configurations. Those skilled in the art, however, recognize that the VA Server can be ported to other computing platforms. Multiple systems may be clustered together to support higher system workloads and fail-safe operation.

VA Application

The VA Application, in the preferred embodiment, is compatible with a messaging server 62, such as Microsoft Exchange/Outlook. The VA's architecture, however, advantageously permits integration with other commercially available and customized messaging applications. The VA Application can be easily modified to satisfy specific requirements of a user. The basic functions of the VA Application include:

Messaging—voice-mail, e-mail, and faxes

Contact Management—scheduling, planning, group calendar, contact and referral organization Call Control—remote users to perform conference calling and call management; notification and forwarding features allow remote users to be contacted immediately by phone/pager when they receive specific voice-mails, e-mails, faxes, or pages Internet Applications—users can access and internet via an internet server 64 and obtain public information such as weather, travel, financial, competitive data and news Intranet Applications—users can remotely access information contained on a corporate network (inside the company firewall) using the VA, for example, customer data, shipping and inventory information, sales reports, and financial data, or any information on a database server 66, including SQL databases such as Oracle or Informix.

Customer Relationship Management applications—the VA Server integrates with commercially available customer relationship management (CRM) software applications 70, such as Siebel, Pivotal, Sales Logix and Onyx.

VA Studio

Figure 3:
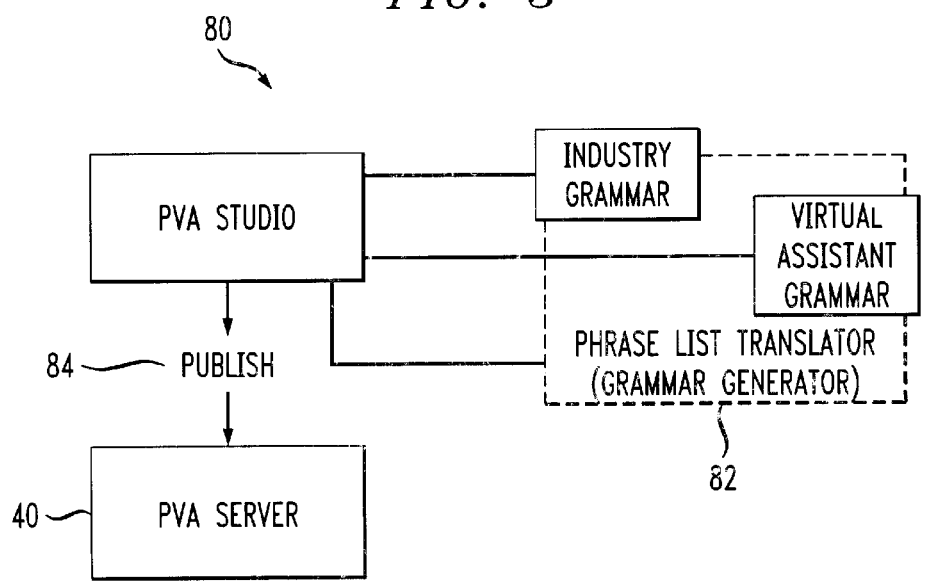
FIG. 3 is a diagram of the VA Studio.

As seen in FIG. 3, the VA Studio 80 is comprised of a grammar generator 82 and a publishing toolkit 84. The VA Studio allows a user to create, modify and debug applications that run on the VA Server 40 without requiring the user to be skilled in the complexities of the underlying components of the VA Server, such as the speech recognition engine, text to speech engine, switch control and unified messaging.

VA Studio employs a graphical user interface (GUI) application that runs on a Windows NT workstation. It allows developers to create projects, each of which defines a VA application. VA Studio is a multiple document interface (MDI) application that follows the workspace-based model.

The VA Studio follows the Microsoft Component Object Model (COM). VA applications are developed using Active Scripting languages such as VBScript and JScript, thus enabling integration with a variety of third party components. The VA applications created with the VA studio will include voice query to SQL databases, message stores, business logic and mainframe applications.

VA applications are composed of discourses and resources. Discourses are the context of conversations between a user and the VA. Resources are items like voice prompts and dictionaries. A developer can utilize the VA Studio Wizard to generate a "skeleton" VA application template. Application templates consist of packages of pre-defined discourses and resources. Discourses are the context of conversations between a user and the VA. Resources are items like voice prompts and dictionaries. Once a VA application template is generated, the application is further customized using any supported Active Scripting languages.

After writing the VA application, it is then submitted to the build process. During the build process, VA Studio checks for dialog errors, builds a master intermediate grammar and builds a master lexicon. Once compiled and error-free the application is ready to be published.

When an application is published, it is transported from the VA Studio to the VA Server. The VA Server allows a scripted application to access services such as voice mail, databases, and telephony equipment.

A VA application is created, modified, debugged and tested using the VA Studio. The completed application is then automatically installed and configured to run on the VA Server, which enables the VA application to take incoming calls and provide access to both public and private information.

Platform Overview

An Introduction to Virtual Assistant Applications

A VA application allows a user to manage electronic communications and access his or her business's computer resources through a telephone. Using speech recognition and text-to-speech technology, the VA communicates with callers in spoken English. By calling into the VA on a standard telephone, a user can perform functions such as the following:

Sending and receiving voice mail messages

Checking, replying to, and forwarding email messages

Looking up phone numbers and addresses in an electronic address book

Accessing information in a company database

Accessing information on the World Wide Web

In addition, the VA can perform many of the functions of a personal secretary, such as the following:

- Informing the user via pager when new voice and email messages arrive
- Filtering incoming voice mail, email, and pages as instructed by the user
- Automatically dialing phone numbers In the preferred embodiment, the VA performs the above functions by interfacing with a company's Microsoft Exchange server. This application, in effect, allows users to use their desktop Outlook software over the telephone.

The VA software includes a development platform (the SCE) and run-time platform (the SDE), which can host a variety of different VA's. The SDE provides the core components necessary for the functionality of a VA: a telephony interface, speech recognition facilities, a text-to-speech engine, interfaces with databases and mail servers, and an administrative framework in which the assistant applications will run. The SCE also includes development tools that programmers can use to create custom VA applications.

VA Platform Components

As discussed above, the VA Platform consists of three main components:

- The Service Deployment Environment (SDE)
- Virtual Assistant Applications
- The Service Creation Environment (SCE)

The function of each of these components can be understood using a World Wide Web analogy. The SDE functions like a web server, providing connections with the network and telephone system, controlling the execution of VA applications, and providing resources such as text-to-speech and voice recognition engines that will be accessed by the applications that run on it.

The VA applications are analogous to web pages, determining the content that will be presented and controlling the interactions with the user. A VA application uses scripting languages such as VBScript, JavaScript, and Perl, so that developers can add significant functionality to a VA, such as performing mathematical calculations, processing text, and calling ActiveX and COM objects.

Just as Microsoft Front Page and Netscape Composer are used to create web pages, the SCE is the development environment used to create the VA applications. The main component of the SCE is the VA Studio application, which is based on the Microsoft Visual Studio paradigm and provides a graphical environment with a variety of tools that can be used to create, debug, and publish applications that are run on the SDE. The SCE also includes a set of COM objects that can be used in applications to perform functions such as checking email, reading from a database, and manipulating sound files.

The SDE Service Processes

The Service Deployment Environment consists of eight processes that run simultaneously and perform the functions necessary to support a VA application. In the preferred embodiment, each of these SDE components runs as a Windows NT Service or background process.

Although they may all run on the same hardware platform, for large VA implementations the components can be distributed across several servers and communicate over the network. Such distribution can allow, for example, one server to be dedicated to performing voice recognition functions while another supports the VA Engine that actually runs the applications. When multiple VA components are distributed across multiple machines, these machines are collectively termed a VA server set.

The VA Engine

Figure 4:
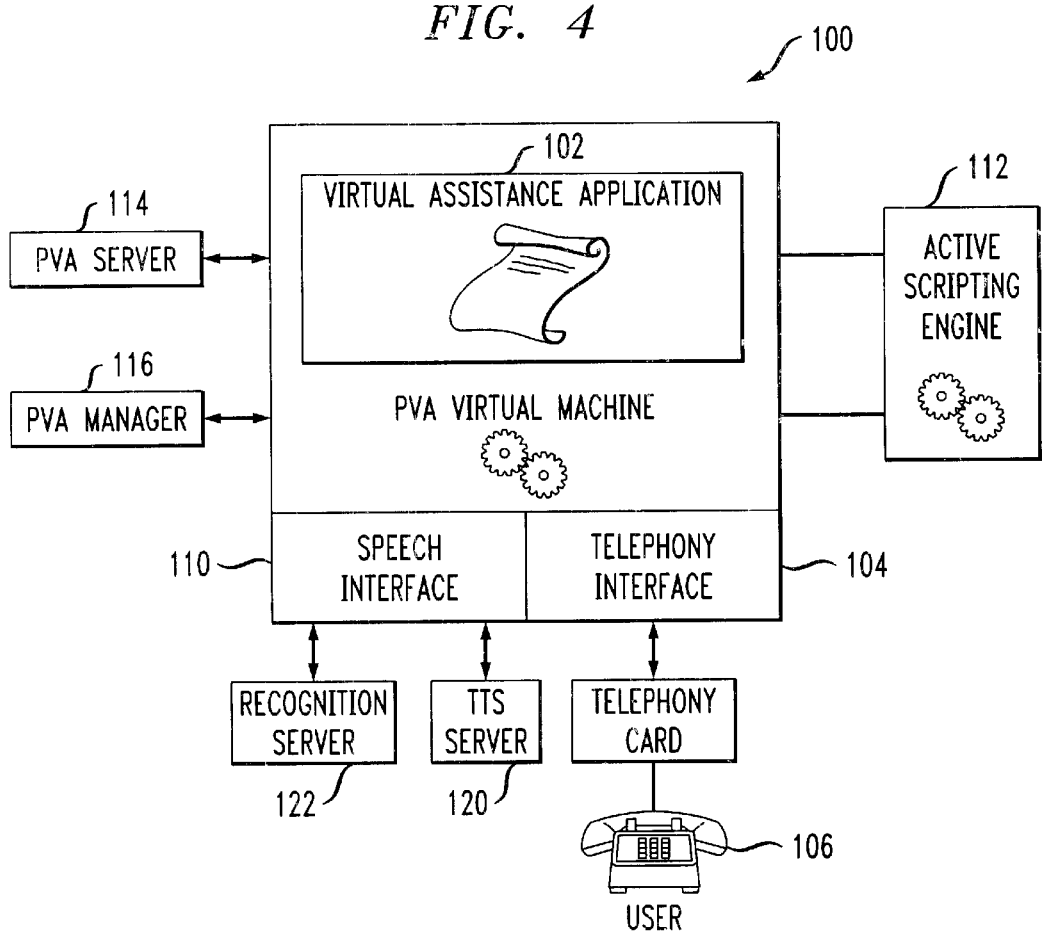
FIG. 4 is a diagram of the VA Engine conceptual model.

As illustrated in FIG. 4, the VA Engine 100 is the virtual machine on which a VA application 102 runs. Based on the application's instructions, the VA Engine uses its telephony interface 104 to communicate with the user 106 and its speech interface 110 to recognize speech into text and translate text into speech. The VA Engine connects to an Active Scripting Engine 112 to execute the scripts contained in the VA application, and it also communicates with administrative processes such as the VA Server 114 and VA Manager 116.

In the preferred embodiment, the user is electronically coupled to the virtual assistant application via a public switched telephone network. As can be appreciated by one skilled in the art, the communications network that electronically couples the user interface to the computer on which a virtual assistant application is running could be a packet switched telephone network. Also, the communications network could be a wireless communications network.

A VA Engine process can support user interaction over only one telephone line, but multiple VA Engines can be run simultaneously on a single platform. If the VA platform is connected to more than one telephone line, then a separate VA Engine will be running for each incoming line.

The Text-to-Speech (TTS) Server

The Text-to-Speech Server 120 receives text from other components, translates it into speech (that is, into a sound file), and returns it to the requesting component. This speech translation service is isolated in a separate component to improve performance and to allow for TTS vendor-indepdence. The preferred embodiment uses the AcuVoice TTS system, but the platform can be easily modified to support a TTS engine from a different vendor. Only the TTS Server component would have to be modified for such a customization, not the entire platform.

Multiple VA Engines can use the same TTS Server process, and more than one TTS Server can be running at the same site, allowing translation services to be distributed across multiple machines for load-balancing.

The Recognition Server

The Recognition Server 122 receives sound files from other components, attempts to recognize them as speech, and returns the recognized text. Like the TTS server, the Recognition Server is a component that isolates speech-recognition functions from the rest of the VA platform. The server provides an interface to a third-party voice recognition engine (in the preferred embodiment, Nuance) that can be changed to a different vendor's brand without requiring the entire VA platform to be modified.

Multiple VA Engines can use the same Recognition Server process, and more than one Recognition Server can be running simultaneously.

Recognition Server Sub-Processes

The Recognition Server process requires three additional processes to be running:

The Resource Manager: The Resource Manager is a management process that automatically load-balances requests when more than one instance of the Recognition Server is running. Rather than making recognition requests to a particular Recognition Server, the VA Engine makes the request to the Resource Manager, which forwards it to the first available Recognition Server.

The Compilation Server: The Compilation Server compiles dynamic grammars.

The License Manager: The License Manager server runs continually in the background and dispenses licenses to all requesting components. Only one license manager need run in a single server set, but no Recognition Server components can launch unless the license manager is already running.

In the preferred embodiment, all of the sub-processes of the Recognition Server are recommended only for Nuance brand Recognition Servers. If a user uses different speech recognition software, a different set of processes may be needed.

The VA Server

The VA Server 114 performs persistent VA functions that should occur even when no user is connected to a VA application. These functions include the following:

Monitoring external sources such as email boxes, databases, and web sites for events (e.g. a new mail message arrives or a database field is updated)

Applying rules and filters to external source events to determine whether the VA system should take any actions Paging users when specified events occur Only one VA Server can run on a system, but a single VA Server can provide persistent services to multiple VA Engines running both locally and on remote systems.

The VA Manager

Figure 5:
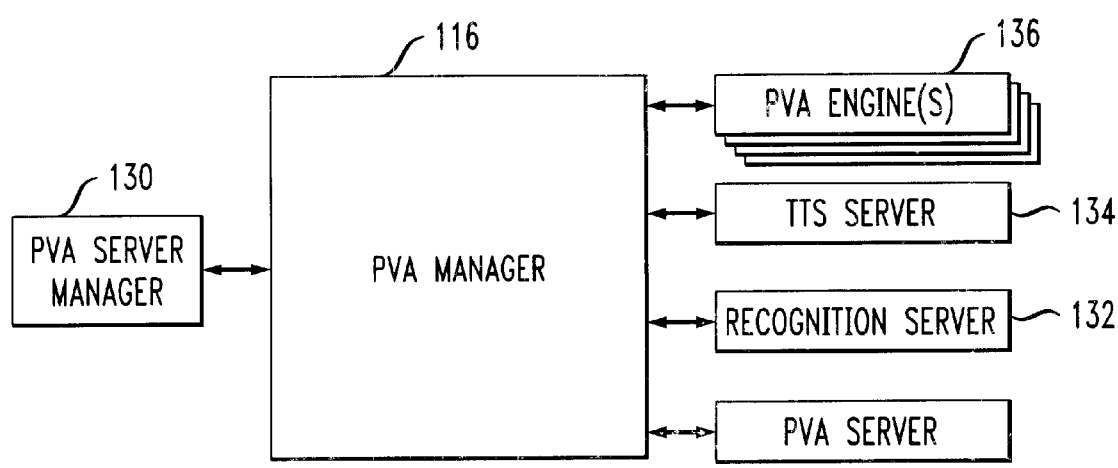
FIG. 5 is a diagram of the VA Manager conceptual model.

As illustrated in FIG. 5, each system that is running one or more VA components should also be running the VA Manager application 116. This application creates and monitors all VA components that are active on the system, and it provides management interfaces that are used for the following purposes:

Configuration (both at start-up and during run-time)

Signaling of events such as errors and informational messages

Logging of events

Logging of each call received by the VA applications running on the system

Performance monitoring (through an interface to Window NT's Perfmon utility)

The VA Manager provides the interface through which the VA Server Manager 130 communicates with all systems in use at the site.

The VA Server Manager

The VA Server Manager 130 provides a single point of control for all of the processes and servers being used in a VA server set. It communicates with the VA Manager 116 running on each VA server in the set and, through this interface, allows an administrator to use a single system to manage the entire site.

Figure 6:
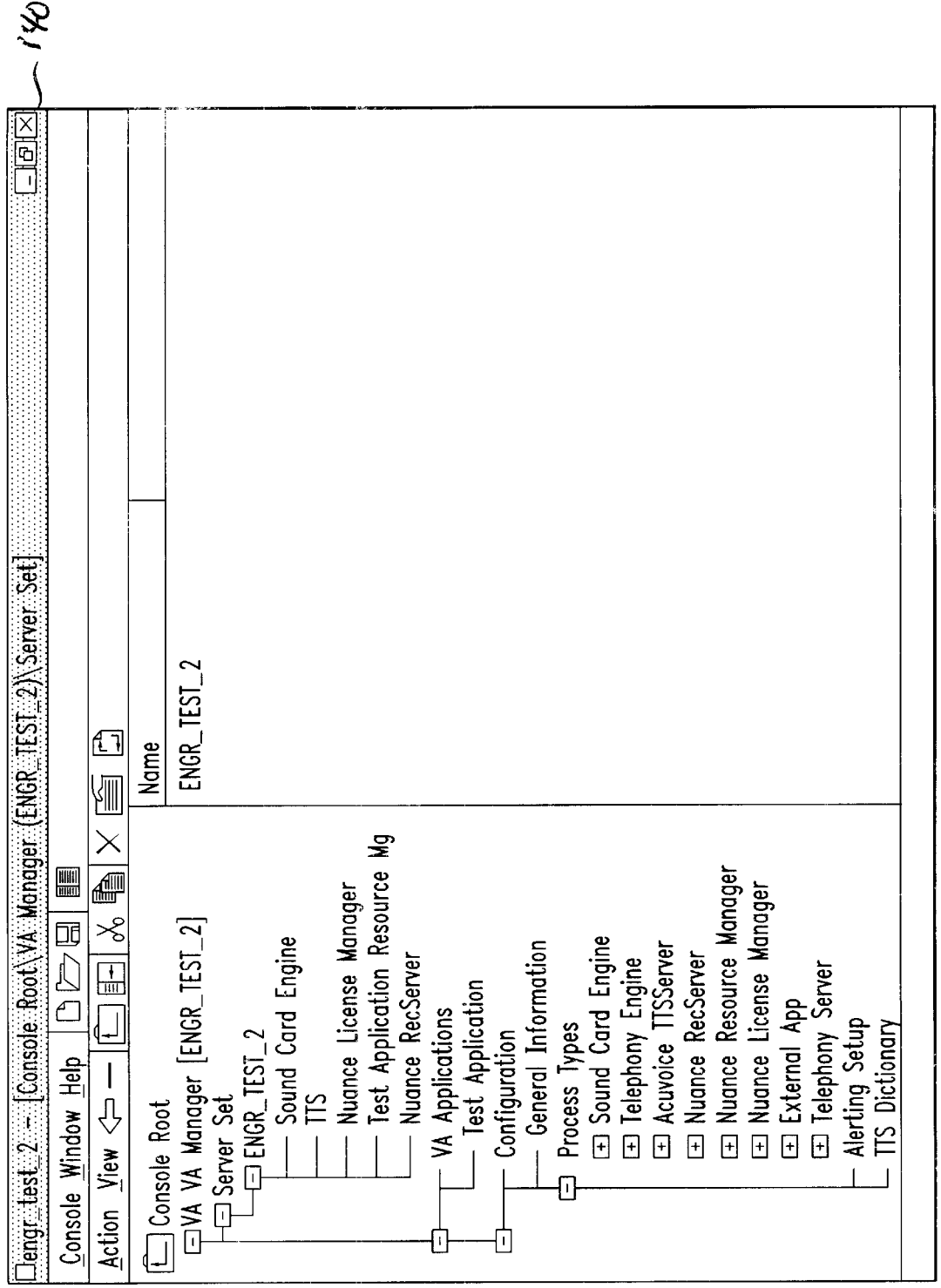
FIG. 6 is a screen shot of the Microsoft Management Console for managing the VA Server Manger.

There are two ways an administrator can connect with the VA Server Manager application:

Using the Microsoft Management Console (MMC): As illustrated in FIG. 6, the VA software includes an MMC snap-in component 140 that allows the VA Server Manager services (and, thereby, the entire VA site) to be managed from the Microsoft Management Console application.

Using an Administrative Web Page: The VA software also includes an administrative web page 142 that uses Active Server Pages to interface with the VA Server Manager service, allowing an administrator to manage the site through a standard web browser.

Returning to FIG. 5, the VA Server Manager 130 monitors all of the VA components (such as Recognition Servers 132, TTS Servers 134, and VA Engines 136) running on all the systems within the server set, and it can be configured to page the system administrator with an alert if components fail or other system-critical events occur.

Additional VA Platform Components

In addition to the service processes, the following components are used on the VA platform.

The VA Database

The VA Server Manager process uses a Microsoft MSDE database to store configuration parameters and platform logs. The MSDE database engine is installed automatically as part of the VA platform install, and the recommended tables and initial data are created during the installation routine.

The VA Server Manager uses a COM object called DBManager to communicate with the database. This object is created automatically at start-up by the VA Server Manager and provides a set of application programming interfaces (API's) that other VA components can use to retrieve configuration information and log data. In addition, the DBManager object automatically handles version checking, database restoration, and other database management functions.

The VA Web Server

In the preferred embodiment, as illustrated in FIG. 7, the VA platform uses a Microsoft IIS Web Server to support browser-based administrative utilities. These utilities include the following a VA Logging Tool, which is used by the administrator to view and manage system logs.

VA Shared Directories

The VA software uses a set of shared directories for storing files necessary for platform operations. In a multi-server implementation, these shares are stored on a central server (the same server that hosts the VA Server Manager process) and can be accessed by all the systems in the server set. The shared directories used by the VA platform are described in the table below.

TABLE 1-1

VA Platform Shared Directories

| Directory | Description |
| --- | --- |
| %conitava%\VAApplications | Used to store the source files for the applications that will run on the platform |
| %conitava%\VALogs | Used to store application logs |
| %conitava%\VAUsers | Used to store information about VA users |
| %conitava%\VAUtterances | Used to store temporary sound files containing the commands spoken by VA users |

%conitava% represents the base path under which the VA platform software was installed. By default, this path is c:\Program Files\Conita Virtual Assistant.

VA Platform Configurations

The service processes that make up the VA platform either can be run on a single server (a VA platform server) or can be distributed across multiple servers (a VA platform server set). A single-server implementation is adequate for small companies that need to support only a few incoming VA calls at a time. For larger companies, however, a server set implementation will be necessary for load balancing.

Figure 8:
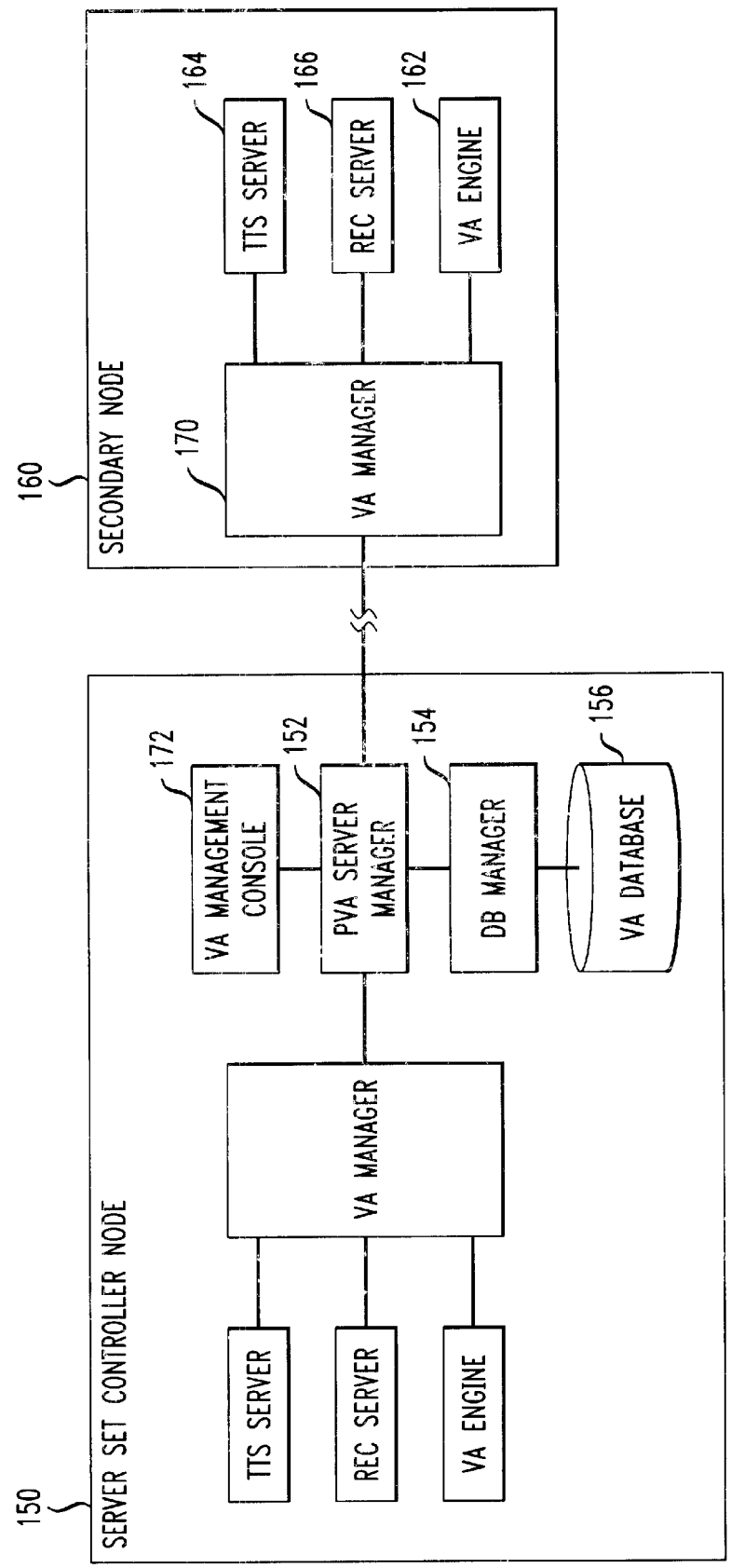
FIG. 8 is a diagram of the component relationships of a VA Server Set.

As illustrated in FIG. 8, when the VA platform is distributed across multiple servers, one node in the server set is designated the Server Set Controller Node 150. As the platform's primary server, the Server Set Controller Node will host the following components:

The VA Server Manager service 152

The VA DBManager service 154 and the VA database 156

The IIS web-server

Shared directories that will be used by all the servers in the server set to store logs, utterance files, application files, and user information Each secondary node 160 in the set will host one or more instances of VA Engines 162, TTS Servers 164, and/or Recognition Servers 166. These processes will be monitored by a VA Manager process 170 on each server, which will in turn communicate with the VA Server Manager 172 on the Server Set Controller Node 150. In single-server implementations, the lone server is configured as the controller node, hosting the database, web-server, and VA Server Manager process along with all other VA services.

Scaling a VA Implementation

Figure 9:
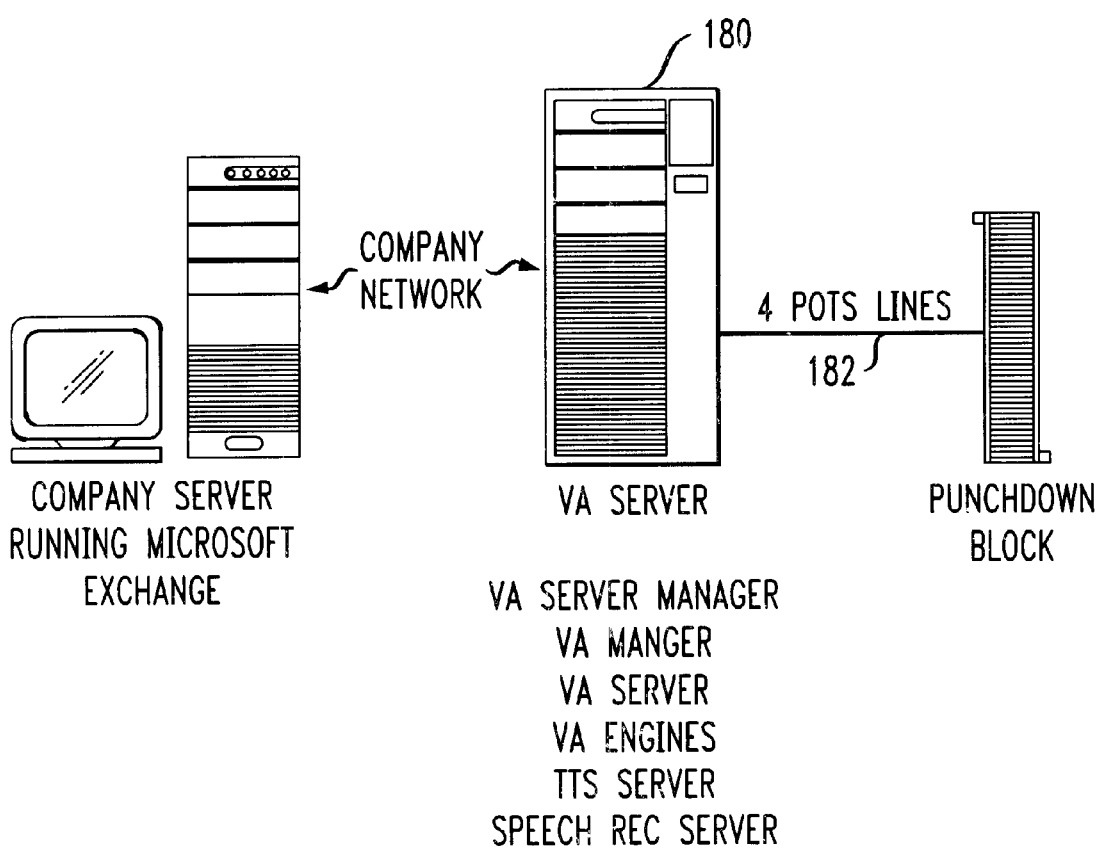
FIG. 9 is a diagram of a relatively small VA system.

The way a business configures its VA platform will depend on the number of users who will be interacting with the VA application. As illustrated in FIG. 9, for smaller sites, all the VA components can be run on a single server 180. Such a site could support several incoming telephone lines 182, allowing up to multiple instances of the VA application to be running simultaneously.

Figure 10:
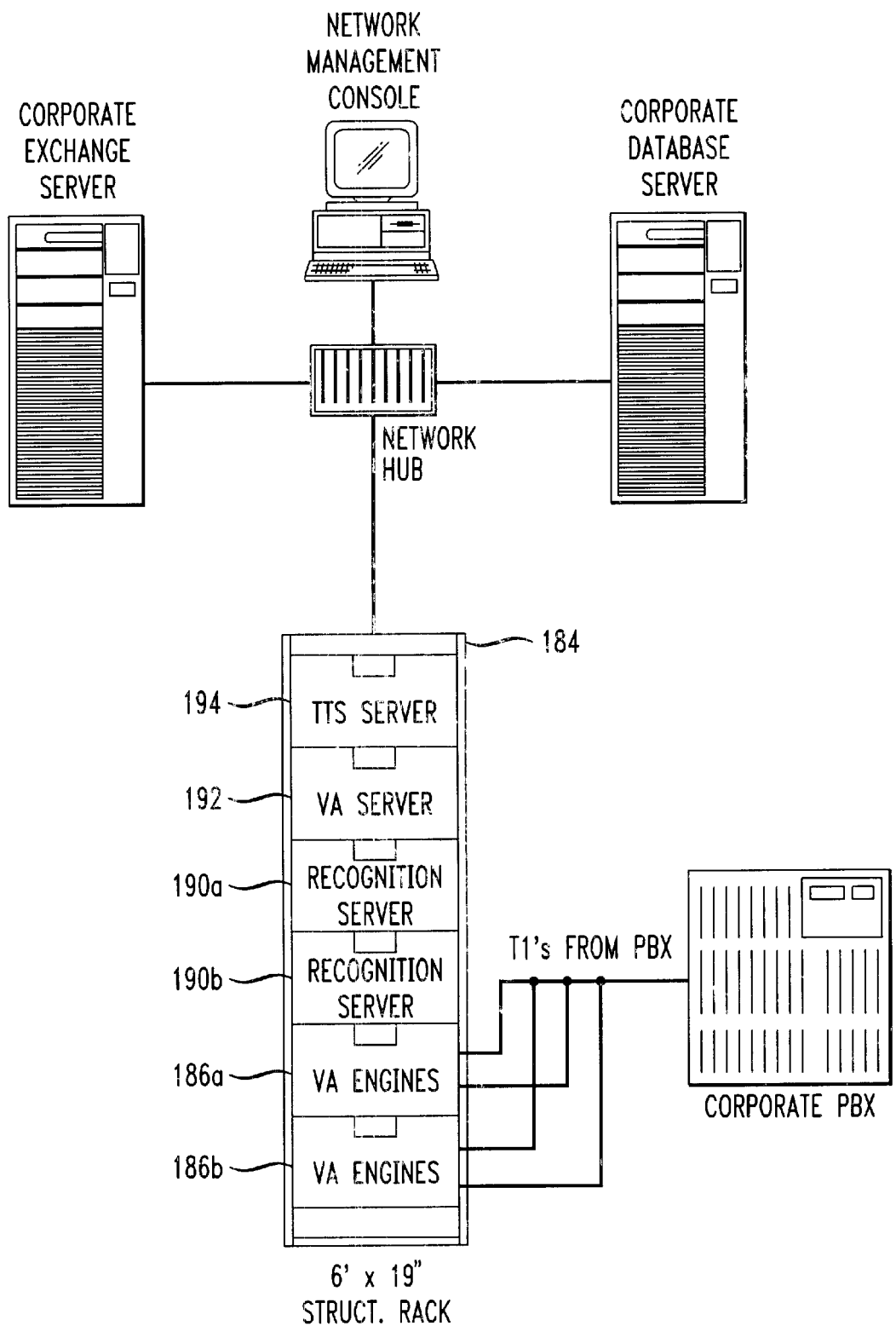
FIG. 10 is a diagram of a large VA system.

For larger sites that need to support many simultaneous VA application sessions, the VA components can be distributed across multiple systems. As illustrated in FIG. 10, a medium-sized company may, for instance, use a six-server rack 184, with two of the servers running VA Engines 186a, 186b, two servers running Recognition Servers 190a, 190b, one running VA Servers 192, and one running TTS Servers 194.

Figure 11:
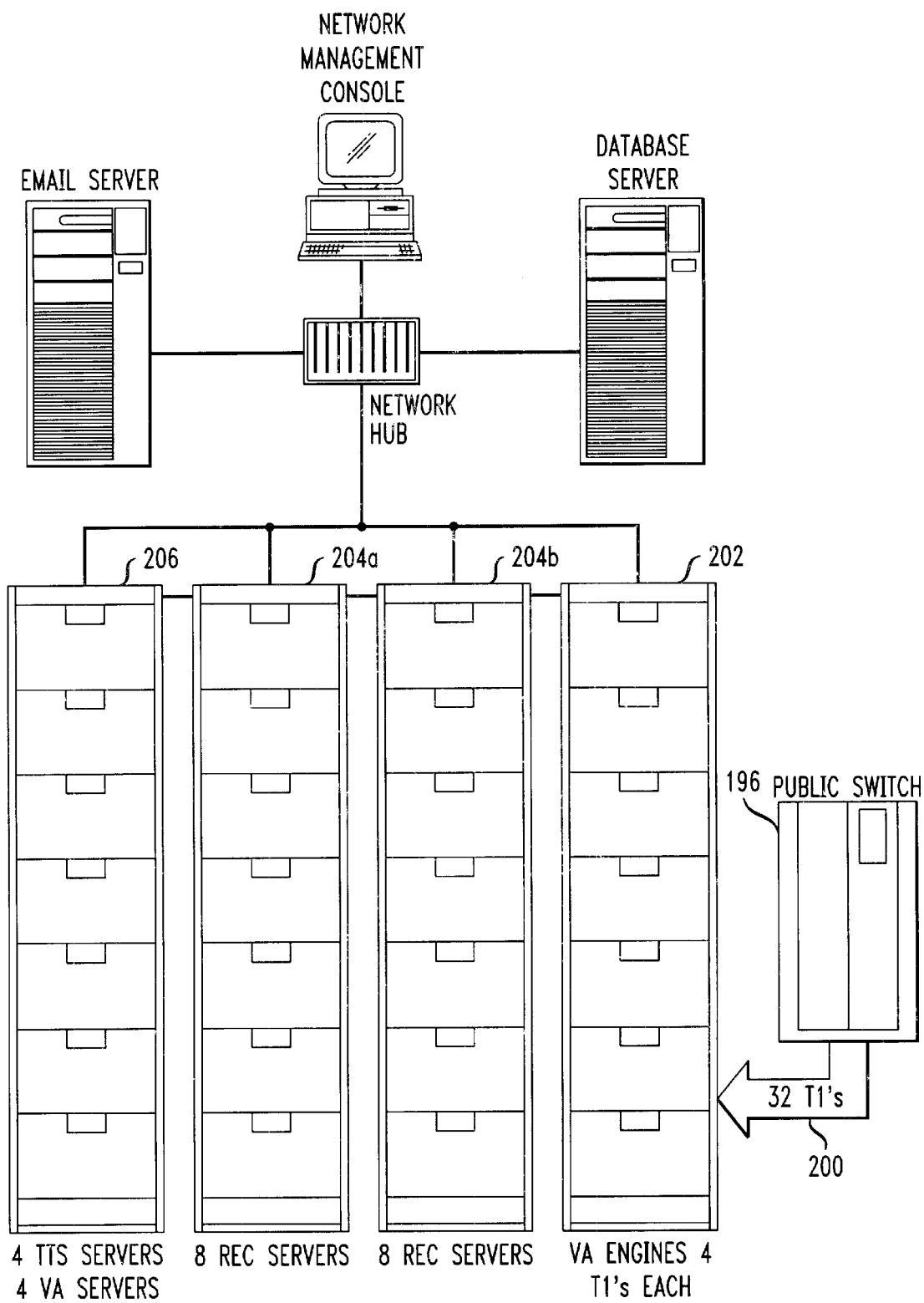
FIG. 11 is a diagram of a very large VA system.

A large organization may require even more scalability. As illustrated in FIG. 11, to support a public switch 196 with 32 incoming T1 lines 200, the site may use upwards of eight systems for VA Engines 202, sixteen for Recognition Servers 204a, 204b, four for VA Servers 206, and four for TTS Servers 206.

Duties of the VA Administrator

The duties of the VA Virtual Assistant platform administrator include the following tasks:

Preparing the server(s) for installation of the VA platform software

Installing the VA software on the systems

Ensuring that the application software can communicate with the telephone system and other hosts such as a Microsoft Exchange server Configuring Microsoft Exchange to support VA users Using the VA management interfaces to manage the systems in the server set, start and stop the VA services, and run VA applications Monitoring the platform interfaces and error logs Maintaining the VA database Managing VA user accounts In order to perform the above duties, a VA administrator needs to have experience with the following software packages:

Windows NT

Microsoft Exchange Server

Microsoft Internet Information Server (IIS)

Microsoft MSDE or SQL Server databases

Platform Server Prerequisites

In the preferred embodiment, a VA platform server system uses two (2) personal computers, each of meets the minimum hardware requirements listed in the table below:

| Component | Requirement |
| --- | --- |
| Processor | Pentium III central processing unit (CPU), |
| Memory | 128 MB |
| Disk Space | 200 MB Minimum; I GB Recommended |
| Network | a PCI 10/100 local area network (LAN) adaptor |
| Sound Card | A Windows-compliant sound card |
| Microphone | An Windows-compliant external microphone |
| Telephony Adapter (Telephony Server Only) | Dialogic D/240PCI-T1 (PCI Bus) |
| Conferencing Adapter (Optional, Telephony Server Only) | One of the following:<br>• Dialogic DCB/320 (ISA Bus)<br>• Dialogic DCB/640 (ISA Bus)<br>• Dialogic DCB/960 (ISA Bus)<br>recommended only for installations that support the call conferencing feature |
| Voice Resource Board (Optional, Telephony Server Only) | One of the following:<br>• Dialogic D/320SC (ISA Bus)<br>• Dialogic D/640SC (ISA Bus) |
| RAID (Optional, Server Set Controller Node only) | A RAID solution is recommended for use on the Server Set Controller in high-traffic environments |

In the preferred embodiment, the following operating system and third-party software are be installed on a server in order to support the VA platform software:

| Component | Requirement |
| --- | --- |
| Operating System | Windows NT 4.0 with the following options and add-on software:<br>• Windows Messaging Option<br>• NT Service Pack 5<br>• Windows NT Option Pack 4.0 (Controller Node Only)<br>• Microsoft Management Console (MMC), Version 1.1<br>• Microsoft Data Access Controls (MDAC) Version 2.1 |
| Web Server (Controller Node only) | Microsoft Internet Information Server Version |
| Web Browser | Microsoft Internet Explorer Version 5.0 |
| Voice Recognition Software | Nuance 6.2.1 |
| Text-To-Speech Software | AcuVoice 3.02 |
| Exchange Client | Microsoft Outlook 2000<br>• Should be installed with the Collaboration Data Objects (CDO) option |
| Fax Services (optional) | Facsys or Jfax<br>Recommended only for systems that will support Fax services |

Prerequisites for Other VA Systems

In the preferred embodiment, the prerequisites for installing the SCE on a workstation are listed in the table below:

| Component | Requirement |
| --- | --- |
| Operating System | Windows NT Workstation or Server 4.0<br>NT Service Pack 5 or higher |
| Web Browser | Microsoft Internet Explorer Version 5.0 |

In the preferred embodiment, the prerequisites for installing the VA Management Console software on a remote workstation are listed in the table below:

| Component | Requirement |
| --- | --- |
| Operating System | Windows NT Workstation or Server 4.0 NT Service Pack 5 or higher |
| Web Browser | Microsoft Internet Explorer Version 5.0 |

TABLE 2-2

VA Administrative Station Requirements

| Concurrent Users Supported | Processes Recommended |
| --- | --- |
| 23 | 23 VA Engines (391 MB memory) 1 Recognition Server |
| 46 | 46 VA Engines (782 MB memory) 1 Recognition Server |

Smallest configuration supported:

1 Controller Node (uniprocessor)—VA Engines & Telephony

1 Rec Node (multiprocessor)

Pre-Requisite Installation Process

Although in general there is no one order required for installing the pre-requisite software packages for the VA platform, the following sequence is generally used when preparing a VA platform server:

Windows NT 4.0 operating system

NT Service Pack 5.0

Windows NT Option Pack 4.0 (Controller Node only)

Dialogic DNA 3.2 software (Telephony server nodes only)

Nuance Speech Recognition software

AcuVoice TTS software

Microsoft Management Console (MMC) Version 1.1

Microsoft Data Access Controls (MDAC) Version 2.1

Outlook 2000

Installing & Configuring Windows NT

Domain Considerations

In the preferred embodiment, all of the VA platform servers and the Microsoft Exchange Server are located in the same Windows NT domain. A server's domain should not be changed after the VA platform is installed. For this reason, when installing the VA software on a machine, it is recommended that the server already be properly configured on the domain in which it will be used.

Initial Configuration

When installing and configuring the Windows NT operating system on VA platform servers, the following steps should be performed:

When partitioning the hard drive(s), use NTFS on all disk volumes. If there are already have FAT volumes on the system, they can be updated to NTFS after Windows NT is installed During the Select Components phase of the installation, select the Windows Messaging option. If the Windows Messaging option is not selected, or if a server on which Windows NT has already been installed is being prepared, the option can be added later.

Installing Windows NT Add-Ons

After the basic Windows NT operating system is installed on the server, the following set of add-on packages should be installed in the specified order:

NT Service Pack 5.0:

Windows NT Option Pack 4.0 (On the Server Set Controller Node only): The Option Pack is needed to install the proper version of the Microsoft Internet Information Service (IIS) on the node. Although IIS can be select as an option when installing Windows NT 4.0, the version included on the core media does not support Active Server Pages and therefore cannot be used.

When installing the Option Pack, Upgrade Only option should be used. Although IIS is recommended only on the Server Set Controller Node, this Option should be installed.

Pack on secondary servers in case Controller Node later needs to be moved to a different server.

Microsoft Management Console (MMC) Version 1.1: The Windows NT Option Pack installs an earlier (1.0) version of MMC, so the MMC Version 1.1 should be installed after installing the Option Pack software.

Microsoft Data Access Components 2.1

Internet Explorer Version 5.0: Although an earlier version of Internet Explorer is installed along with the Windows NT and the Option Pack software, Version 5.0 is used in the preferred embodiment on VA platform.

Configuring RAID

For the server that will act as the Server Set Controller Node, a RAID solution should be installed to provide large, reliable storage for VA logs and utterance files. If a RAID solution is used, it should be properly configured after installation of the operating system on the Controller Node.

Configuring the Telephony Hardware

Hardware Requirements

The VA platform requires up to three different types of telephony boards, depending upon the types of services that will be available. Telephony hardware is recommended only in the platform's telephony server(s). Small installations will likely have only a single machine performing telephony services, though larger configurations may require multiple systems.

Telephony Adapter Boards

VA platform installations should have an ISDN PRI connection to the local telephone network. The Dialogic D/240PCI-T1 Board is recommended to connect the platform to the telephone system. This board provides both the interface to the telephone network and the voice processing resources that are recommended for speech recognition. The D/3240PCI-T1 board supports 24 ports on a single ISDN PRI link, providing 23 active channels for voice connections (one channel is reserved for internal use). The D/240PCI-T1 board provides approximately half the total amount of voice resources recommended to support concurrent VA sessions on all of the board's channels. In order to support simultaneous sessions on all 23 available ports, a voice resource board (described below) is recommended.

Voice Resource Boards

A voice resource board provides the extra processing power recommended to support the full simultaneous use of all ISDN PRI channels on the telephony adapter board(s). Each D/240PCI-T1 adapter contains enough hardware resources to support 12 simultaneous VA sessions. Generally, an additional 22 voice resources are recommended to support VA sessions on all 23 channels. In the preferred embodiment, the Dialogic D/320SC voice resource board provides 32 voice resources, and the Dialogic D/640SC voice resource board provides 64 voice resources.

Based on the number of resources provided, one D/320SC board will provide full support for a single ISDN PRI link. A D/640SC board is recommended to fully support two PRI links.

Conferencing Adapters

A Dialogic audio conferencing adapter is recommended for all VA platforms that will support the VA application's call conferencing feature. Three different models of conferencing adapters can be used, depending upon the call traffic that needs to be supported:

Dialogic DCB/320: Supports up to 32 simultaneous conferees

Dialogic DCB/640: Supports up to 64 simultaneous conferees

Dialogic DCB/960: Supports up to 96 simultaneous conferees

If the telephony server is installed without a conferencing adapter, the VA platform software will still function, but the call conferencing feature will not be available.

Typical Configurations

Figure 12:
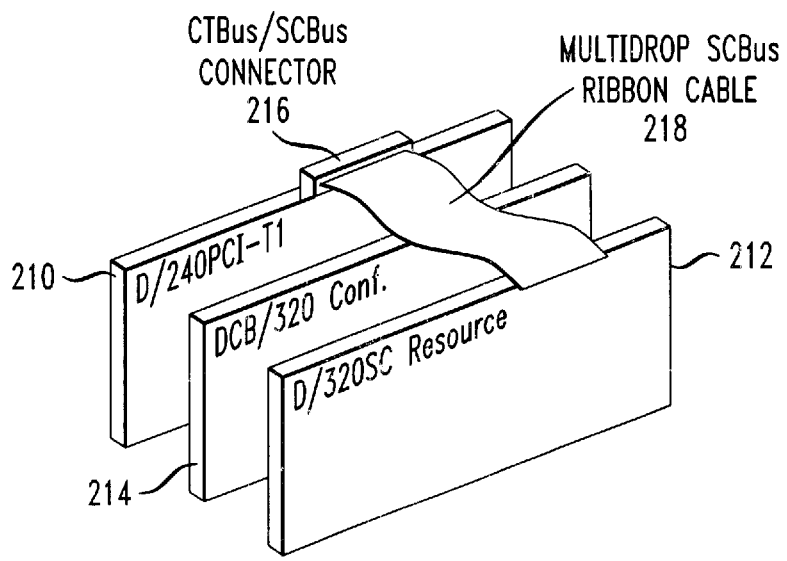
FIG. 12 is a diagram of a hardware configuration for a single ISDN PRI link.

As shown in FIG. 12, the following telephony hardware is recommended to support a single ISDN PRI link, which can handle 23 simultaneous calls:

1 D/240PCI-T1 Adapter 210

1 D/320SC Voice Resource Adapter 212

1 DCB/320Conferencing Adapter 214

1 CTBUS to SCBus Connector 216

2 SCBus ribbon cables 218

Figure 13:
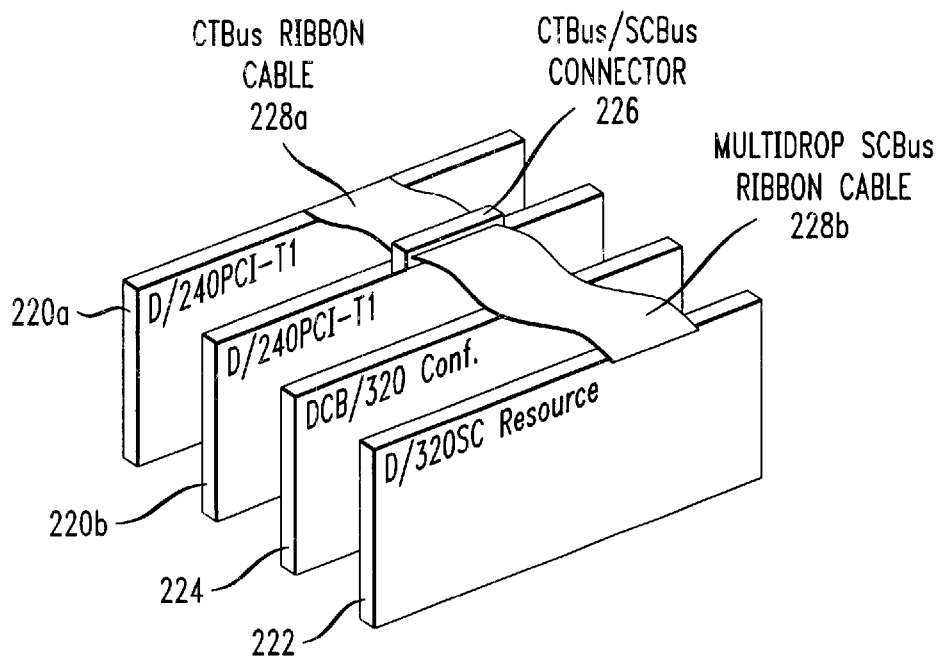
FIG. 13 is a diagram of a hardware configuration for a two ISDN PRI links.

As shown in FIG. 13, to support two ISDN PRI links, which can support 46 simultaneous calls, the following telephony hardware is recommended:

2 D/240PCI-T1 Adapters 220a, 220b

1 D/640SC Voice Resource Adapter 222

1 DCB/640Conferencing Adapter 224

1 CTBUS to SCBus Connector 226

2 SCBus ribbon cables 228a, 228b

Installing the Telephony Hardware and Software

Before the VA platform is installed, the recommended telephony hardware and software should be first installed and configured.

Installing the Telephony Hardware

In the machine or machines that have been designated telephony servers for the VA platform, the recommended telephony cards should be installed according to the manufacturer's instructions. When installing the Dialogic D/240PCI-T1 card(s), be set the Bus ID rotary switch to the proper value. In systems with a single card, the card's rotary switch should be set to '1'. In multi-card systems, the rotary switch should be set to a different number for each card, starting with '1' and progressing sequentially.

Installing the Dialogic DNA 3.2 Software After installing the Dialogic hardware in the telephony server(s), it is recommended that version 3.2 of the Dialogic Native Architecture (DNA) software be installed. When installing DNA 3.2, options that should be selected to ensure proper support for the VA platform are as follows:

When starting the DNA 3.2 Install Shield, select the Complete Install option.

Figure 14:
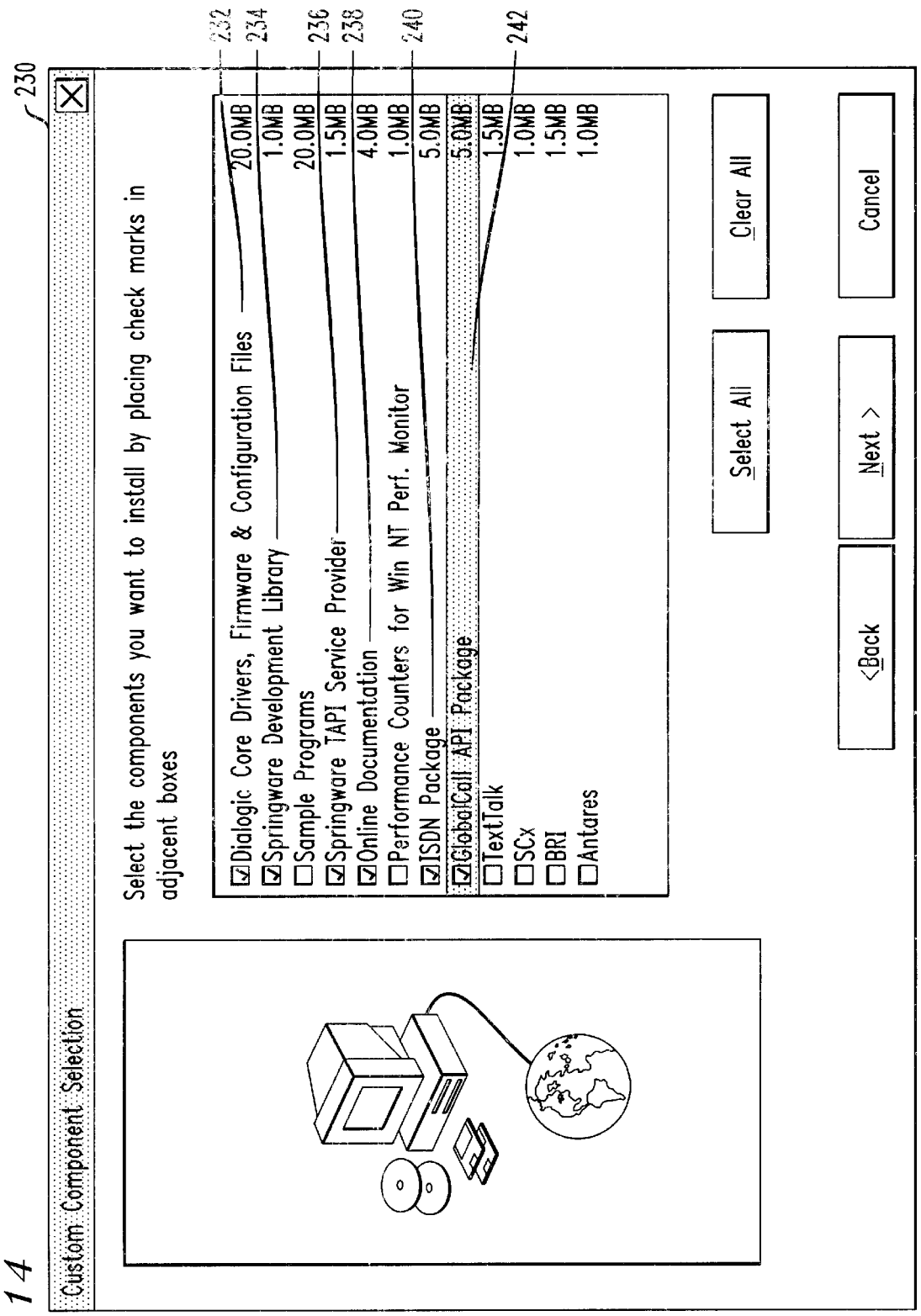
FIG. 14 is a screen shot of the Custom Component Selection screen.

1. As shown in FIG. 14, on the Custom Component Selection screen 230, the following components should be selected for installation:

Dialogic Core Drivers, Firmware, & Configuration Files 232

Springware Development Library 234

Springware TAPI Service Provider 236

Online Documentation 238

ISDN Package 240

GlobalCall API Package 242

2. On the ISDN Protocol Selection Screen, select the ISDN Protocol(s) recommended by the local telephone service provider. (Consult the local provider for the specific protocols needed.)

Figure 15:
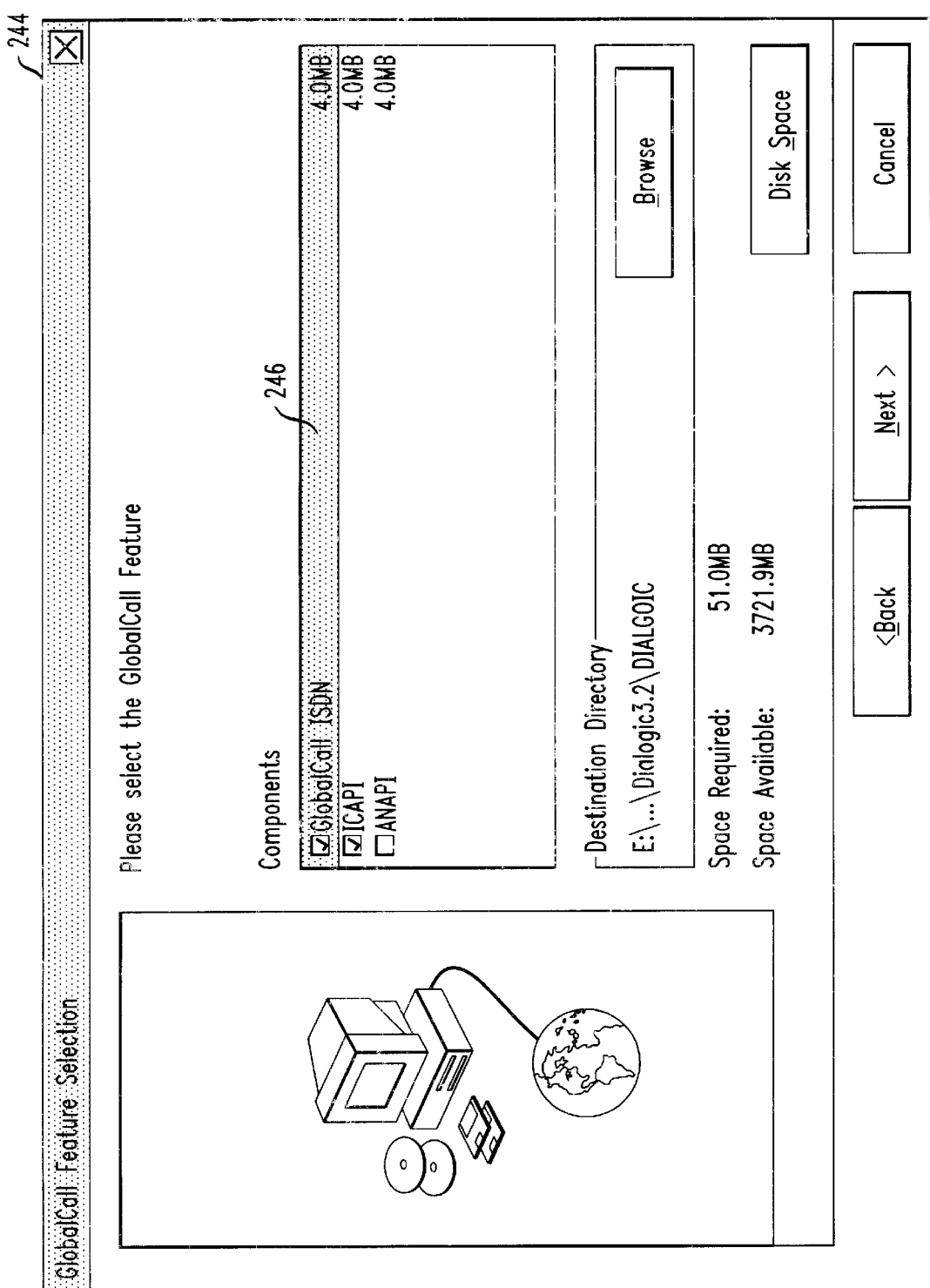
FIG. 15 is a screen shot of GlobalCall Feature Selection screen.

3. As shown in FIG. 15, on the GlobalCall Feare Selection screen, the GlobalCall ISDN option 246 should be selected.

Configuring the Dialogic Hardware During the installation of the VA platform software, Dialogic-specific data files will be modified by the installation routine. For this reason, there is no need to configure the Dialogic boards before installing the VA platform. The Dialog configuration steps necessary after installing the VA platform are discussed.

Installing Nuance 6.2.1

In the preferred embodiment, Nuance 6.2.1 is installed on each machine that will be used in the VA platform server set. The Nuance 6.2.1 installation media contains five separate software packages, which should be installed on each system in the following order:

1. Nuance 6.2.1 Core Software

2. Dialog Optimizer Beta 1)

3. Java Plug-n (Version 1.1.2)

4. Nuance Grammar Builder (Beta 1)

5. Foundation Speech Objects (Beta 1)

More detailed instructions on installing the Nuance packages can be found in the Nuance documentation that accompanies the installation media.

Installing Acu Voice TTS

In the preferred embodiment, Version 3.02 of the Acu-Voice Speech Synthesis software should be installed on each system in the server set. Install the software according to the documentation included with the product.

Installing Microsoft Outlook 2000

Figure 16:
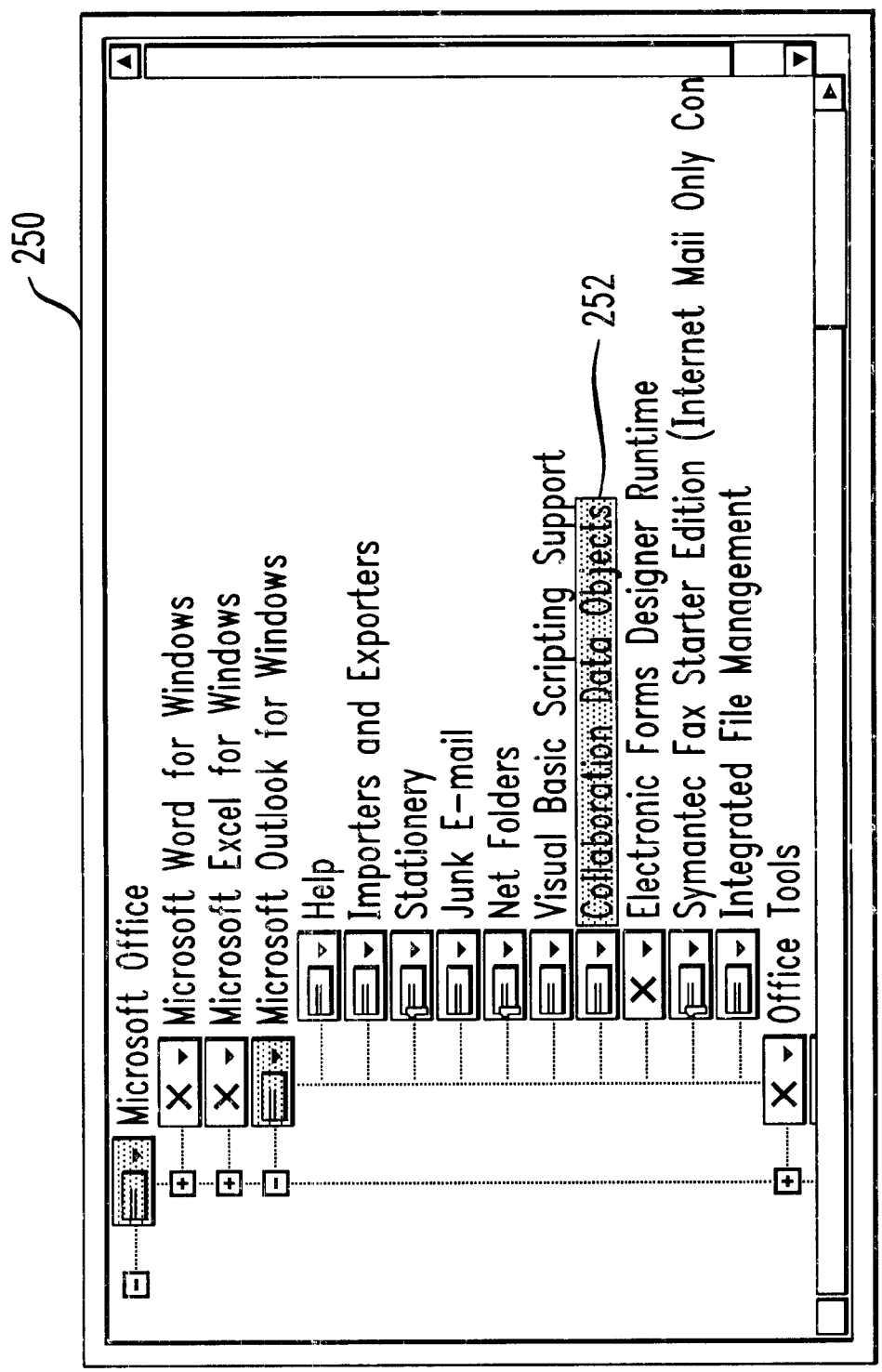
FIG. 16 is a screen shot of the Outlook Feature Selection pane.

In the preferred embodiment, all VA platform servers running a VA application should have Outlook 2000 installed on them. The Outlook software is used not by a regular user but by the platform itself to communicate with the Exchange server. As shown in FIG. 16, at the Feature Selection Pane 250, the Collaboration Data Objects option 252 should be selected. When installing Outlook 2000, perform the following steps to ensure selection of the proper version:

1. Choose a Custom Install from the main selection menu

2. On the Features screen, right-click the box next to each Node other than Microsoft Outlook for Windows. From the drop down menu, select Not Available.

3. Ensure that the Microsoft Outlook for Windows node is marked as Run From My Computer.

4. Expand the Microsoft Outlook Node, right-click the box next to Collaboration Data Objects 252, and choose Run From My Computer.

Creating the Conita VA User Account

By default, all of the VA platform server processes run under the domain user account "ConitaVA." Before configuring Microsoft Exchange or installing the VA platform, this account needs to be created on the domain in which the VA platform server(s) will be running. The account should be a member of the Administrators group. The ConitaVA user name is not hardwired into the VA platform software, so the administrator can, if desired, create a different account name under which the services will run. The Install Shield application for the platform software will use ConitaVA as a default, so the administrator should be sure to enter the proper user name if a different account is to be used.

Configuring the Microsoft Exchange Server

In the preferred embodiment, organizations installing the VA platform will already be using Microsoft Exchange for their regular email and communication services. In such environments, the existing Exchange server and its user accounts will likely continued to be used, with the VA services added on to them. In some situations, however, a new Microsoft Exchange platform may be installed along with the VA platform. If so, the Exchange server should be fully installed and configured according to Microsoft's documentation before installing the VA platform software.

The default VA application maintains only a small amount of information about each of its users, and the majority of user management functions are performed through the standard Microsoft Exchange interfaces. For this reason, it is recommended that Microsoft Exchange accounts be set up for each person who will also be using the VA application. New users can be added and old users can be removed after the VA platform is installed and in operation.

Creating ConitaVA as a Service Account Administrator

In the preferred embodiment, in order for the VA platform services to have access to the necessary Microsoft Exchange interfaces, the ConitaVA user account should be given permissions as an Exchange Service Account Administrator. This configuration is performed through the Microsoft Exchange Administrator application.

Preparing Fax Services

If the VA platform will support fax services, then the fax provider software should be prepared before installing the VA platform. In the preferred embodiment, the VA platform supports the following two separate fax services, Facsys and Jfax.

Installation Overview

When installing the software for a VA implementation, an administrator should perform three different types of installations:

VA Server Install, which installs the application components on a system that will be part of the VA server set.

VA Exchange Administrator Extension, which is installed on the Microsoft Exchange server. This package includes the add-in interface that will be used to manage VA users from within the Exchange Administrator framework.

VA Outlook Client, which installs the VA add-in for Microsoft Outlook. This allows VA users to configure their Virtual Assistants from within a standard Outlook interface. This installation should be performed on the desktop systems for each person who will have a VA account.

There are two additional types of installations that can be performed if needed within a particular environment:

VA Application Developer Workstation, which is used to install the VA Studio and other application development components on a programmer's workstation. This package is needed only if a developer will be writing custom VA applications at the site.

VA Administration Station, which is used to install the VA Management Console on an administrator's workstation. The VA Management Console will already be installed along with the VA platform software on the systems that make up the VA server set. The Administration Station install is useful, however, for an administrator who wishes to manage the server set from a remote system.

Installation Media

Three different pieces of media can be used for installing the VA platform software. These CDs/floppy disks and the types of installs for which they are used are listed in the table below:

| CD-ROM Used | Installation Type |
| --- | --- |
| VA Platform CD | VA Server |
| | VA Administration Station |
| | VA Application Developer |
| VA Exchange CD | VA Exchange Administrator Extension |
| VA Outlook Client Floppy Disk | VA Outlook Client |

Installation Procedure

In the preferred embodiment, the general process for installing and configuring a full VA platform implementation is as follows:

1. Prepare the site for installation.
2. Install the VA platform software on the Server Set Controller Node
3. Install the VA platform software on each secondary node, if using a multi-system implementation
4. Install the VA Exchange Administrator Extension on the Microsoft Exchange Server
5. (Optional) Install an Administration Station and/or VA Application Developer's platform
6. (Optional) Install the VA Exchange Administrator Extension on a remote Exchange administration station
7. Configure the platform to run one or more VA applications
8. Create VA user accounts with through the Exchange Administrator interface
9. Distribute and/or install the Outlook Client component on the workstations of all VA users Installing in Stages In many situations—particularly when installing a VA server set for the first time—it may be desirable to install the platform servers in stages. In such a procedure, a single node with all the VA software is installed, configured to run a single VA application, and tested to see whether the application functions correctly—first over the system speakers and then over a phone line. Then, additional servers can be added to the server set until the full installation is complete.

For an installation in stages, the following procedure is recommended:

1. Install the Server Set Controller Node software package on a single server
2. Install the VA Exchange Administrator package on the Microsoft Exchange Server
3. Configure the single VA platform server to run a VA application using a sound card interface
4. Create one or two VA user accounts for testing purposes
5. Test the application to be sure it functions correctly
6. Remove the Sound Card Engine and replace it with a Dialogic Telephony Engine
7. Test the application to be sure it functions over the phone lines
8. Once the first server is functioning properly, add in each additional node in succession
9. Create VA user accounts
10. Distribute and/or install the Outlook Client component on the workstations of all VA users
11. the full VA platform online for general use Calculating Disk Space Requirements The amount of free disk space recommended to install the VA platform components on a server depends on the type of installation chosen for the system. Approximate space requirements are listed in the table below:

| Installation Type | Approximate Space Recommended |
|---|---|
| Server Set Controller Node plus MSDE Database | 200 MB |
| Server Set Controller Node without MSDE Database | 100 MB |
| Secondary Node | 100 MB |
| Microsoft Exchange Administrator Extension | 5 MB |
| Administration Station | 10 MB |
| Application Developers Workstation | 10 MB |

The disk space requirements are for the VA platform software only. They do not include the amount needed for prerequisite packages such as Nuance and AcuVoice.

On the Server Set Controller Node, it is recommended that an additional 1 GB of free space be available for the storage of logs and temporary files during VA platform operation. An MSDE or SQL Server database is recommended by the VA platform to store configuration and log data. To be installed without the MSDE database, a Server Set Controller Node should already have either MSDE or SQL Server installed.

While only 100 MB is recommended for the initial installation of the VA platform software, in the preferred embodiment, because the VA platform software stores temporary speech and log files on the Server Set Controller Node during execution, the amount of disk space used can grow very quickly. It is recommended that there be one (1) GB of free disk space on the Server Set Controller Node in order to store a full set of speech and log data. For systems with smaller capacity, the amount of temporary data stored can be reduced, but such restrictions will limit the ability of an administrator to monitor the platform and track errors.

VA Platform Server Installation

When setting up a VA implementation, the first installation is the VA Server install. This installation should be performed first on the server that will be the Server Set Controller Node and then on each secondary server. Before beginning the VA platform installation, if a multi-node server set will be installed, identify which server will be the Server Set Controller Node Installing the Server Set Controller Node On the server that will be the controller node, perform the following steps to install the VA platform software:

1. Insert the VA Platform CD in the CD-ROM Drive. The Install Shield application executes automatically.
2. Read the introduction and license screens, clicking Next when finished. The Setup Type selection screen will appear.
3. Select VA Server from the setup type list box and click Next. The Select Components screen will be displayed.
4. Select the "Yes, this is the Serverset Controller" option and click Next.
   The next screen will provide a prompt to select the directory into which the VA platform files will be installed. By default, this directory will be c:\Program Files\Conita Virtual Assistant.
   To keep the default destination directory, click Next.
   To change this directory, click Browse and select a new destination, then click Next.
5. The next screen will ask to install the MSDE database. Select either yes or no, based on the following criteria:
   Select No only if the MSDE database software or Microsoft SQL Server is already installed on the server. Click Next to move to the user account screen.
   Select Yes if neither MSDE or Microsoft SQL Server is installed.
6. If Yes is selected to install MSDE, there will be a prompt for the directory in which the database should be installed. By default, this directory is c:\Program Files\Conita Virtual Assistant\MSSQL7.
   To accept the default directory, click Next.
   To change the directory, click Browse, select a new directory, and click Next.
7. After the database information is selected, the Enter Account Information screen will be displayed.
8. On the Account Information screen, the username and password for the NT account under which the VA software will run should be entered. By default, this account will be named ConitaVA and should have already been configured on the server and/or domain before the installation began. Click Next to continue.
9. The next screen will provide a prompt for entry of the password for the Conita VA service account. Enter the proper password and click Next.
10. The next screen will provide a prompt for the name of the Windows NT domain to which the service account belongs. Enter this domain name and click and click Next.

Note: All VA servers in a server set and the Microsoft Exchange server with which they will communicate should be located in the same domain.

11. The final interactive screen of the installation process will prompt the selection of the Program Folder in which the icons for the VA platform software are to be installed. Change the folder's name if desired, then click Next to begin the installation.

In most cases, no reboot is recommended after the VA Server installation. If, however, one or more system files were locked by other applications while the installation routine was running, a reboot of the system will be recommended to complete the VA installation, and a prompt will be provided to perform the reboot.

Installing Additional VA Server Nodes

The process for installing the VA software on secondary servers is very similar to that for Server Set Controller Nodes, but there will be no prompt to install the MSDE database because a database is recommended only on the controller node.

The full procedure for the VA Server install an a secondary node is as follows:

1. Insert the VA Platform CD in the CD-ROM Drive. The Install Shield application should execute automatically.
2. Read the introduction and license screens, clicking Next when finished. The Setup Type selection screen will appear.
3. Select VA Server from the setup type list box and click Next. The Select Components screen will be displayed.
4. Select the "No, this is not the Serverset Controller" option and click Next.
5. The next screen will provide a prompt to select the directory into which the VA platform files will be installed. By default, this directory will be c:\program Files\Conita Virtual Assistant.
   To keep the default destination directory, click Next.
   To change this directory, click Browse and select a new destination, then click Next.

6. On the Account Information screen, enter the username and password for the NT account under which the VA software will run. By default, this account will be named ConitaVA and should have already been configured on the server and/or domain before the installation began. Click Next to continue.
7. The next screen will provide a prompt to enter the password for the Conita VA service account. Enter the proper password and click Next.
8. The next screen will provide a prompt for the name of the Windows NT domain to which the service account belongs. Enter this domain name and click and click Next. Note: All VA servers in a server set and the Microsoft Exchange server with which they will communicate should be located in the same domain.
9. The final interactive screen of the installation process will provide a prompt to select the Program Folder in which the icons for the VA platform software are to be installed. Change the folder's name if desired, then click Next to begin the installation.

In most cases, no reboot is recommended after the VA Server installation. If, however, one or more system files were locked by other applications while the installation routine was running, the system will have to be rebooted to complete the VA installation. In such a case, there will be a prompt to perform the reboot.

Troubleshooting a VA Server Installation

The VA platform Install Shield routine generates a log file that is useful for diagnosing a failed installation. The full path to this file is c:\program Files\Conita Virtual Assistant\Log\ConitaVAInstallLog.txt. In case of warning or error messages during an install, the log file should be checked first to see whether it contains a more detailed message.

Configuring the Platform after an Installation

Configuring IIS on the Controller Node

During the installation of the VA platform software on the Server Set Controller Node, the Install Shield routine will create two new subdirectories under c:\inetpubt\wwwroot. These directories contain a web-based tool used for managing the VA platform logs. Although the Install Shield creates these directories, perform the following steps to configure the virtual directories and security permissions for the files.

1. Create two virtual directories under the default web sites and point them to the actual directories created by the install.
2. Give the two virtual directories read and script access.
3. Make default.htm the default document for both directories.
4. Remove anonymous access to the two virtual directories.
5. Enable Windows NT Challenge/Response access to the virtual directories.

Set access permissions on the two actual directories to allow access only to the user account(s) who will be functioning as an administrator for the VA platform.

Installing the VA Exchange Administrator Extension

For all sites that will be running the default VA application, the administrator should install the VA Exchange Administrator Extension package on the Exchange server that will be used with the VA platform. This package inserts a custom add-in into the Microsoft Exchange Administrator application. The add-in is used to manage the Exchange accounts that can be accessed through the Virtual Assistant application. In most cases, the VA platform software will be installed in an environment that has an existing Microsoft Exchange server in use. In some circumstances, however, an administrator may be installing Exchange fresh along with the VA software. In such a case, the Exchange server should be fully installed and configured before attempting to install the VA extensions.

In the preferred embodiment, the Microsoft Exchange server software runs on a separate machine from the VA platform software. At smaller sites, it is possible for Exchange and the VA platform to occupy the same server.

Before Beginning

Before beginning the installation of the VA Exchange Server Extension package, the following tasks should have been completed:

The Microsoft Exchange server on which the VA extensions will be installed has been fully installed and configured.

An Exchange administrative user's account has been set up for the person who will act as the VA administrator.

Regular Exchange user accounts have been set up for each person who will be a Virtual Assistant user.

Before beginning the installation, the Exchange organization, site, and container to which the extensions will be added should be determined, as well as the name of the Add-In shared directory for the Exchange server.

Installing the VA Extensions on an Exchange Server

The process for installing the VA extension on a Microsoft Exchange server is as follows:

1. Insert the VA Exchange Server Extension CD in the server's CD-ROM drive.
2. Read the introduction and license screens, clicking Next when finished.
3. On the Setup Type screen, choose Exchange Server and click Next.
4. On the Exchange Server Name screen, enter the name of the server on which the extensions are being installed. Click Next.
5. On the Exchange Organization screen, enter the name of the organization to which the VA extensions are being added. Click Next.
6. On the Exchange Site screen, enter the name of the site to which the VA extensions are being added. Click Next.
7. On the Exchange Add-Ins Share screen, enter the name of the shared directory under which Microsoft Exchange add-Ins are stored. By default, this directory is named "Add-Ins." Click Next.
8. On the Exchange Container Screen, enter the name of the container in which the VA user accounts will be held. By default, this container is named "Recipients," but it may have been changed if the Exchange server has been customized. Click Next.
9. On the Exchange Extension Display Name screen, enter the name to be displayed for the VA Add-Ins node. (This node will appear under the Add-Ins folder in the Exchange Administrator GUI.) By default, the display name will be "Virtual Assistant User Administration." Click Next.
10. On the Virtual Assistant Administrator Alias screen, enter the Exchange alias for the VA administrator user. By default, this user name is "ConitaVA," but a different account name for administrative user may have been chosen. Click Next.
11. The final interactive screen of the installation process will prompt the selection of the Program Folder in which the icons for the VA User Administrator software will be installed. Change the folder's name if desired, then click Next.

At this point, the automated portion of the install will begin. Once the Install Shield has finished copying the VA files to the system, there will be a prompt to click Finish to end the installation.

Installing the Exchange Extensions on an Administrative Station

In some environments, an administrator may have installed the Microsoft Exchange Administrator application on a system other than the Exchange server itself (that is, on a system used to administer Exchange remotely). The VA Exchange extensions can also be installed on this administrative station to allow for remote VA management. Note: Before the VA extensions can be installed on an administrative station, they should first be installed on the Exchange Server itself.

The process for installing the VA extensions on a remote administrative machine requires fewer user-input steps than the full Exchange Server install:

1. Insert the VA Exchange Server Extension CD in the system's CD-ROM drive. The Install Shield application should execute automatically.
2. Read the introduction and license screens, clicking Next when finished.
3. On the Setup Type screen, choose Exchange Administrator Only and click Next.
4. The next screen prompts for the directory in which the VA Extension files will be installed. Accept the default or select a new directory, then click Next.
5. On the Virtual Assistant Administrator Alias screen, enter the Exchange alias for the VA administrator user. By default, this user name is "ConitaVA," but a different account name for administrative user may have been chosen. Click Next.
6. The final interactive screen of the installation process will prompt the selection of the Program Folder in which the icons for the VA User Administrator software will be installed. Change the folder's name if desired, then click Next.

Uninstalling the VA Extensions

To remove the VA Extensions from the Exchange Server, use the Add/Remove Programs function under Windows NT's Control Panel. The uninstall routine will remove the Virtual Assistant tab from the Recipients Properties dialog.

Installing the VA Outlook Add-In

Before users can begin logging into their Virtual Assistants, the VA Outlook Add-In should be installed on their desktop workstations. This package adds a configuration interface to the users' Microsoft Outlook applications that will be used to personalize the settings for the Virtual Assistants.

The installation media makes the VA Outlook Add-In install program available in two forms:

A regular Install Shield.file. Stored on a floppy diskette, this Install Shield can be executed on an individual machine or used with automatic software distribution systems.

A self-extracting ZIP file. Small in size (820 KB), the self-extracting ZIP is designed to be transmitted over email systems. When executed, it unpacks the recommended installation files and runs the install, which requires no user input.

Installing an Administration Station

If desired, an administrator can install the VA Management Console on a machine separate from the VA platform software. Such an administrative station advantageously allows the VA platform to be managed remotely over the network. This installation installs only the basic components needed to run the MMC Snap-In console and to communicate with the VA Server Manager process on the Server Set Controller Node.

To install an administration station, perform the following steps:

1. Insert the VA Platform CD in the CD-ROM Drive. The Install Shield application should execute automatically.
2. Read the introduction and license screens, clicking Next when finished. The Setup Type selection screen will appear.
3. Select VA Administration Station from the Setup Type list box and click Next.
4. The next screen will prompt to select the directory into which the VA platform files will be installed. By default, this directory will be c:\Program Files\Conita Virtual Assistant.
5. The final interactive screen of the installation process will prompt to select the Program Folder in which the icons for the VA platform software are to be installed. Change the folder's name if desired, then click Next.

Installing a VA Application Development System

If programmers will be developing customized VA applications, then an application development system may need to be installed. This package installs the VA Studio and other development tools. Although the Application Development software can be run on the same server as the VA platform, in most cases, the development environment should be installed on a separate system and the custom applications "published" to the VA platform when they are completed.

To install a VA application development system, perform the following steps:

1. Insert the VA Platform CD in the CD-ROM Drive. The Install Shield application should execute automatically.
2. Read the introduction and license screens, clicking Next when finished. The Setup Type selection screen will appear.
3. Select VA Application Development from the Setup Type list box and click Next.
4. The next screen will prompt the selection of the directory into which the VA platform files will be installed. By default, this directory will be c:\Program Files\Conita Virtual Assistant.
   To keep the default destination directory, click Next.
   To change this directory, click Browse and select a new destination, then click Next.
5. The final interactive screen of the installation process will prompt the selection of the Program Folder in which the icons for the VA platform software are to be installed. Change the folder's name if desired, then click Next.

Overview of the VA Management Console

Figure 17:
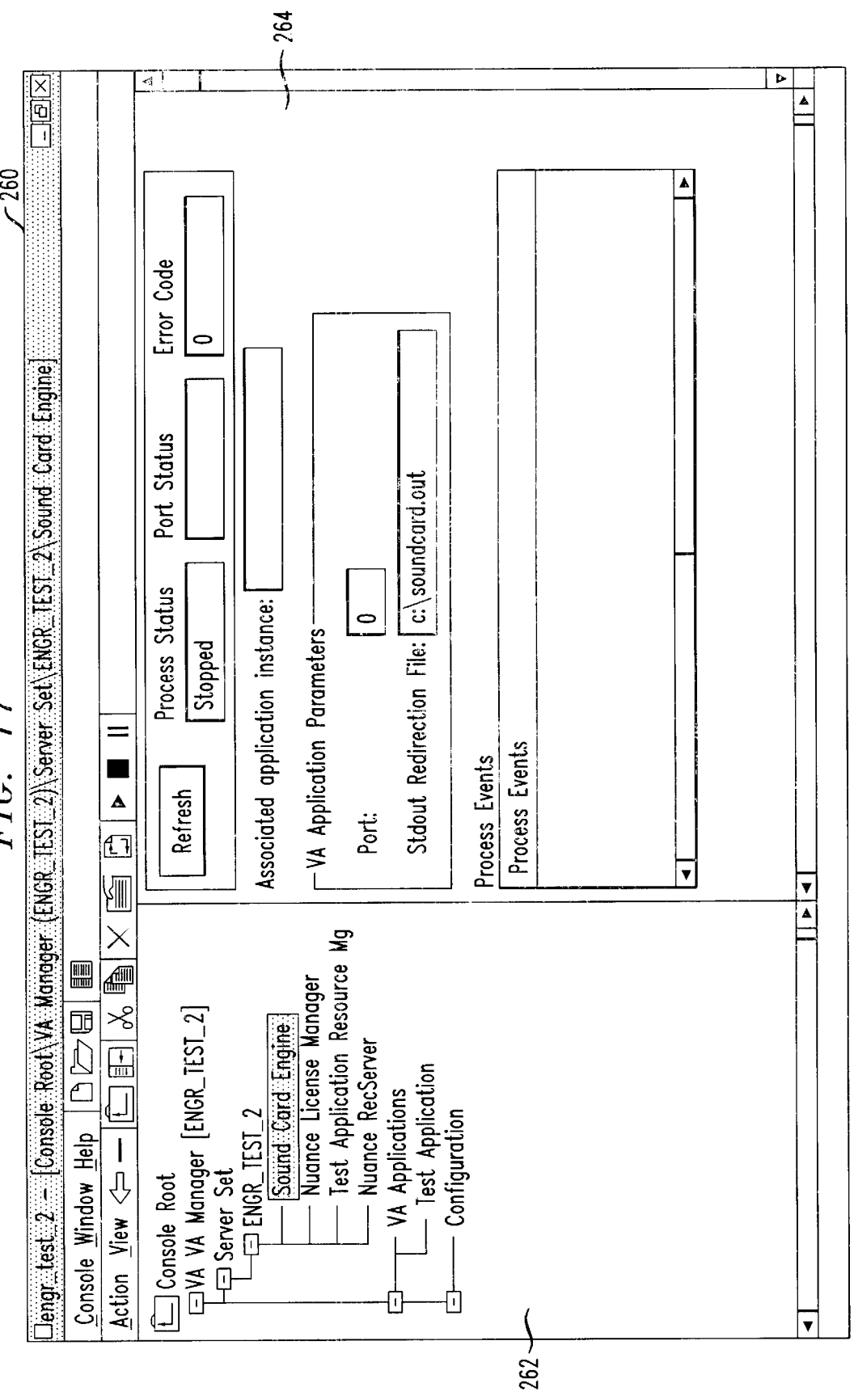
FIG. 17 is a screen shot of the VA Management Console.

As illustrated in FIG. 17, the VA Management Console 260 allows an administrator to view and manage all the VA components running in a server set. This interface is implemented as a snap-in for the Microsoft Management Console (MMC) framework, which provides a consistent interface for application administration. Based on the Microsoft Windows Explorer paradigm, the VA Management Console includes a tree view of system components on the left side of the screen 262 and an information panel on the right 264. Highlighting a component in the tree view will cause its configuration interface to appear in the right-hand pane. Right clicking on a component will open a pop-up menu listing additional functions such as viewing properties, adding new components, and deleting existing components. In a multi-node server set, the VA Management Console will be run only on the Server Set Controller Node.

Launching the VA Management Console

To launch the VA Management Console, select Start>Programs>Conita Virtual Assistant>Conita Management Console.

If the desktop icon is deleted, the VA Management Console can be launched by executing the MMC framework and loading the VA snap-in. To do so, use the following procedure:

1. From the Start Menu, select Run.
2. In the Run dialog, type "mmc" and click OK.
3. From the MMC's Console menu, select Add/Remove Snap-In. The Add Snap-In dialog will open.
4. Click the Add button. The Add Standalone Snap-In dialog will open.
5. From the list of available snap-ins, choose the VA Serverset Manager and click OK. The Select Server dialog will be displayed.
6. Click the Select button and choose the server on which the VAServerManager process is running (i.e. the Server Set Controller Node).
7. Click Finish to close the Select Server Dialog and OK to close the Add/Remove Snap-In dialog.

The VA Management Console snap-in will now be displayed within the MMC. If the VA Serverset Manager snap in does not appear in the Add Standalone Snap-In dialog, it is likely that the VAServerManager service is not running. Start the VAServerManager service (through the Control Panel>Services interface) and try adding the snap-in console again.

Initial Configuration Tasks

When the VA platform is first installed, the administrator will need to perform the following tasks to configure the platform and launch the first application:

1. Configure General Server Set Information
2. Add the Server Set Controller Node to the list of managed servers
3. (For multi-server platforms) Add secondary nodes to the list of managed servers
4. Create an application instance for the Conita VA application
5. Start the VA application services for the platform
6. Test the application to ensure it is running correctly
7. Configure alerts for the VA platform
8. Set any TTS Dictionary entries that are known to be needed Each of these tasks is discussed in detail below.

Configuring the General Server Set Information

Figure 18:
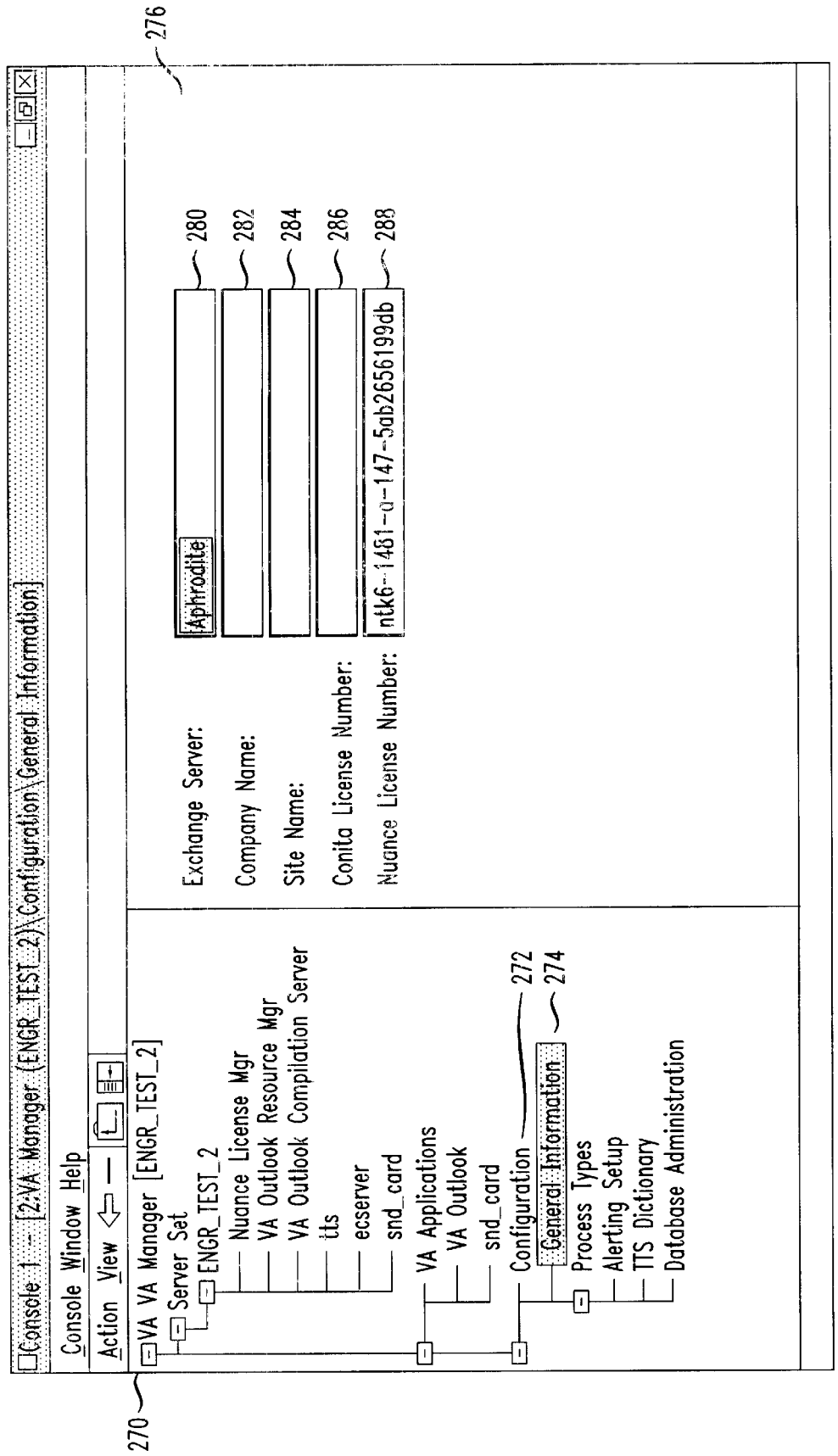
FIG. 18 is of the VA Management Console with the general information form displayed in the right panel.

The first configuration task to be performed within the VA Management Console is to set the general information for the server set. To do so, as shown in FIG. 18, expand the VA Manager 270 and Configuration 272 folders in the component tree, then click the General Information node 274. The general information form 276 will be displayed in the right-hand pane. In this form, enter the following information:

Exchange Server 280: The machine name of the Microsoft Exchange Server with which the VA applications will communicate.

Company Name 282: The name of the organization implementing the VA

Site Name 284: The name of the site at which the VA platform is located. (This field is used to distinguish platforms at organizations that may be running more than one set of VA servers.)

Conita License Number 286

Nuance License Number 288: This key, which is custom generated by Nuance for each organization, should be provided with the Nuance software.

Adding and Removing Servers

When the VA platform software is first installed, no servers will be configured. One of the first configuration tasks is adding one or more servers to the set. After the system is up and running, servers may need to be added or removed to expand the capacity of the server set or to replace a failing system.

After an installation, the Server Set Controller Node should be added to the list of managed servers. Then, if a multi-platform implementation is being used, add each of the secondary servers. Note: The process for adding a server is the same for the controller node and secondary nodes.

Adding a Server

Before a server can be added to the set controlled by the VA Management Console, it should have the VA platform software installed, and its VA Manager service should be started. Note: The VA Manager process is registered as an auto-starting NT service by the install routine. If, however, the VA Manager service has been stopped on a system, it can be started using the Control Panel>Services interface. Unlike other VA processes such as VA Engines and Recognition Servers, the VA Manager service is started through the Windows NT Services interface, not through the VA Management console.

To add a server to the VA server set, use the following procedure:

1. Expand the VA Manager node in the component tree (if unexpanded).
2. Right-click the Server Set node. A pop-up menu will appear.
3. From the pop-up menu, select New>Server. The Select Computer dialog will open.
4. From the dialog's list, select the server to be added and click OK. A Logon dialog will open.
5. Enter the Username and Password for the VA user for the server being added, and then click OK.

If an error message is received when attempting to add a new server to the server set, check the following:

The VA Manager service is running on the server to be added

The correct name and password for the VA user was entered

The ConitaVA user account has been properly created for either the domain as a whole or for the server being added Removing a Server To remove a server from the server set, right-click the server's node in the component tree and select Delete from the pop-up menu.

Configuring Applications

When the VA Platform is first installed, no applications are registered for execution. After adding all the servers to the server set, the next task is to create one or more applications. Periodically, additional applications may be needed to support new users.

The VA application, which is delivered on the platform installation media, is the application that will be used for most VA implementations. Some users, however, may elect to configure multiple instances of the VA application, or install other custom-written applications. The basic process for adding an application instance is the same, be it for the VA application or for a custom VA application.

Application Requirements

In order to be created and executed, each VA application requires a set of associated service processes and a publication file.

Associated Service Processes

Each application instances requires four different types of service processes to be running:

One or more VA Engines (on which the application will run). Each VA Engine will support a single active telephone call; a Virtual Assistant platform that supports multiple simultaneous callers will generally have one VA Engine per telephone channel.

One or more Text-to-Speech (TTS) servers for translating text into voice output

One or more Recognition Servers for translating voice input into text

One VA Server process, which monitors users' mailboxes and notifies them when events occur, such as a message being received or a task being assigned. Note: A VA Server process is recommended only for applications that support event notification functionality. The default VA application uses a VA Server process, but a custom application may not require one.

Each of these recommended server processes could be created separately and then associated with the application instance. The VA Management Console, however, provides a mechanism for creating these processes in one batch while configuring the application.

The Publication File

A Virtual Assistant Publication (.vapub) file is an archive that holds the various source files that make up an application. These files include the following:

The application code executed by the VA Engine

A "grammar" containing the words and phrases recognized by the application

The recorded prompts and other sound files used by the application

A vapub file is generated by the VA application developer using the Service Creation Environment and then uploaded to the VA platform.

Part of the process of creating a new application instance is "publishing" its vapub file, meaning that its contents are unpacked and distributed to the appropriate directories on the VA platform servers. At publication time, the grammar is compiled into a format that can be understood by the Speech Recognition software and loaded in the recognition engines.

These publication functions are performed automatically by the Management Console software when an administrator creates a new application instance. In case of a failure during the publication process, any files created on the platform servers will be rolled back and removed. Note: The source files for an application are published to every server in the server set, even if that server does not host any of the service components that will be associated with the application. This blanket-distribution allows a new process (such as an additional Recognition Server) to be associated with an existing application without having to republish the application files.

Creating an Application Instance

To create a new application instance (including the associated processes it will use), follow these steps:

1. Expand the VA Management node in the component tree (if unexpanded).

2. Right-click the VA Applications node. A pop-up menu will appear.

Figure 19:
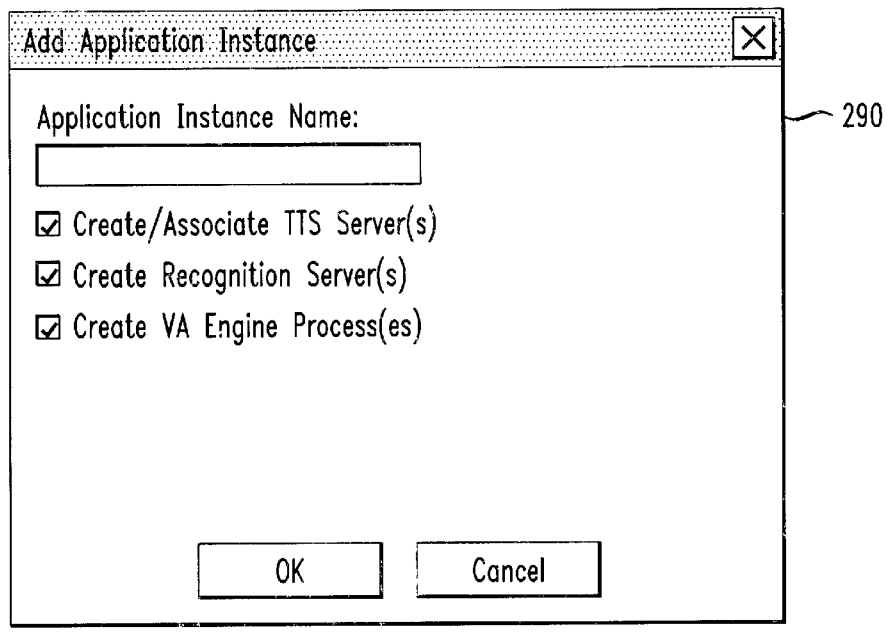
FIG. 19 is a screen shot of the Add Application Instance Dialog box.

3. From the pop-up menu, select New>Application Instance. The Add Application Instance dialog 290 will open, which is shown in FIG. 19.

4. In the dialog, enter a name for the application instance. It is recommended that the application instance be given a descriptive name, such as Conita VA_1, that reflects which type of application it is.

5. Ensure that all three checkboxes for creating server processes are checked.

Figure 20:
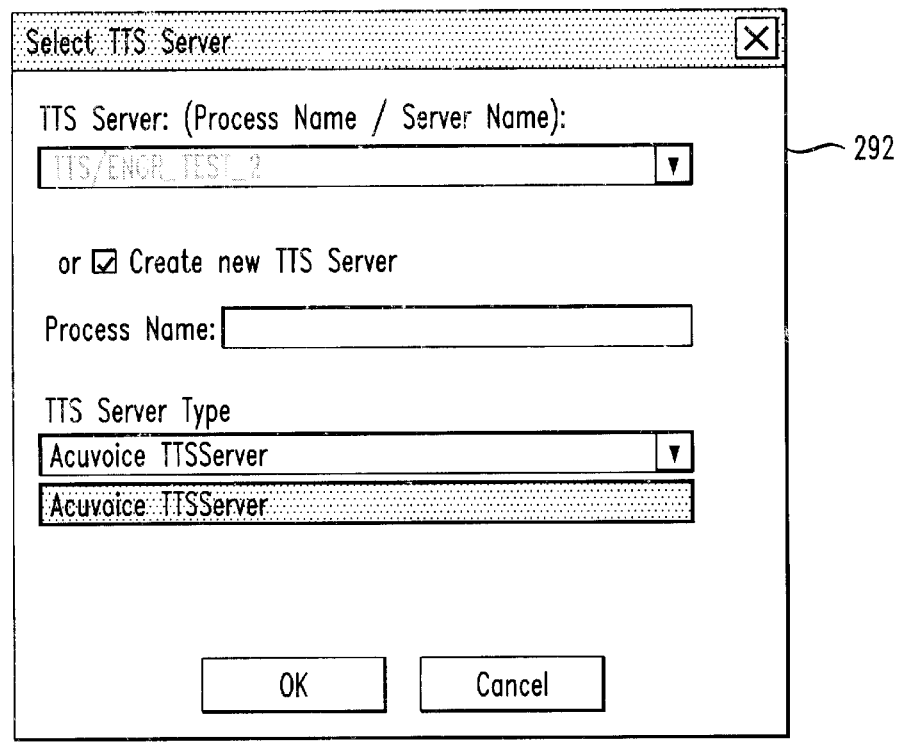
FIG. 20 is a screen shot of the Select TTS Server Dialog box.

6. Click OK. The Select TTS Server dialog 292 will open, as shown in FIG. 20.

7. Check the Create new TTS Server box.

8. In the Process Name field, enter a name for the new TTS server process.

9. From the TTS Server Type drop down box, select the type of TTS server to be created. In the preferred embodiment, the TTS server is AcuVoice, so this will be the only option available in the drop down box. If the system has been customized to support a different TTS server, additional choices may be available.

Figure 21:
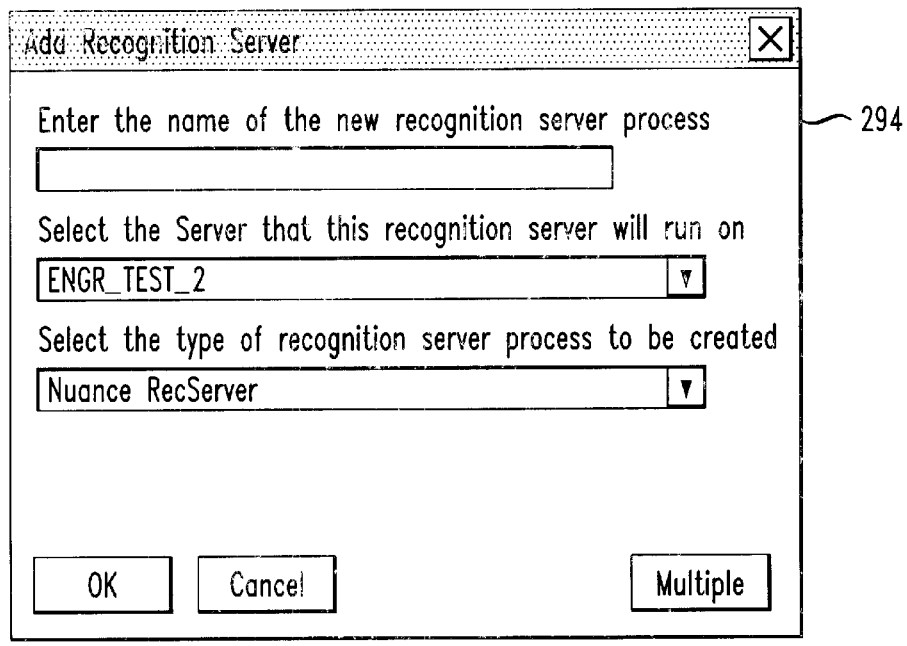
FIG. 21 is a screen shot of the Add Recognition Server Dialog box.

10. Click OK. The Add Recognition Server dialog 294 will open as shown in FIG. 21.

Figure 22:
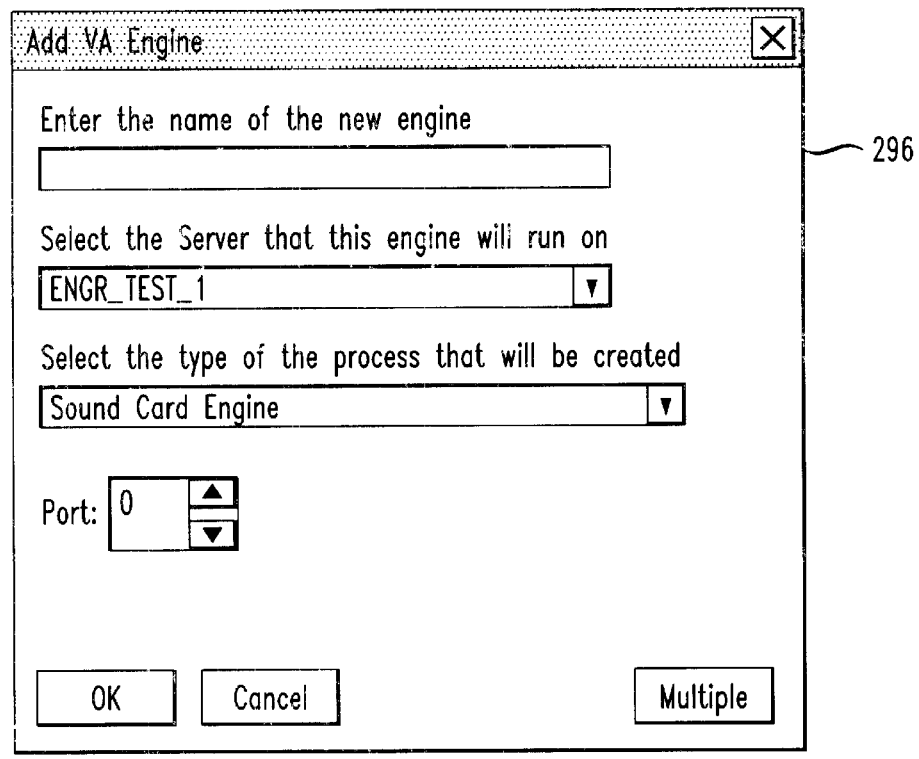
FIG. 22 is a screen shot of the Add VA Engine Dialog box.

11. Complete the name, target host, and server-type fields, then click OK. The Add VA Engine dialog 296 will appear, as shown in FIG. 22.

12. In the Add VA Engine dialog, enter a name for the new engine.

13. From the Select Server drop down box, select the host on which the VA engine will run.

14. In the Select Type drop down box, select the type of VA Engine process to be created. In most instances, the Telephony Engine will be selected as the VA Engine type. This engine type processes input and output from the telephone system via a telephony card. The other possible VA Engine type, Sound Card Engine, is used when the Virtual Assistant application will receive input from a microphone and output sound to a system's speakers. The Sound Card Engine can be used to test new applications before connecting them to the telephone system.

Figure 23:
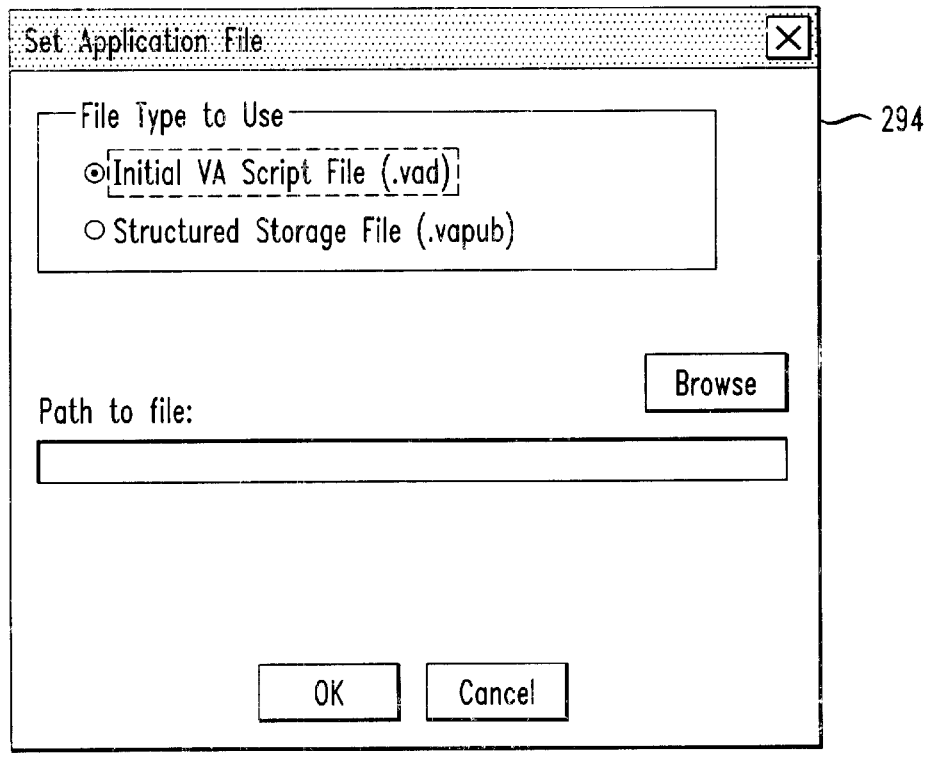
FIG. 23 is a screen shot of the Set Application File Dialog box.

15. Click OK. The Set Application File dialog 298 will appear, as shown in FIG. 23.

16. In the Path to file field, enter the full path to the vapub file for the application, or, click the Browse button and find the file using the Open File dialog. In the preferred embodiment, the .vapub file for the Conita VA application is located in the following directory:

%conitava%\VApplications\VAOutlook.pub where %conitava% indicates the installation path for the platform software (by default, C:\Program Files\Conita Virtual Assistant). For a custom-written VA application, the .vapub file will be located in the directory chosen by the developer when he or she published the application to the VA platform.

After clicking OK, the new application instance and its related server processes will be added to the component tree.

Creating an Application Instance without Associated Components

Although the various VA service components recommended for an application will probably create all at once, it is possible to create a VA application instance without associated services and add those components later. To do so, right-click the VA Applications node in the component tree and select New>Application Instance from the pop-up menu. On the initial screen of the Add Application Instance Dialog, make sure that all of the component boxes are unchecked. Although this procedure will create the application instance in the component tree, the application cannot be run until the recommended service processes have been created and associated with it. The steps for manually creating services and associating them with an application are discussed below.

Removing Application Instances

To remove an application from the Server Set, use the following procedure:

1. In the component tree, right click the node for the application to be deleted. A pop-up menu will open.
2. Select Delete from the pop-up menu.
3. A dialog box will open, listing all server processes linked to that application and asking whether to delete those processes along with the application.
   Select Yes to delete all server processes linked to the application.
   Select No to retain the linked server processes. (These processes can be deleted manually later if necessary)
   Select Cancel to abort the delete operation Creating Processes Manually Although an administrator most likely will use the Create Application feature mechanism to create VA Engine, TTS Server, and Recognition Server processes, a process can be created manually.

Manual creation can be used to associate additional processes with an existing application. An application that is running slowly, for example, may need to have a second Recognition Server associated with it to speed up the processing of recognition requests. By manually creating and associating the new process, the administrator avoids having to create the entire application from scratch.

Figure 24:
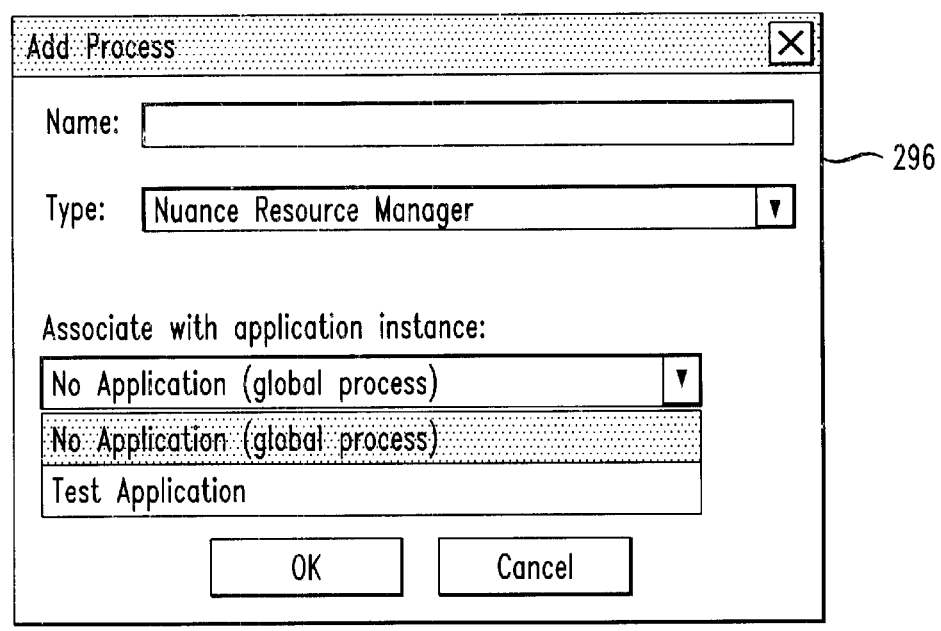
FIG. 24 is a screen shot of the Add Process Dialog box.

To create a new process, perform the following steps:

1. In the VA Management Console's component tree, right click the node for the server on which the process is to be created. A pop-up menu will open.
2. Select New>Process from the menu. The Add Process Dialog 296 will open, as illustrated in FIG. 24.
3. In the Name field, enter a name for the new process.
4. From the Type combo box, select the type of process to be created.

The default set of process types are listed in the table below:

| Type | Description |
| --- | --- |
| Accuvoice TTS Server | The service that performs Text-To-Speech translation |
| Nuance RecServer | The service that recognizes speech into text |
| Nuance Resource Manager | The Resource Manager is created automatically by the platform when a VA application instance is created. |
| Nuance License Manager | Recommended by the Nuance RecServer, the License Manager process supplies a valid license to the recognition server process. |
| External App | A custom-written VA application |
| Telephony Server | A COM object server that provides an interface between the VA platform and the telephony hardware APIs |

5. From the Associate with application instance combo box, select the name of the application with which the process is to be associated. To create a global process, select "No Application."
6. Click OK. The new process will be added to the component tree Starting VA Application Services For a VA application to be able to handle incoming calls, all of its related services should be running. An administrator has the option to configure each service as "auto-start," which indicates that when a system is rebooted the VA Server Manager will automatically attempt to start all of its registered services.

There are times, however, when a VA administrator will need to start or stop services manually. These situations include the following:

When a new application has been added to the system and needs to be started for the first time When the platform needs to be brought down for maintenance When a process has been terminated due to an error and could not be automatically restarted by the VA Server Manager An administrator can choose to start or stop all of services running on a platform, all of an individual application's services, or each service individually.

Configuring Auto-Start Services

When a VA service process is created (either manually or through the creation of a new application instance), its auto-start property is by default set to False, indicating that the service will not automatically be started by the VA Server Manager at system start-up. If desired, an administrator can change the auto-start property for a service by clicking on the service's node in the component tree and, in the properties page that appears in the right-hand window, checking or unchecking the Auto-Start check box.

In most instances it will be desirable for all platform processes to be set to auto-start, which will save administrators from having to manually start the services when a server is rebooted. For this reason, it is recommended the Auto-Start option be selected for each associated service after an application is created.

Starting All Services (Global)

The global function will attempt to start all of the services currently being used in the server set, including TTS Servers, Recognition Servers, VA Engines, License Managers, and Resource Managers. This function, in effect, starts all the registered applications on the platform and prepares them to receive incoming calls.

The procedure for starting all services is as follows:

1. Right-click the VA Manager node in the component tree. A pop-up menu will open.
2. From the menu, select Start All Processes Service Process Start Orders When a global start-up is performed, all global service processes (such as the Nuance License manager) are started first, and then all per-VA Application processes (such as TTS Server and Recognition Servers) are started. Within these two categories (global and per-application), the order in which services are started is determined by Startup Groups. Based on its dependencies, each process type is assigned to a group, and each group is assigned a number indicating in which order it should be started (from lowest to highest). Each process in a group is started at roughly the same time. The default Startup Order Groups are listed in the table below:

| Type | Startup Order Group |
|---|---|
| Telephony Server | 1 |
| External App | 1 |
| Nuance Resource Manager | 2 |
| Nuance License Manager | 2 |
| Accuvoice TTS Server | 2 |
| Nuance RecServer | 3 |
| Sound Card Engine | 4 |
| Telephony Engine | 4 |

As the table indicates, the telephony servers and external application services will be started first, and the two types of VA Engines (sound card and telephony) will be started last. Because a Telephony Engine cannot be started unless its associated TTS Server is already running, the engine is assigned to higher-numbered group than the TTS Server, guaranteeing they will be started in the proper order.

Starting All Services for an Application

An administrator can also start services at an application level. This function will attempt to start all the processes associated with a particular application. These processes usually include VA Engines, TTS Servers, and Recognition Servers.

To start all the services for an individual application, perform the following steps:

1. Expand the VA Applications node in the component tree.
2. Right-click on the node for the application for which all services are to be started.
3. Select Start from the pop-up menu.

Once an application is started, it will be ready to receive incoming calls.

When an application is started, the VA Server Manager will first verify that any global services (such as the Nuance License Manager) needed for the application are already running. If a global dependency is not running, none of the application's services will be started and an error message will be displayed.

Starting Individual Services

Although in most instances either the global or application start-up functions will be used, at times only a single service may need to be started. To do so, right-click the component to start and select Start from the pop-up menu. As with starting an application, any global processes recommended by the individual service should already be running. Otherwise, the service will fail to start. Note: Alternatively, a service can be started manually by highlighting its name in the component node and clicking the Start (arrow) button on the MMC Snap-In's toolbar.

Troubleshooting Services that Fail to Start

Figure 25:
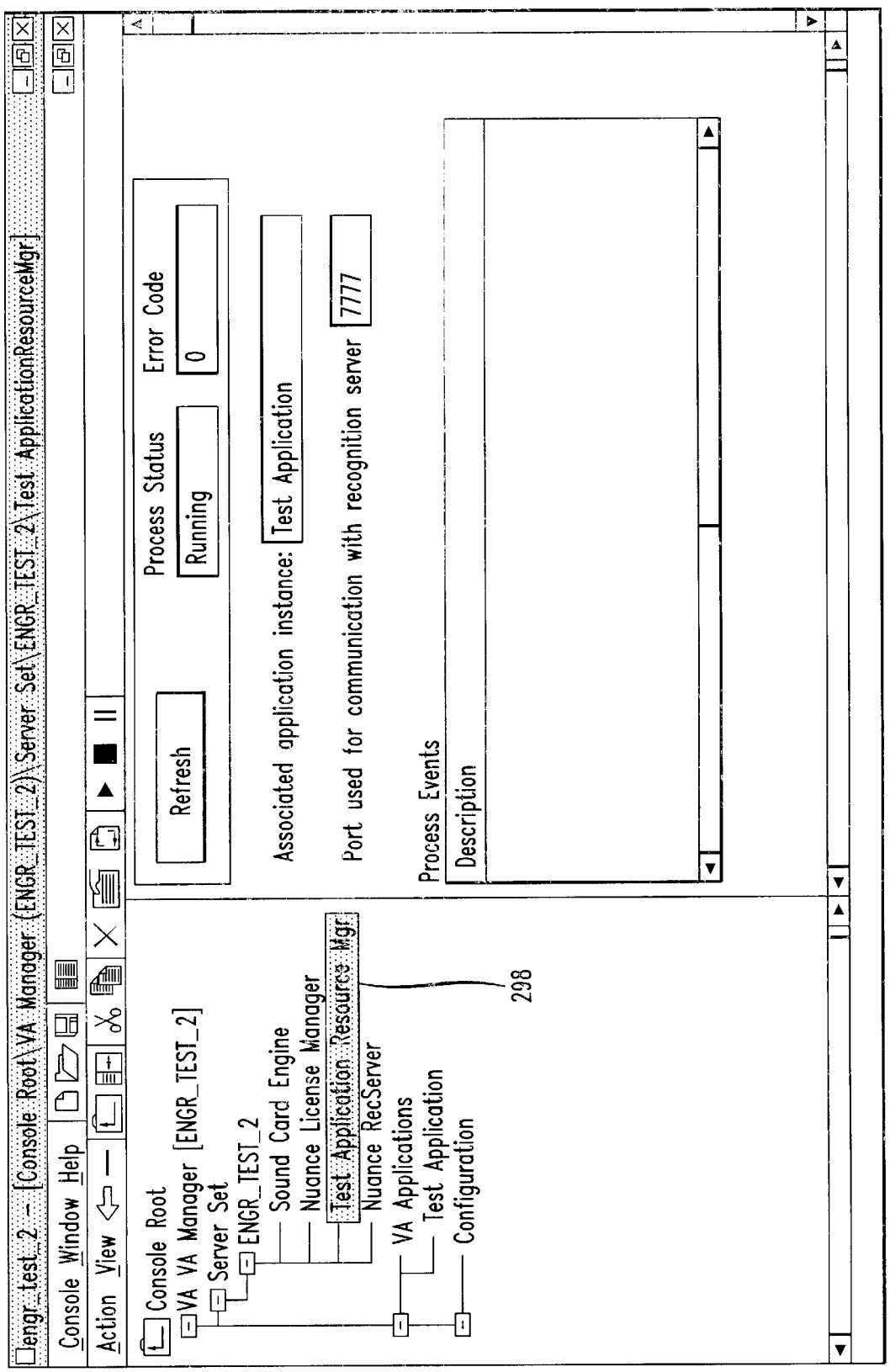
FIG. 25 is a screen shot of the Properties Display Panel for a Resource Manager Service.

To check on the status of a particular service, view its properties display panel. This panel appears in the right-hand window of the VA Management Console GUI when the service's name is clicked on in the component tree. As illustrated in FIG. 25, the user has highlighted the TestApplicationResourceMgr node, which is the Nuance Resource Manager for the TestApplication application. The properties for the service appear in the right-hand part of the screen.

On this properties panel, the Process Status field indicates the status of the process. It can have one of the following values:

Running: The process is running properly

Stopped: The process has been stopped by an administrator

Error: The process has failed to start because of an error

If the process has an Error status, then the code for the error will be displayed in the Error Code field. This error code—a hexadecimal number—indicates the reason for the process's failure. A complete listing of the possible error codes and their meanings is set forth below. If one or more of the processes for an application fail to start, the displayed error code can be looked up to determine the reason for the failure.

In addition to displaying an error code, a failed process may also list troubleshooting information in the large Process Events text box on its properties panel. One of the most common causes for a component's failure to start is that one of its prerequisite services is not running. A VA Engine, for example, will not start if its TTS Server is not running. A Recognition Server will not start if its License Manager service is not already running. If a particular component has failed to start, make sure that all its associated services are running correctly and, if they are not, attempt to start them.

Stopping VA Services

As with starting VA services, the administrator has several options to choose from when shutting down services on the VA platform. When VA services are stopped, the applications will cease execution and no incoming calls can be received.

Shutting Down Gracefully

In the preferred embodiment, the method for shutting down a VA platform is to use the Stop All (Graceful) function. This function immediately sets the platform so that it will not receive any new incoming calls, but it does not disconnect any current VA sessions. Once all active sessions are complete, the platform will be shut down.

To perform a graceful shutdown, do the following:

1. Right-click the VA Manager node in the component tree. A pop-up menu will open.
2. From the menu, select Stop All (Graceful).
3. Provide a prompt to confirm the shutdown command. Select Yes to proceed.

Shutting Down Immediately

In some cases, an administrator may need to stop all services on the platform immediately. Doing so will disconnect all current VA sessions and close all the platform's applications. To perform an immediate shutdown, 1. Right-click the VA Manager node in the component tree. A pop-up menu will open.
2. From the menu, select Stop All (Immediate).
3. A prompt will be provided to confirm the immediate shutdown command. Select Yes to proceed.

Stopping Individual Applications and Services

The VA Management Console includes functions that allow a particular application or an individual service to be stopped. To do so, perform the following steps:

1. Expand the component tree until the node for the application or service to stop is complete
2. Right-click the node for the application or service and select Stop from the pop-up menu.

Configuring Alerts

The VA platform includes an alert feature that allows the administrator to be paged when selected system errors occur.

Figure 26:
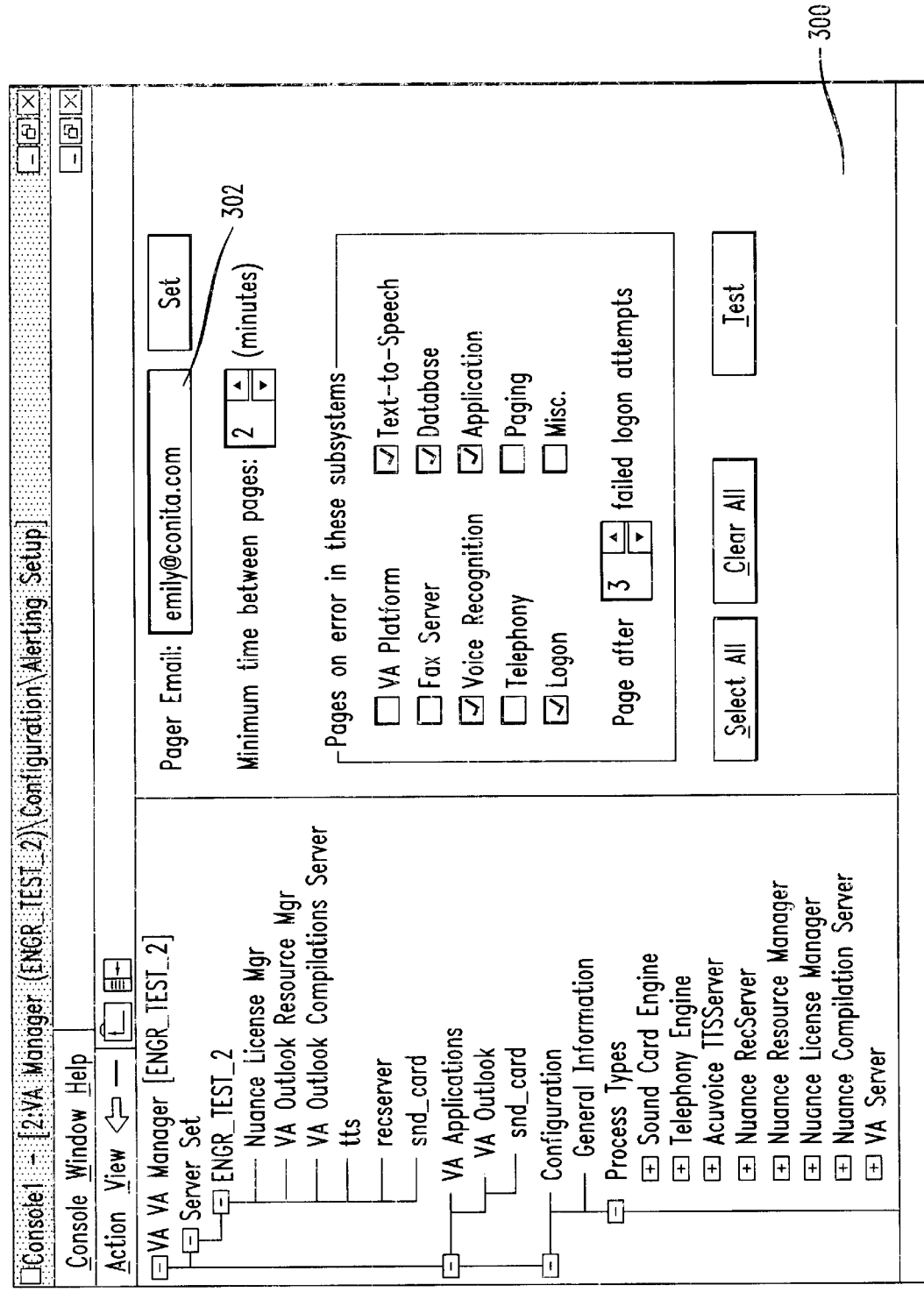
FIG. 26 is a screen shot of the Alert Configuration Interface.

Such alerts are sent via email pager, and the administrator can configure the type of errors to be monitored and how frequently he or she should be paged. To configure the alerts, double click on the Alerting Setup node under the component tree's Configuration folder. As shown in FIG. 26, the alert configuration interface 300 will appear in the right-hand frame. In this interface, enter the administrator's pager email address in the Pager Email field 302 and click the Set button, then select the minimum amount of time between pages. It is recommend that an interval is selected (such as 10 minutes) that is long enough to prevent the administrator from being inundated with repeated messages for the same recurring error, but is short enough that the administrator will be informed in case a different error occurs. In the checkbox frame, select the subsystems to be monitored for errors. The Select All and Clear All buttons can be used to select or clear all of the checkboxes at once. If Logon errors is selected, the number of failed logon attempts that should occur before the administrator is notified should be specified. After selecting paging options, click the Test button to have a test message sent to the email pager.

Using the TTS Dictionary

By default, the TTS server is configured with pronunciation strings for most common English words. For other words—such as technical terms and proper names—the server uses an algorithm to determine the most likely pronunciation. In many cases, this algorithm may lead to a word's being pronounced incorrectly. For example, the TTS system may pronounce the name Conita as "Co-knit-ah" rather than the correct "Co-night-ah." The TTS Dictionary feature allows the correction of the TTS's pronunciation of words and phrases. The mechanism works by simple string substitution, that is, whenever the TTS engine encounters a specified string, it will replace it with a more phonetically accurate version before processing the text. An administrator could, for example, specify that the TTS engine replace all occurrences of the string "Conita" with "Conighta" before translating it to speech. Such a substitution would result in the correct pronunciation of the word.

Setting TTS Dictionary Entries

Figure 27:
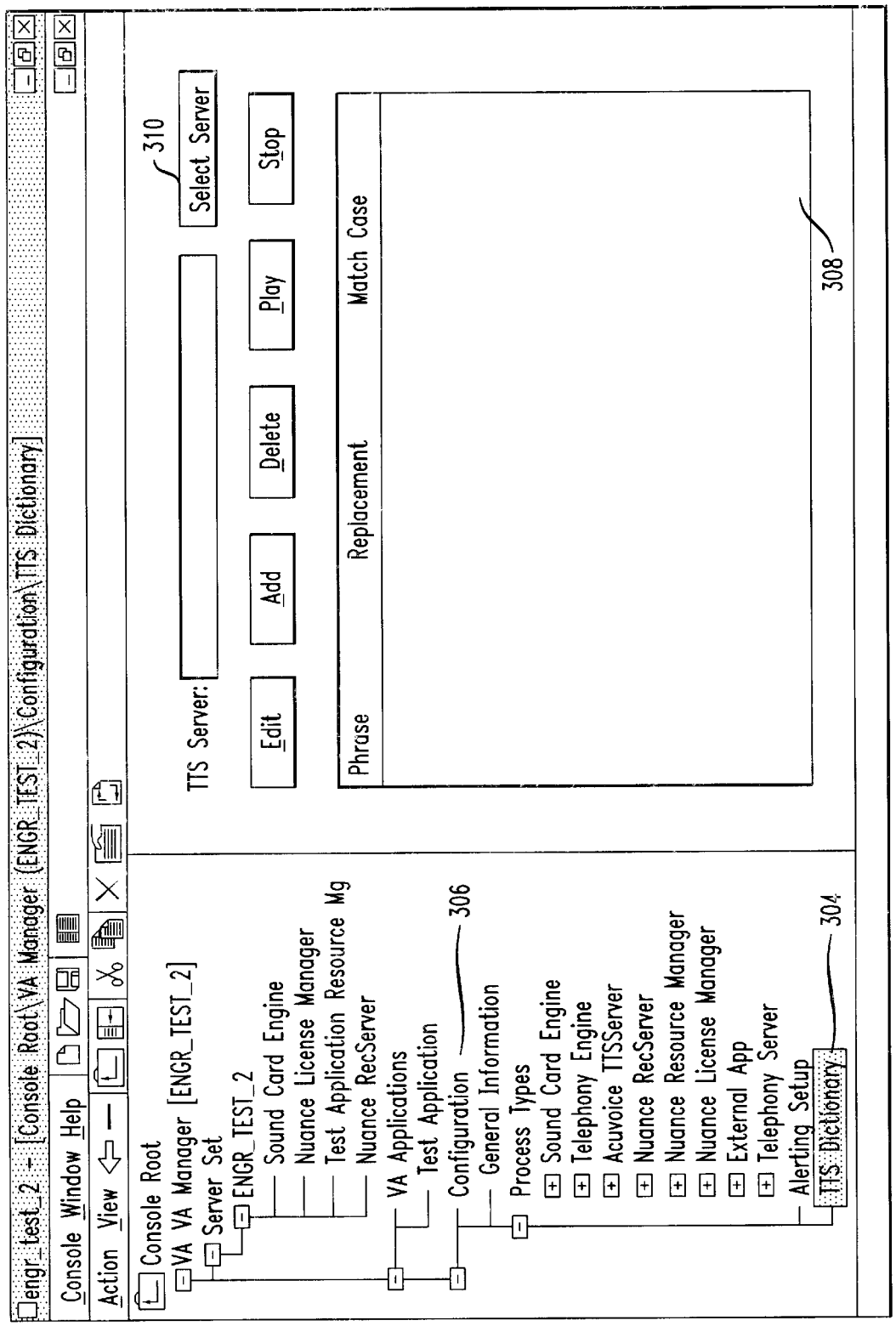
FIG. 27 is a screen shot of the TTS Dictionary Display.
Figure 28:
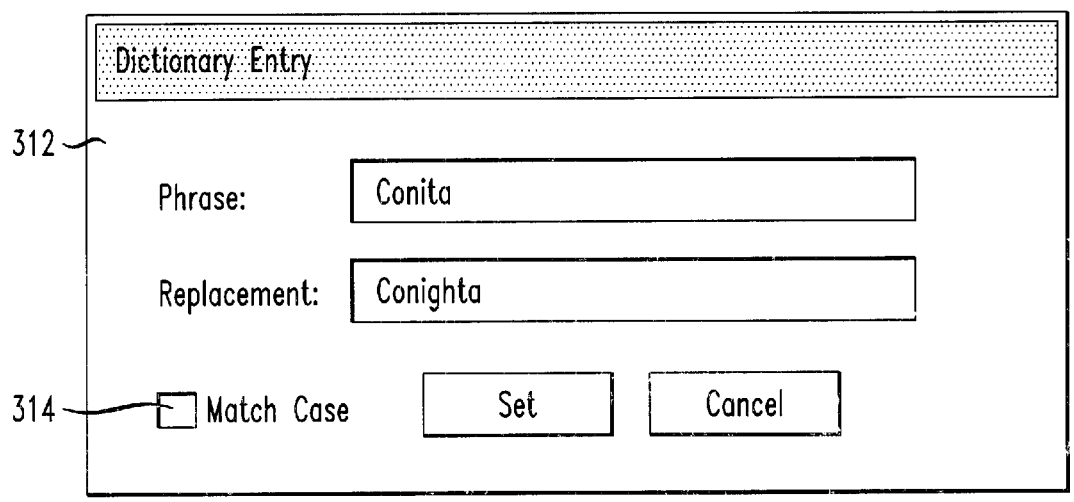
FIG. 28 is a screen shot of the Dictionary Entry Dialog box.

As shown in FIG. 27 to view the current TTS Dictionary entries on the system, click the TTS Dictionary node 304 under the component tree's Configuration folder 306. The TTS Dictionary display 308 will appear in the right-hand pane. The dictionary should be configured separately for each TTS server. To display the entries for a particular server, click the Select Server button 310 and select the name of the desired TTS server. As illustrated in FIG. 28, to add a new entry to that server's dictionary, click the Add button. The Dictionary Entry dialog 312 will be displayed. In this dialog, enter the actual spelling of the word or phrase and the replacement string that should be used for a correct pronunciation. By default, all string replacements are not case sensitive. Selecting the Match Case checkbox 314 will make the matching case sensitive. It may take some experimenting to find a replacement string that will result in the proper pronunciation for a word. Use the Play button on the TTS Dictionary display screen to test a particular entry. When this button is clicked, the highlighted entry will be sent to the TTS Server and the resulting speech output played over the server's speakers.

Managing the VA Database and Call Logs

The VA Database, which is hosted by the Server Set Controller Node, is used by the VA Server Manager to store call log and platform configuration data. This database is implemented with the Microsoft Data Engine (MSDE). MSDE, which was released with the Microsoft Office 2000 suite, provides access to databases that are compatible with SQL Server 7.0, though with a smaller set of features. The engine does not include an interface such as the SQL Server Enterprise Manager, and it supports a maximum database size of 2 GB (compared to SQL Server's 32 TB). MSDE databases, however, can be read by the SQL Server interfaces, and they can be upgraded to SQL Server databases if increased size is needed.

Using the VA Management Console to Manage the Database

Figure 29:
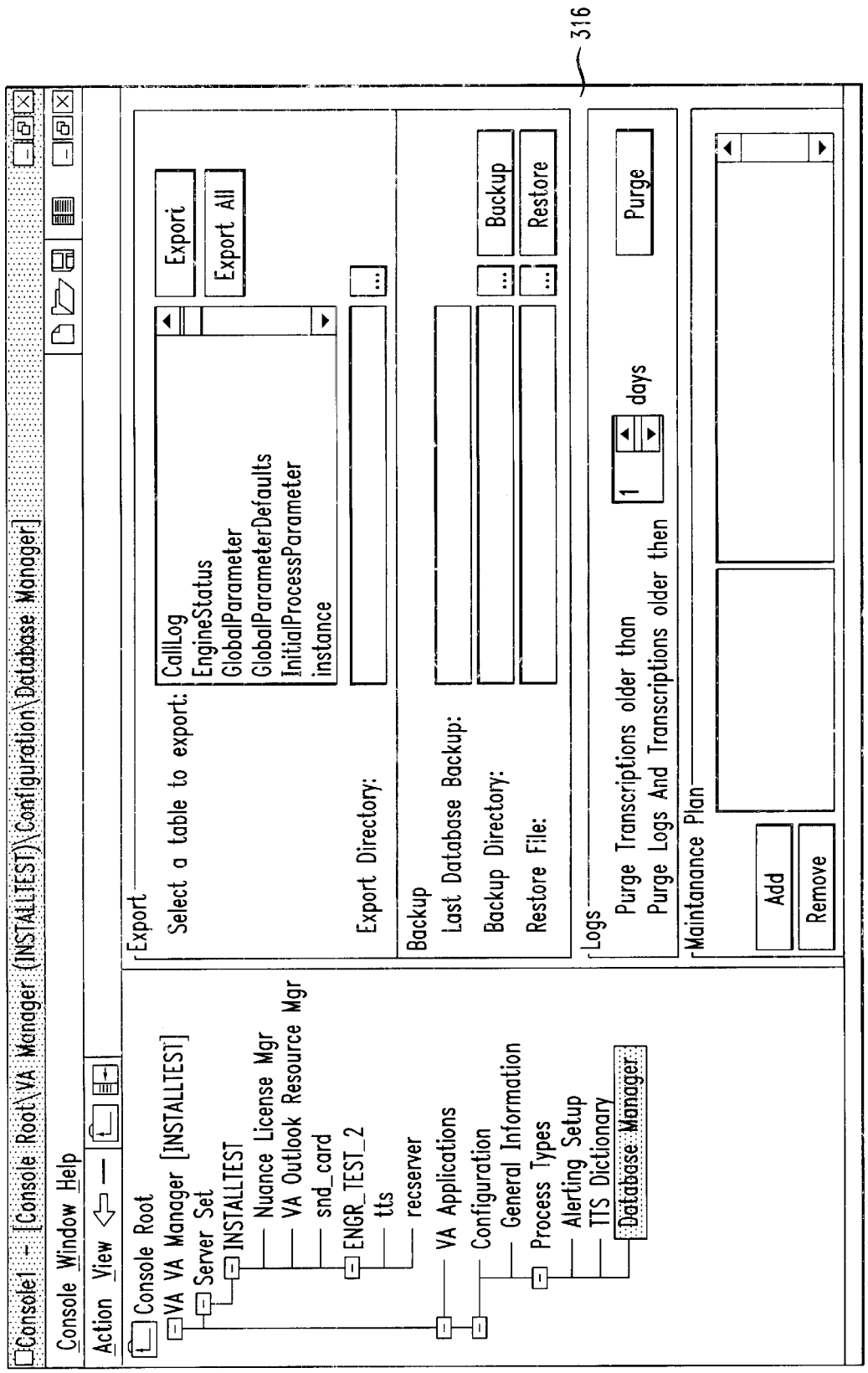
FIG. 29 is a screen shot of the Database Manager Panel.

Because MSDE does not include its own user interface, most management tasks for the VA Database will be performed through the VA Management Console application. As Included in the console's component tree is a node called Database Manager which, when highlighted, will cause the database management panel 316 to be displayed in tight side of the console window, as shown in FIG. 29.

Backing up the Database

The configuration parameters and user information stored in the database are essential to the operation of the VA platform. For this reason, the database should be regularly backed up. In the Backup frame on the Database Manager panel, the Last Database Backup field indicates when the last backup of the current VA database occurred. It is recommended that the VA database be backed up regularly. The directory in which the database will be backed up is indicated in the Backup Directory field. To change this, edit the field's value directly or click the browse button and select the new directory from a Browse for Folder dialog. To back-up the VA database, click the Backup button.

Restoring the Database

In case of a VA database failure, the database can be restored from a back-up. To do so, in the Restore File field enter the name of the back-up file from which to restore the database (or, click the browse button and choose the filename from an Open File dialog). Then, click the Restore button to begin the restoration.

Purging Call Logs and Transcriptions

The VA Server Manager maintains logs and transcriptions for all of the calls processed by the VA platforms. These logs are vital not only for diagnosing problems with the systems but also for performing accounting tasks such as billing departments for VA usage. These stored files, however, can grow quite large, particularly on platforms with many users; the logs and transcriptions should be purged periodically to free up disk space. The frequency with which these purges will need to be performed will depend upon the record-keeping needs of the organization and the amount of disk space available on the VA platform.

To purge call transcriptions and/or logs, perform the following steps:

1. Select either the Purge Transcriptions older than or Purge Logs and Transcriptions older than option button.
2. In the Days combo box, indicate how many days to retain transcriptions and/or logs.
3. Click the Purge button to purge all outdated transcriptions and/or logs.

Establishing Maintenance Plans

1. Although the database can be backed up and transcriptions and logs can be purged manually, it is usually much more convenient for an administrator to establish a Maintenance Plan, which allows scheduling of regular backup and purge operations. A new Maintenance Plan is added by clicking the Add button inside the Maintenance Plans frame.

Removing Maintenance Plans

To remove an unneeded maintenance plan, highlight the plan in the list box and click the Remove button.

User Administration Concepts

Figure 30:
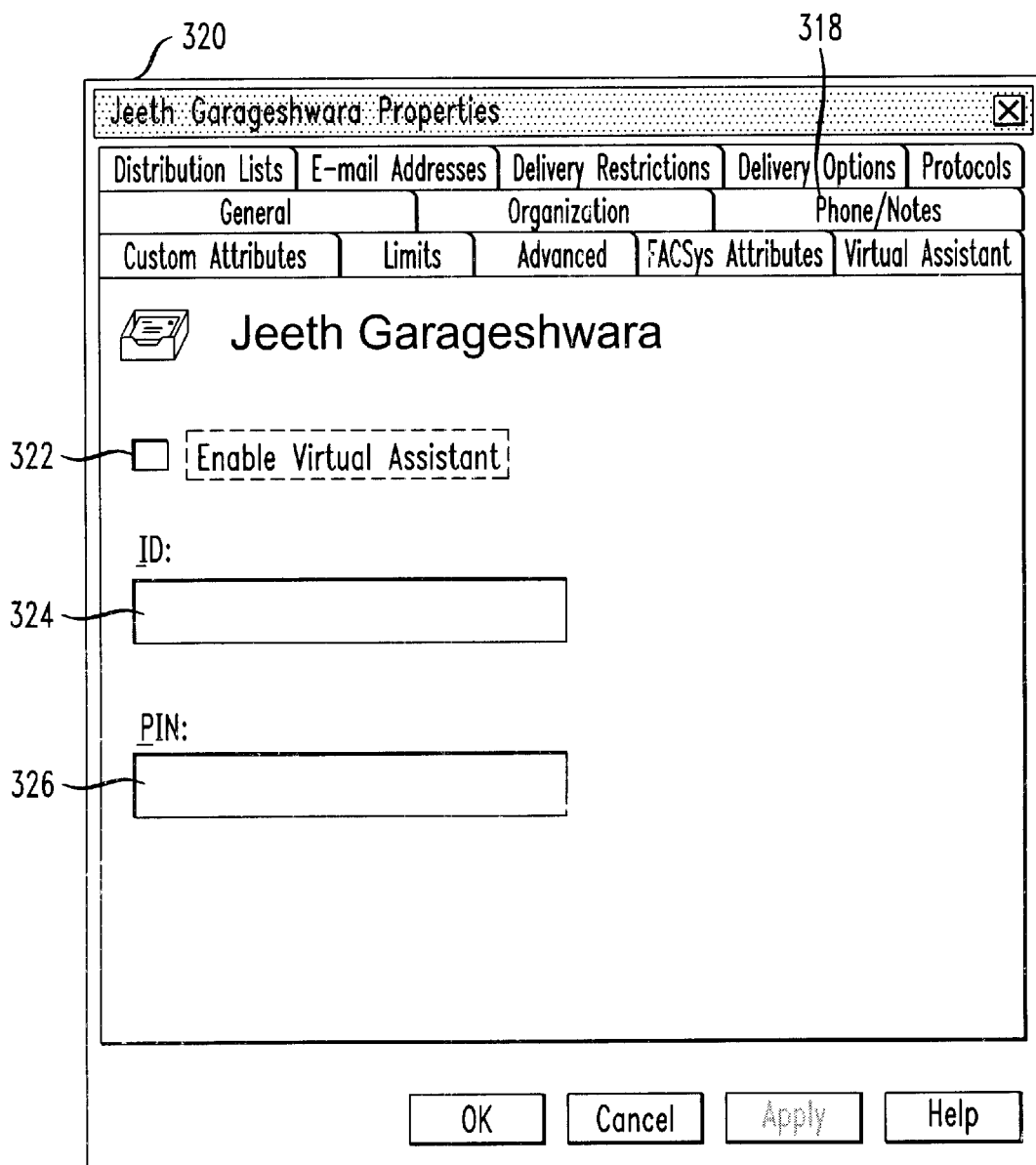
FIG. 30 is a screen shot of the Mailbox Properties Dialog with Virtual Assistant Tab.

With the default VA application, all user account management functions are performed through the Microsoft Exchange Administrator interface. The majority of these functions are regular Exchange tasks (such as mailbox maintenance) that are unrelated to the Virtual Assistant application. For the few VA-specific administration tasks that are recommended, the VA Exchange Server Extension installation inserts a custom Add-In to the Microsoft Exchange Administrator application. As illustrated in FIG. 30, this installation adds a new tab called Virtual Assistant 318 to the Mailbox Properties Dialog 320 for each user. This tab is used to edit the user's VA properties.

VA User Administration Tasks

An administrator uses the VA Exchange Add-In to enable and disable VA users, and to assign IDs and PIN's for VA users.

VA User Account Information

The Conita VA application requires the following information for each user account:

User ID, which corresponds to the DNIS number that callers will dial to access a particular user's VA. For example, if John Smith dials 555-1213 to access his Virtual Assistant, then his User ID will be 5551213. In any environment with multiple users, the User ID/DNIS number is essential for identifying which user's Virtual Assistant is being called. When an incoming call is received, the VA application automatically detects the DNIS number and uses it to identify the VA user for which the call is intended. The User ID should be exactly seven digits.

PIN—In addition to a User ID, each user account requires a Personal Identification Number, which will be entered by the user when he or she dials into the Virtual Assistant. The PIN can be any 4-digit number. The initial PIN for each user is assigned by the VA administrator when he or she sets up the user's account. Users can change their PIN numbers as desired through the Virtual Assistant preferences tab in their Microsoft Outlook application.

Enabling and Disabling VA Users

When the VA Exchange Extension package is first installed, the Virtual Assistant tab will be added to each user's mailbox properties dialog, but the user will not be registered with the VA system. Before these users can begin interacting with their Virtual Assistants, the administrator should enable each of them as a VA user. To enable a VA user, perform the following steps:

1. In the Microsoft Exchange Administrator application, expand the site and container nodes under which the VA user accounts are located.
2. Double click the node for the user that to be enabled as a VA user. Returning to FIG. 31, the Mailbox Properties Dialog 320 for that user will open.
3. Click the Virtual Assistant tab 318.
4. Check the box 322 next to Enable Virtual Assistant (see figure below), then click Apply. The ID and PIN text boxes will become enabled.
5. In the ID field 324, enter the User ID/DNIS number that will be used to access this user's Virtual Assistant account.
6. In the PIN field 326, enter the initial Personal Identification Number that the user will have to enter to access his or her account.

Note: When setting up user accounts for the first time, all users can be assigned the same PIN (e.g. '1111') and requested that they change it t a new value when they first log in. Users can change their PIN's through the Virtual Assistant properties tab within their Microsoft Outlook applications.

7. Click OK to accept the new VA settings for the user.

Disabling a VA User Account

To disable a VA user's account, the following steps should be performed:

1. In the Microsoft Exchange Administrator application, expand the site and container nodes under which the VA user accounts are located.
2. Double click the node for the user to be disabled. The Recipients Properties Dialog for that user will open.
3. Click the Virtual Assistant tab.
4. Uncheck the box next to Enable Virtual Assistant, then click Apply. The ID and PIN text boxes will be greyed out.
5. Click OK to accept the changes.

When a user account is disabled, that user can no longer dial into his or her Virtual Assistant. When a VA user account is disabled, the User ID and PIN are not retained. These properties should be entered again by the administrator if the account is re-enabled.

Batch Account Enabling and Disabling

Included with the VA Exchange Extensions is a utility that can be used to enable or disable all of the VA user accounts in a single batch. This utility is most useful for quickly disabling all VA accounts before removing the VA Exchange Extensions from the Exchange Server. Note: When a VA user account is disabled, the User ID and PIN are not retained. These properties should be entered again by the administrator if the account is re-enabled.

To launch the Enable/Disable utility, select Start>Programs>Conita Virtual Assistant User Administration>Enable/Disable Virtual Assistant. The utility presents two choices, enable or disable:

If disable is selected, then all users will have their VA accounts disabled

If enable is selected, then all user accounts will be enabled. For these newly enabled accounts, the User ID and PIN numbers will remain undefined and should be set for each user by the administrator.

An additional task that this utility will perform is repair. If the VA Exchange administrative user is deleted or that user's Contacts folder is corrupted, then users cannot use their VA. However, all the VA information for the VA users is still valid. Creating a new VA Exchange administrative user and selecting the repair in the utility will repair the VA Exchange administrative user's knowledge of VA users, and allow users to access their VA again.

Setting DCOM Permissions

At install time, the Virtual Assistant platform software registers the following DCOM objects:

VADBManager
VAEngine
VAExternalApp
VAManager
VAServer
VAServerManager
VATelephony
VATextToSpeechAcuVoice
VATextToSpeechBT The security parameters for these DCOM objects are set automatically by the Install Shield. The default values for each of the objects is as follows:

Access Permissions: Allow access to the ConitaVA user account

Launch Permissions: Allow launch to the ConitaVA user account

If necessary for a particular site's security arrangements, a VA administrator can modify the DCOM configuration. However, because setting improper parameters can prevent the VA services from running, such modifications should be made only by an administrator with advanced DCOM experience.

Because the VA Manager processes should be able to access and launch other VA DCOM objects, the ConitaVA user account (or which ever user account under which the VA processes are running) should have access and launch permissions for all VA objects.

Resetting DCOM Permissions

In case the DCOM settings for the VA platform objects are modified, a utility called vladcom is available to reset the objects to their original configuration. This utility is copied to the VA bin directory at install time. To use vladcom to reset the DCOM permissions of VA objects, perform the following steps:

1. Open a DOS command line window.
2. Change to the c:\Program Files\Conita Virtual Assistant\bin directory.
3. Execute the following command:
   vladcom -cf dcomcfg.txt -pf DCOM_progid.txt -id <domain>\<user>
   Where <domain> is the server's NT domain and <user> is the NT username under which the VA services are running (e.g. "ConitaVA").

Securing File System Data

The VA platform installation routine automatically sets the access permissions for each directory that it creates. The following user accounts are granted Full Control of all the directories under the root install path (by default, c:\Program Files\Conita Virtual Assistant):

Domain Administrator

Local System Administrator

System

ConitaVA

All other user accounts are granted permission to these directories.

If a system's security arrangements require it, these permissions can be modified to grant or deny access for other accounts. However, because the ConitaVA account should have access to the VA directories, it should always grant be granted Full Control.

VA Database Security

When the VA platform software is installed on the Server Set Controller Node, the installation routine automatically sets the MSDE database (and/or SQL Server, if it is being used instead) to NT Authentication only. The ConitaVA NT account will then be used by the platform software to access the VA database. This setting of authentication is effective at the server-level, not the database level. If other MSDE and/or SQL Server databases are supported on the Controller Node, however, the SQL Server authentication methods may be set for these databases. The VA-established authentication can be modified by performing the following steps:

1. In the SQL Server Enterprise Manager, change the authentication method for the entire server to SQL Server authentication
2. Change the authentication method for the VA Database to NT Authentication.

No matter which method is used for the server-wide authentication, the database-specific method for the VA Database should be NT Authentication.

Error & Message Codes

The first three digits of the code indicate which type of message the code represents. These digits can have one of three values, as indicated below:

0x0 Success Message

0x4 Informational Message

0x8 Warning Message

0xC Error Message

The complete set of possible error codes and their descriptions are listed in the table below.

Notes:

The entries in the table are ordered numerically by the code, but the first three digits are ignored. 0x40000034, for example, appears immediately after 0xC0000033.

This table lists only those errors and messages generated by the VA platform software. The VA Management Console interface, however, will also report messages generated by Windows NT. If an error displayed in the Management Console does not appear in this list, it is likely an NT error.

Windows NT error codes can be translated using the Error Lookup feature of Microsoft Developer Studio.

| Message Code | Description |
| --- | --- |
| 0xC0000001 | VAVM ALREADY STARTED |
| 0xC0000002 | VAVM ERROR PARSING VADL STRING |
| 0xC0000003 | VAVM ERROR PARSING VADL FILE |
| 0xC0000004 | VAVM EXTERNAL MODULE NOT FOUND |
| 0xC0000005 | VAVM MODULE NAME ALREADY EXPORTED |
| 0xC0000006 | VAVM START DISCOURSE NOT SPECIFIED |
| 0xC0000007 | VAVM DISCOURSE NOT DEFINED |
| 0xC0000008 | TTS NOT INITIALIZED |
| 0xC0000009 | TTS NULL STRING |
| 0xC000000A | TTS UNKNOWN TYPE |
| 0xC000000B | AUDIO STREAM NOT DEFINED |
| 0xC000000C | AUDIO STREAM FORMAT NOT SUPPORTED |
| 0xC000000D | AUDIO STREAM OVERFLOW |
| 0xC000000E | TTS RENDER STRING ERROR |
| 0xC000000F | TFS SYNTHESIS FAILED |
| 0xC0000010 | WRITE OPERATION FAILED |
| 0xC0000011 | VAVM INTERNAL ERROR |
| 0xC0000012 | VAVM GETSCRIPTINGHOST FAILED |
| 0xC0000013 | VAVM INVALID DISPID FOR NAMESPACE |
| 0xC0000014 | VAVM NAMESPACE MEMBER NOT DEFINED |
| 0xC0000015 | VAVM INVALID DISPID FOR RECRESULT |
| 0xC0000016 | VAVM INVALID TYPE FOR RECRESULT |
| 0xC0000017 | VAVM SCRIPT ITEM NAME ALREADY DEFINED |
| 0x40000018 | VAVM SHUTDOWN |
| 0x40000019 | VAVM REMOTE HANGUP |
| 0xC000001A | VAVM BARGE IN |
| 0xC000001B | VAVM NO ACTIVE CALL |
| 0xC000001C | VAVM RECOGNITION ERROR |
| 0x4000001D | VAVM RECOGNITION UNRECOGNIZED |
| 0xC000001E | SPEECH INITIALIZE ERROR |
| 0xC000001F | SPEECH UNINITIALIZE ERROR |
| 0xC0000020 | SPEECH GRAMMAR ERROR |
| 0xC0000021 | SPEECH ABORT ERROR |
| 0xC0000022 | SPEECH RECOGNITION ERROR |
| 0xC0000023 | SPEECH SETPARAMETER ERROR |
| 0xC0000024 | TELEPHONY INITIALIZE ERROR |
| 0xC0000025 | TELEPHONY NOT INITIALIZED |
| 0xC0000026 | TELEPHONY UNINITIALIZE ERROR |
| 0xC0000027 | TELEPHONY ANSWER CALL ERROR |
| 0xC0000028 | TELEPHONY TERMINATE CALL ERROR |
| 0xC0000029 | TELEPHONY PLACE CALL ERROR |
| 0xC000002A | TELEPHONY TRANSFER CALL ERROR |
| 0xC000002B | TELEPHONY INVALID CALLID |

| Message Code | Description |
|---|---|
| 0xC000002C | TELEPHONY RECORD ERROR |
| 0xC000002D | TELEPHONY STOP RECORD ERROR |
| 0xC000002E | TELEPHONY PLAY ERROR |
| 0xC000002F | TELEPHONY SETPARAMETER ERROR |
| 0xC0000030 | TELEPHONY GETPARAMETER ERROR |
| 0xC0000031 | TELEPHONY CHANNEL CLOSED |
| 0xC0000032 | PROCESSID OUT OF RANGE |
| 0xC0000033 | DELETED PROCESS |
| 0x40000034 | VAMANAGER PARAMETER CHANGE |
| 0xC0000035 | VAMANAGER PERFMON FAILED |
| 0xC0000036 | INSUFFICIENT MEMORY RESOURCES |
| 0xC0000037 | COUNTER ARRAY TOO SMALL |
| 0x40000038 | INACTIVITY TIMEOUT |
| 0xC0000039 | VAVM INITIALIZATION ERROR |
| 0xC000003A | VAVM TOPTC NOT FOUND |
| 0xC000003B | VAVM STARTUP ERROR |
| 0x0000003C | VAVM STARTUP COMPLETE |
| 0xC000003D | VAVM NOT IMPLEMENTED |
| 0xC000003E | VAVM GRAMMAR NOT DEFINED FOR DISCOURSE |
| 0xC000003F | VAVM SCRIPTING ERROR |
| 0xC0000040 | TTS INITIALIZE ERROR |
| 0x40000041 | BEGIN CALL |
| 0x40000042 | USER LOGIN |
| 0x40000043 | END CALL |
| 0x40000044 | BEGIN SESSION |
| 0x40000045 | END SESSION |
| 0x80000046 | TTS TOO MANY CHANNELS |
| 0x80000047 | TTS SEND FAILED |
| 0xC0000048 | SYSTEM ERROR |
| 0xC0000049 | DCOM ERROR |
| 0x0000004A | TTS ABORTED |
| 0x4000004B | TTS CLIENT CONNECTED |
| 0x4000004C | TTS CLIENT DISCONNECTED |
| 0xC000004D | VAMANAGER PROCESS TERMINATED |
| 0x4000004E | VAMANAGER PROCESS STARTING |
| 0xC000004F | VAMANAGER PROCESS FAILED TO START |
| 0xC0000050 | TTS UNKNOWN STRING TYPE |
| 0xC0000051 | VAVM PROMPT RESOURCE NOT FOUND |
| 0xC0000052 | VAVM PROMPT INVALID RESOURCE |
| 0xC0000053 | VAVM INVALID PROMPT EXPRESSION |
| 0xC0000054 | VAVM INVALID PROMPT RESOURCE |
| 0xC0000055 | VAVM NOT SUPPORTED |
| 0xC0000056 | VAMANAGBR WRITE TO LOG FILE FAILED |
| 0xC0000057 | VAMANAGER INVALID COMPONENT ID |
| 0xC0000058 | VAMANAGER PROCESS NOT FOUND |
| 0xC0000059 | VAMANAGER PROCESS ALREADY EXIST |
| 0xC000005A | VAMANAGER CANNOT DESTROY RUNNING PROCESS |
| 0xC000005B | VAMANAGER COMPONENT NOT FOUND |
| 0xC000005C | USER ALREADY SELECTED |
| 0xC000005D | USER NOT SELECTED |
| 0xC000005E | USER NOT FOUND |
| 0xC000005F | USER ALREADY EXIST |
| 0xC0000060 | USER UPDATE FAILED |
| 0xC0000061 | USBR CREATION FAILED |
| 0xC0000062 | UNKNOWN AUTH METHOD |
| 0xC0000063 | USER NOT AUTHENTICATED |
| 0xC0000064 | UNKNOWN IDENT METHOD |
| 0xC0000065 | DUP IDENT VALUE |
| 0xC0000066 | PARAMETER CREATION FAILED |
| 0xC0000067 | PARAMETER UPDATE FAILED |
| 0xC0000068 | BUFFER TOO SMALL |
| 0xC0000069 | PERMISSION DENIED |
| 0xC000006A | DATABASE ERROR |
| 0xC000006B | VASERVER RULE CREATION FAILED |
| 0xC000006C | VASERVBR RULEID ALREADY EXIST |
| 0xC000006D | VASERVER RULEID NOT FOUND |
| 0xC000006E | VASERVER USER HAS PENDING REQUEST |
| 0xC000006F | POPMON NOT INITIALIZED |
| 0xC0000070 | POPMON ALREADY INITIALIZED |
| 0xC0000071 | POPMON RULES ENGINE NOT SPECIFIED |
| 0xC0000072 | POPMON DUPLICATE RULE |
| 0x40000073 | POPMON USER RELEASED |
| 0xC0000074 | POPRULE SYNTAX ERROR |
| 0xC0000075 | POPRULE UNDEFINED KEYWORD |
| 0xC0000076 | POPRULE WRONG NUM PARAMS |
| 0xC0000077 | POPRULE EMPTY RULE |
| 0x80000078 | SITEMANAGER SELECTSITE FAILED |
| 0x80000079 | SITEMANAGER ADDSITE FAILED |
| 0x8000007A | SITEMANAGER REMOVESITE FAILED |
| 0x8000007B | SITEMANAGER ENUMERATION ERROR |
| 0x8000007C | SITEMANAGER SELECTCOMPUTER FAILED |
| 0x8000007D | SITEMANAGER ADDCOMPUTER FAILED |
| 0x8000007E | SITEMANAGBR REMOVECOMPUTER FAILED |
| 0x8000007F | SITEMANAGER SETPARAMETER FAILED |
| 0xC0000080 | SITEMANAGER CONNECT FAILED |
| 0x80000081 | SITEMANAGER SETSITENOTIFY FAILED |
| 0x80000082 | SITEMANAGER SELECTPROCESS FAILED |
| 0x80000083 | SITEMANAGER ADDPROCESS FAILED |
| 0x80000084 | SITEMANAGER PROCESSCOMMAND FAILED |
| 0xC0000085 | SITEMANAGER CONNECTLOCAL FAILED |
| 0xC0000086 | SITEMANAGER CONNECTREMOTE FAILED |
| 0x80000087 | SITEMANAGER ADDUSERNOTIFY FAILED |
| 0x80000088 | SITEMANAGER SETUP FAILED |
| 0xC0000089 | SITEMANAGER DATASOURCE FAILURE |
| 0x8000008A | SITEMANAGER CONNECTION TIMEOUT |
| 0x8000008B | SITEMANAGER COMPONENTMANAGER FAILURE |
| 0x4000008C | SITEMANAGER VAMANAGER CONNECTION |
| 0xC000008D | APP NOT FOUND |
| 0xC000008E | VAPROCESS NOT STARTED |
| 0x8000008F | UNKNOWN PAGE TYPE |
| 0x80000090 | UNKNOWN PAGE KEYWORD |
| 0x80000091 | PAGE FILE SYNTAX ERROR |
| 0x00000092 | APPLICATION GENERAL SUCCESS |
| 0x40000093 | APPLICATION GENERAL INFORMATIONAL |
| 0x80000094 | APPLICATION GENERAL WARNING |
| 0xC0000095 | APPLICATION GENERAL ERROR |
| 0xC0000096 | APPLICATION LOGON FAILED |
| 0x80000097 | UNSYNCHRONIZED PARAMETERS |
| 0x80000098 | INVALID AUDIO STREAM |
| 0x80000099 | AUDIO BUFFER UNDEFINED |
| 0xC000009A | TELEPHONY SET CONTROL ERROR |
| 0x4000009B | COL INVALID INDEX |
| 0x4000009C | COL PROPERTY DOES NOT EXIST |
| 0x4000009D | COL NO MESSAGES |
| 0x4000009E | COL NO PREVIOUS MESSAGE |
| 0x4000009F | COL NO NEXT MESSAGE |
| 0x400000A0 | COL NO ATTACHMENTS |
| 0x400000A1 | COL NO PREVIOUS ATTACHMENT |
| 0x400000A2 | COL NO NEXT ATTACHMENT |
| 0x400000A3 | COL NOT MEETING REQUEST |
| 0x400000A4 | COL NO RECIPIENT |
| 0xC00000A5 | TELEPHONY CONTROL CALL ACTIVE |
| 0xC00000A6 | VAVM NO ACTIVE SESSION |
| 0xC00000A7 | VAVM INVALID CALL STATE |
| 0xC00000A8 | VAVM SESSION TERMINATION |
| 0x400000A9 | TELEPHONY BUFFER OVERFLOW |
| 0x400000AA | TELEPHONY BUFFER HIWATER |
| 0x800000AB | PARAMETER DOES NOT EXIST |
| 0x800000AC | EVENTSINK ALREADY DEFINED |
| 0x800000AD | EVENTSINK NOT DEFINED |
| 0xC00000AE | TELEPRONY WAIT FOR CALL ERROR |
| 0x400000AF | EXTERNAL EVENT |
| 0xC00000B0 | TELEPHONY CONF TOO BIG |
| 0xC00000B1 | TELEPHONY DUPLICATE JOIN |
| 0xC00000B2 | TELEPHONY UNKNOWN CONFEREE |
| 0xC00000B3 | TELEPHONY TROMBONE ERROR |
| 0xC00000B4 | TELEPHONY CONF JOIN ERROR |
| 0x400000B5 | VAVM LOG SESSION |
| 0xC00000B6 | TELEPHONY STOP WAIT CALL ERROR |
| 0xC00000B7 | TELEPHONY CONF DROP ERROR |
| 0xC00000B8 | TELEPHONY MUTE CALL ERROR |
| 0xC00000B9 | TELEPHONY LISTEN CALL ERROR |
| 0x800000BA | SERVERMANAGER NOT INITIALIZED |
| 0x800000BB | DB ENTRY ALREADY EXISTS |
| 0x400000BC | PROCESS PARAMETERS NOT INITIALIZED |
| 0xC00000BD | TELEPHONY HOLD CALL ERROR |
| 0xC00000BE | TELEPHONY RELEASE HOLD ERROR |
| 0xC00000BF | TELEPHONY ACQUIRE CALL ERROR |
| 0xC00000C0 | VADBM CREATE DATABASE FAILED |
| 0xC00000C1 | VADBM REGISTRY PARAMETER ERROR |

-continued

| Message Code | Description |
|---|---|
| 0xC00000C2 | VADBM SQL SCRIPT MISSING |
| 0xC00000C3 | VADBM SQL SCRIPT ERROR |
| 0xC00000C4 | VADBM SQL SERVER NOT FOUND |
| 0xC00000C5 | VADBM DATABASE UPDATE ERROR |
| 0xC00000C6 | VADBM TABLE READ ERROR |
| 0x400000C7 | VADBM COMPONENT VERSION ERROR |
| 0xC00000C8 | VADBM VAMANAGER CONNECT ERROR |
| 0xC00000C9 | VADBM INITIALIZATION ERROR |
| 0xC00000CA | VADBM OLEDB SESSION ERROR |
| 0xC00000CB | SYSTEM DIRECTORY ERROR |
| 0xC00000CC | EXCHMON USER NOT FOUND |
| 0xC00000CD | EXCHMON ALREADY INITLALIZED |
| 0xC00000CE | EXCHMON NOT INITIALIZED |
| 0xC00000CF | EXCHMON RULES ENGINE NOT SPECIFIED |
| 0xC00000D0 | TELEPHONY CONNECT CALL ERROR |
| 0xC00000D1 | VADBM BACKUP FAILED |
| 0xC00000D2 | VADBM RESTORE FAILED |
| 0xC00000D3 | VADBM INVALID RESTORE DEVICE |
| 0xC00000D4 | VADBM MAX LENGTH EXCEEDED |
| 0xC00000D5 | VADBM EXPORT FAILED |
| 0xC00000D6 | VADBM NO SUCH TABLE |
| 0xC00000D7 | VADBM LOG PURGE ERROR |
| 0xC00000D8 | VADBM JOB ERROR |
| 0xC00000D9 | VADBM JOB NAME ERROR |
| 0xC00000DA | VADBM INVALID JOB |
| 0xC00000DB | VADBM TABLE MIGRATION ERROR |
| 0xC00000DC | VAPUBLISH APP ALREADY BEING PUBLISHED |
| 0xC00000DD | VAPUBLISH APP COMPILE ERROR |
| 0xC00000DE | VAPUBLISH MISC ERROR |
| 0xC00000DF | VAPUBLISH APP COPY ERROR |
| 0x000000E0 | VAPUBLISH COMPLETE |
| 0xC00000E1 | VAPUBLISH VAL CREATE ERROR |
| 0xC00000E2 | VAPUBLISH VAL COMPILE ERROR |
| 0xC00000E3 | VAPUBLISH POSTBUILD ERROR |
| 0x400000E4 | VAPUBLISH INFORMATION |
| 0x400000E5 | VAPUBLISR CHILD PROCESS OUTPUT |
| 0xC00000E6 | VAPUBLISH COPY ERROR |
| 0xC00000E7 | VAPUBLISH FAILED |
| 0xC00000E8 | VAPUBLISH CLEAR DIR FAILED |

The VA Application

Setting User Preferences for the VA Application

The VA application should be installed on the user's personal computer. After the VA application is installed, the following user preferences should be set:

The user's Personal Identification Number (PIN)

Name and telephone number of the user's human operator

How the VA can reach the user with incoming calls

How the user wants to be reminded of appointments and tasks

Tempo and assertiveness of the VA

In the preferred embodiment, the user preferences are set using Microsoft Outlook on the user's personal computer.

Obtaining the Virtual assistant Preferences Screen

Figure 31:
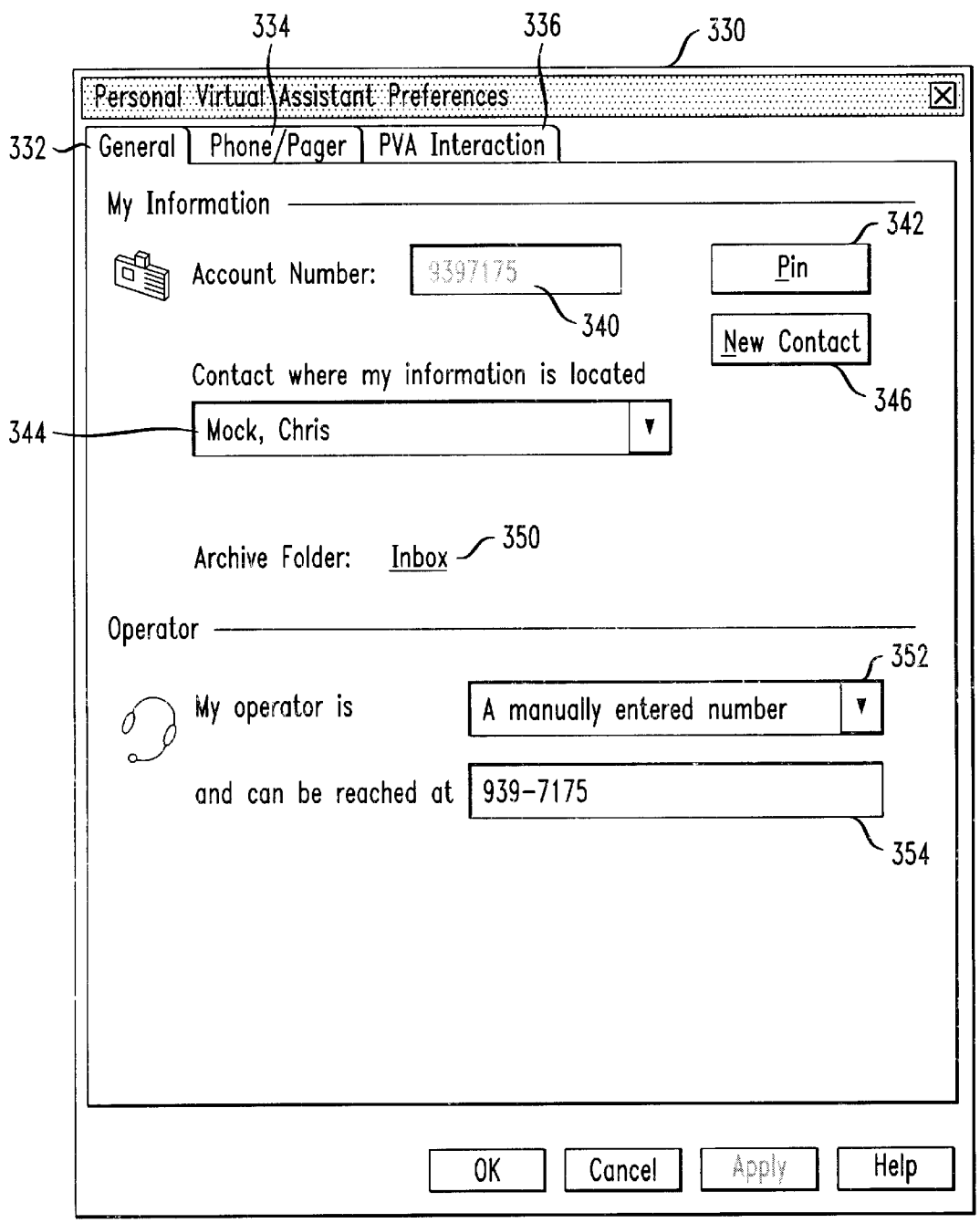
FIG. 31 is a screen shot of the General tab on the Virtual assistant Preferences screen.

As shown in FIG. 31, the VA user preferences are located on the Virtual assistant Preferences screen 330. The Virtual Assistant Preferences screen has three tabs: a General tab 332, a Phone/Pager tab 334 and a VA Interaction tab 336.

The General tab 332 has an Account Number field 340, which displays the user's account number. The user's account number should be assigned by system administrator, and the user should not be able to change his or her account number. Also on the General tab is the PIN button 342. The PIN is a four-digit code that is recommended for the user to log into the VA. The PIN is initially assigned by the system administrator, but can be changed by the user by clicking the PIN button 342.

The General tab also has a field 344 for designating the contact where the user's information is located. The VA Application uses the user's contact information to page the user and route telephone calls and reminders to the user. The New Contact button 346 can be used to create a contact for the user. If the user desires to have the VA route telephone calls to the user, all of the user's telephone numbers should be stored in the user's contact record.

A user can move old messages from the Microsoft Outlook Inbox to an archive folder by clicking the Archive Folder field 350, the Select Folder screen appears, which allows the user to select the folder to be used for archiving.

The My operator is field is used to select the user's operator from a list. If the user's operator is not included in the contact list, the user can create a new contact for his or her operator. Alternatively, the user can select A manually entered number from the drop-down list 352 and enter the operator's number in the And can be reached at field 354. If user selected a contact as his or her operator, the operator's telephone number (for example, business) can be selected from the And can be reached at field 354. If the only available selection is None, the user has not entered any telephone numbers for the contact.

Phone/Pager Tab

Figure 32:
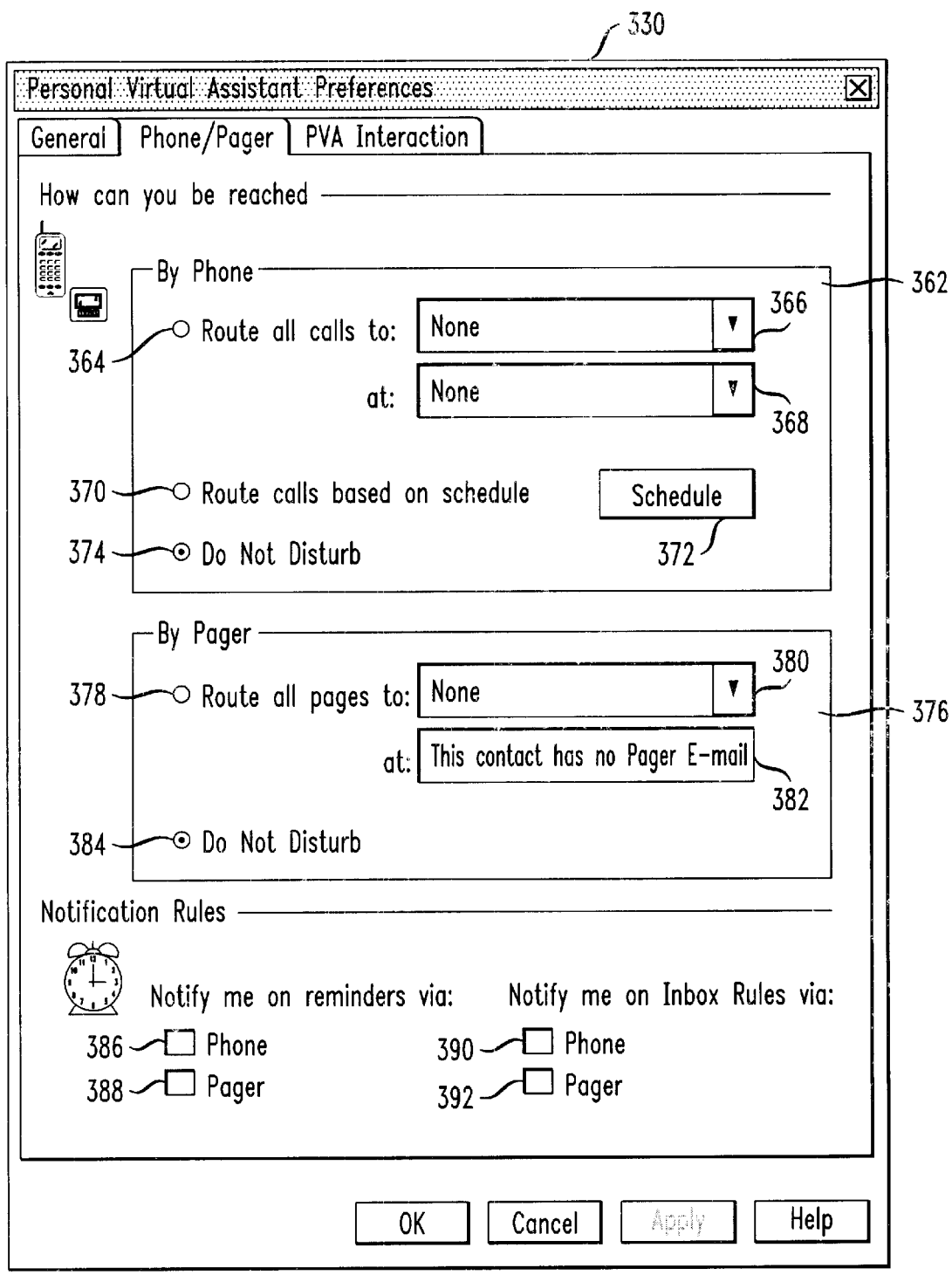
FIG. 32 is a screen shot of the Phone/Pager Tab on the of the Virtual assistant Preferences screen.

As shown in FIG. 32, the Phone/Pager tab 360 allows the user to control how the VA notifies the user about incoming calls and reminders. When the user is away from his or her desk, the VA can attempt to route incoming calls to the telephone at a specified location via the "follow me" feature. The By Phone field 362 has three buttons that control how the "follow me" feature works. If the Route all calls to button 364 is selected, the VA routes all calls to the specific contact (the user or an operator) selected from the first drop-down list box 366 at the phone number (for example, business) from the second drop-down list box 368. Alternatively, the user can also select A manually entered number from the first list box 366, in which case the second box 368 becomes a text field in which the user can enter the phone number.

If the Route calls based on schedule button 370 is selected, the VA will route calls to the user only at specific times, or will route calls to different numbers at different times. For example, the user might want calls to be routed to the user from 8:00 am to 5:00 pm Monday through Friday. If the Route calls based on schedule button 370 is selected, selecting the Schedule button 372 will allow the user to specify a call routing schedule. Specifying a call routing schedule is discussed in more detail in the section entitled "Setting Up a "Follow Me" Schedule."

If the Do Not Disturb button 374 is selected, the VA will not route calls to the user. Selecting the Do Not Disturb button also deactivates the "follow me" feature, the telephone notification for reminders feature and Rules Wizard messages. If this option is selected, the VA will ask callers to leave a voice message for the user.

The By Pager field 376 controls how the VA attempts to page the user. If the Route all pages to button 378 is selected, the VA will route all pages to a specified e-mail address. A contact (usually the user) is selected from the first drop-down list box 380. If the contact has a pager e-mail address, it appears in the second box 382. If not, a warning message is displayed. If the contact does not currently have a pager e-mail address, one can be entered on the Virtual Assistant tab of the contact information form. If A manually entered e-mail is selected from the first drop-down list box 380, the second box 382 becomes a text field in which an e-mail address can be entered. If the Do Not Disturb button 384 is selected, the VA will not route pages to the user, and the pager notification for reminders feature and Rules Wizard messages feature is deactivated.

A reminder can be set so that the VA reminds the user of a task or appointment by selecting the phone checkbox 386 and/or the pager checkbox 388. Similarly, the user can be notified we he or she receives certain types of messages by selecting the telephone checkbox 390 and/or pager checkbox 392.

VA Interaction Tab

Figure 33:
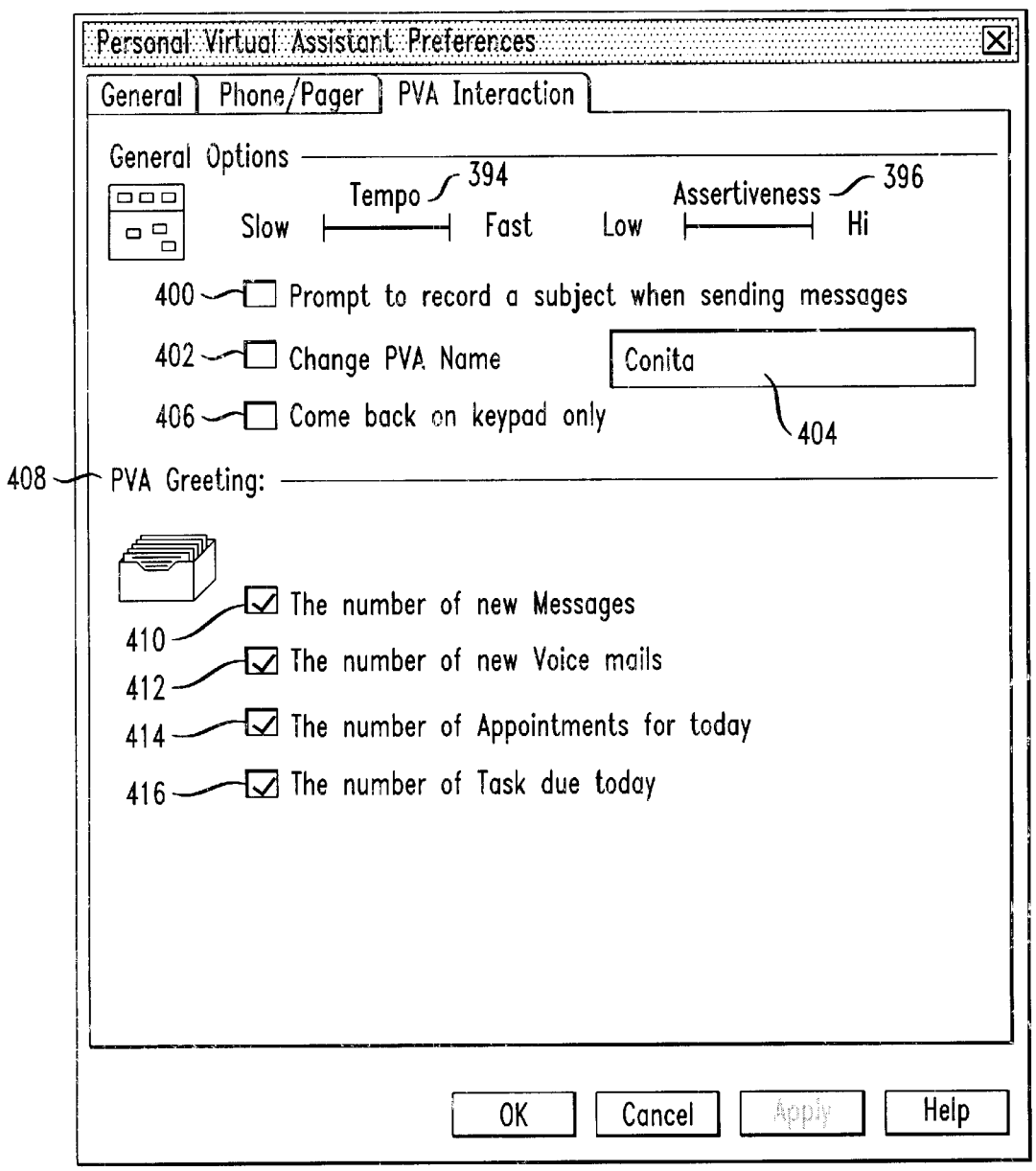
FIG. 33 is a screen shot of the VA Interaction tab on the of the Virtual assistant Preferences screen.

As shown in FIG. 33, in the preferred embodiment, the VA Interaction tab allows the user to specify how the VA interacts with the user. The Tempo field 394 controls the verbosity of the VA. When tempo is set to slow, the VA uses longer phrases to speak to the user. When tempo is set to fast, the VA uses shorter phrases. To change the tempo of the VA, the slider dragged to the desired position. For example, a user would set the tempo to slow when first learning how to use the VA, and after becoming more familiar with the VA, the tempo could be set to fast.

Returning to FIG. 33, in the preferred embodiment, the assertiveness of the VA is controlled by the Assertiveness field 396. When assertiveness is set to low, the VA asks for confirmation before performing a task. For example, if a user instructs the VA to delete a message, the VA asks for confirmation before actually deleting the message. When assertiveness is set to high, the VA carries out most commands without asking for confirmation. To change the assertiveness of the VA, the slider is dragged to the desired position. A user could set assertiveness to low when learning how to use the VA, and after becoming more familiar with the VA, assertiveness could be set to high.

Figure 34:
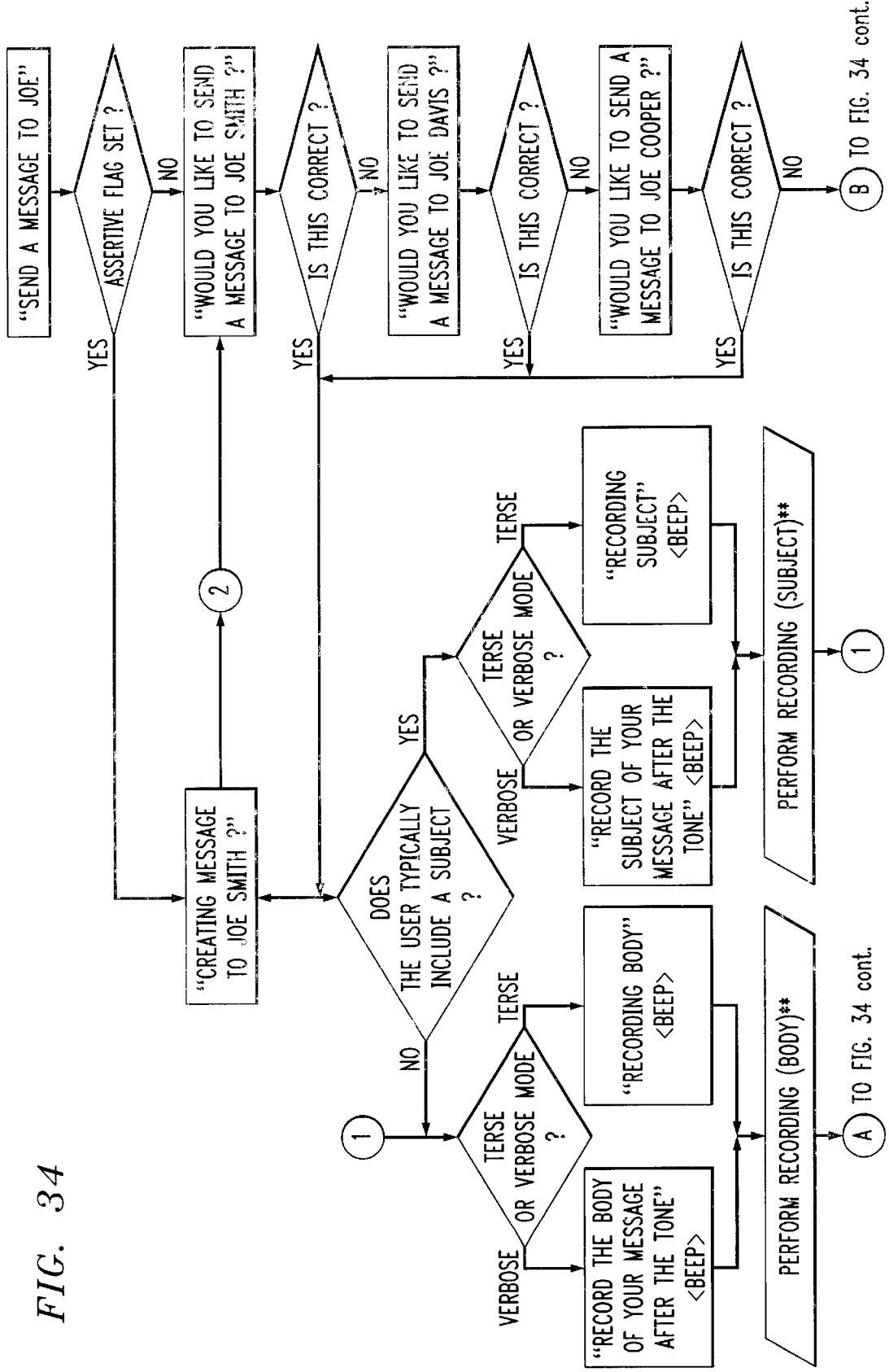
FIG. 34 is a flow chart that illustrates a call flow based on different tempo and assertiveness settings.
Figure 34:
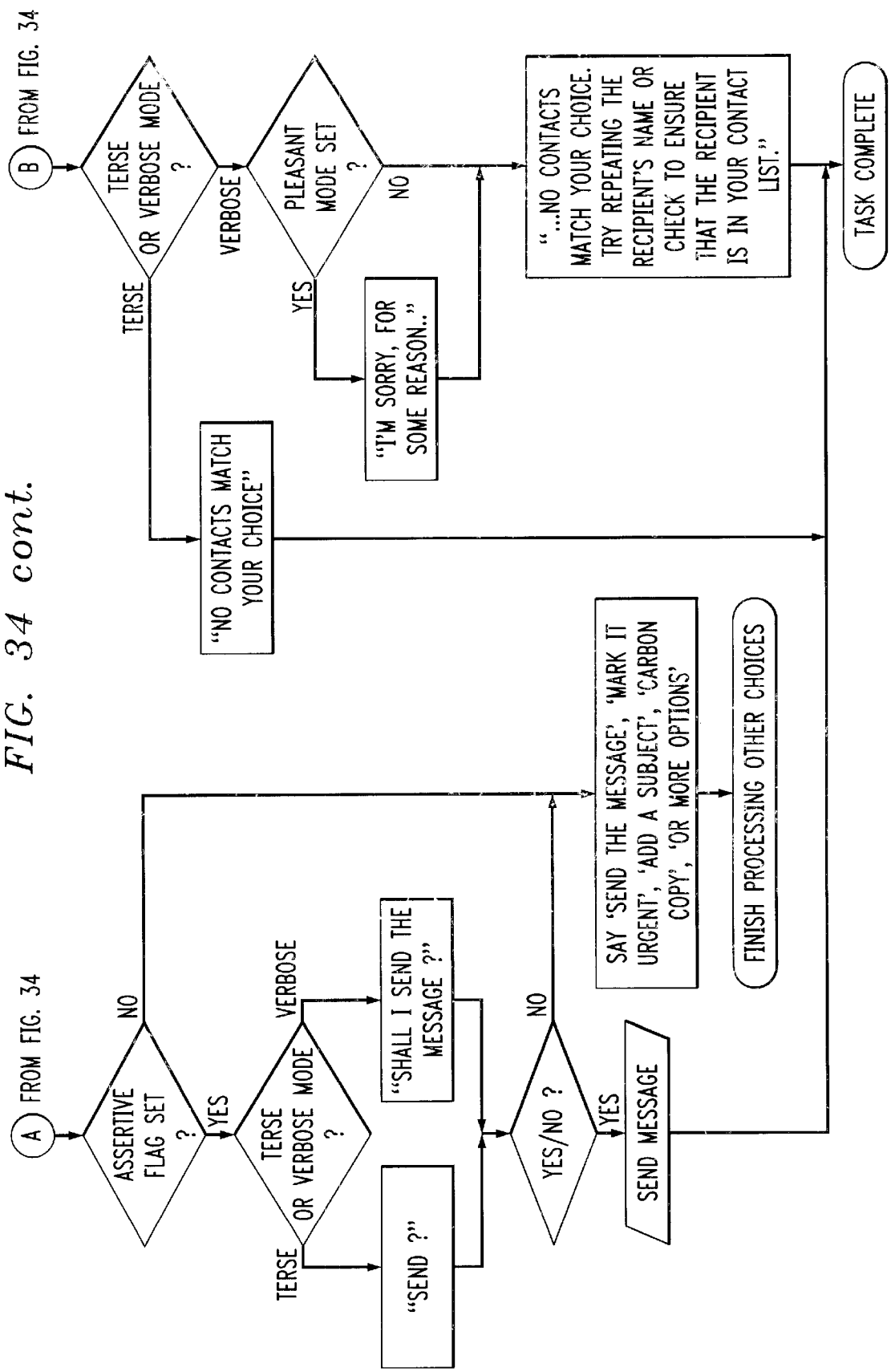

FIG. 34 illustrates how a call flow changes based on different settings for assertiveness and tempo.

In an alternative embodiment, the user does not manually adjust the tempo and assertiveness settings. Rather, the VA automatically adjusts these settings based on input received by the virtual assistant, such as information about the user. For example, rather than manually setting a tempo or assertiveness setting, the virtual assistant could have a user competence setting. The options for the user competence setting could be, for example, novice, experienced and expert, and the tempo and/or assertiveness settings would change automatically responsive to a change in the user competence level. Thus, if the user competence level were set to novice, the assertiveness setting and tempo setting would automatically be set to low and slow, respectively. Conversely, if the user competence level were set to expert, the assertiveness setting and tempo setting would automatically be set to high and fast, respectively. As can be appreciated by one skilled in the art, any setting could change automatically responsive to changes in the user competence level.

In another alternative embodiment, the virtual assistant could automatically increase the tempo and/or assertiveness of the virtual assistant after the user has accessed the virtual assistant a predetermined number of times, preferably, twenty. Alternatively, the virtual assistant could automatically provide a prompt to the user in response to which the user could increase the tempo and/or assertiveness of the virtual assistant after the user accessed the virtual assistant a predetermined number of times, preferably, twenty.

In an alternative embodiment, the virtual assistant could play a tip to the user about the use of the virtual assistant, or a message of the day, which is determined by the system administrator. Either the tip or the message of the day, or both, might be played every time a user accesses the virtual assistant. The virtual assistant could automatically disable the tips or message of the day if the user accesses the virtual assistant a predetermined number of times. That predetermined number could be calculated automatically by the virtual assistant based on a multiple of the number of tips and/or messages of the day. For example, if there are thirty tips, the virtual assistant could automatically disable the tips after the user heard each tip two to ten times, and, preferably each tips was heard three times. In yet another embodiment, the tips and/or message of the day could be automatically disabled if the user access the virtual assistant a predetermined number of times for a predetermined period of time. For example, the virtual assistant could automatically disable the tips and/or message of the day if the user accesses the virtual assistant more than once in a day. In another alternative embodiment, the tips and/or message of the day could be automatically disabled during the current user session if the time since that last user session is a predetermined amount of time, such as ten minutes or less.

In another embodiment, the virtual assistant could have a politeness setting, which, when enabled, would cause the virtual assistant to include words or phrases associated with polite discourse in the output from the virtual assistant. Such words or phrases could be, for example, "please," "thank you," "thanks," "excuse," "pardon," "may I," "would you mind," or other words and phrases associated with polite discourse. Alternatively, the user information input into the virtual assistant could be information about the user's experience with the virtual assistant, particularly, whether words associated with polite discourse are included in input received from the user. If, such words of polite discourse are included in the input received from the user, the virtual assistant could automatically enable the politeness setting.

Alternatively, the user information input into the virtual assistant could be information about the user's emotion, which could be based on information about the user's voice volume, word choice and speech rate. Based on such information, the virtual assistant could automatically determine the user's emotional state, calm or angry, for example. If the user's emotional state is angry, the output of the virtual assistant could automatically include words associated with submissive discourse, such as "sorry," "regret" and "apologize." The virtual assistant could save the information obtained about the user's emotional state for use in future sessions.

The user information also could be comprised of information about the amount of time since the user last provided input to the virtual assistant. If the amount of time since the user last provided input to the virtual assistant is a predetermined amount of time, for example, fifteen seconds or more, the virtual assistant could perform a predetermined action. The predetermined action would be determined by context. For example, if the user was reading messages, the predetermined action would be to read the next message, or prompt the user by saying, "Shall I read your next message," or provide a hint to the user by saying, "You could read your next message."

Alternatively, the user experience information could be information about the amount of time a user pauses during the recording of a message. If this amount of time is greater than a some predetermined amount of time, such as two seconds, the virtual assistant would stop recording, provide the user with the option to continue recording. Then, the amount of time before the virtual assistant stopped recording would be automatically increased by some other predetermined amount of time, such as 500 milliseconds, so that the virtual assistant would continue recording during future pauses in recording by the user.

Speech recognition errors are always possible in which case the VA may misinterpret a command. For example, Read this message could be interpreted to mean Delete this message. In this case, if assertiveness is set to high, the VA will delete the message without asking the user for confirmation. Thus, an alternative embodiment of the VA would have a setting for the user competence. If the user competence setting is set to novice, the VA could be programmed not to execute a particular command, such as Delete this message or Delete all messages, without user confirmation. Conversely, if the user competence setting is set to expert, such commands could be executed without confirmation when the assertiveness setting is set to high.

Prompt to record a subject when sending messages

Returning to FIG. 33, in the preferred embodiment, the VA Interaction tab includes a setting 400 to prompt a user to record a subject when sending a message.

Change VA Name

As shown in FIG. 33, in the preferred embodiment, the VA Interaction tab includes a setting 402 to change the name for the VA from the default name "Conita." If the user wants to change the name of the VA, this box should be checked and the new name of the VA should be entered in the text box 404. The VA name entered in the text box 404 is used in the "Come back" command (for example, "Conita, come back"). This command allows a user to bring the VA back during a telephone call so that additional commands can be issued by the user. Adding a name to the "Come back" command makes it easier for the VA to understand this command and decreases the chance of the VA coming back accidentally because it misinterpreted a phrase in a phone conversation as the "Come back" command.

'come back' on keypad only

As shown in FIG. 33, in the preferred embodiment, the VA Interaction tab includes a setting 406 for 'come back' on the keypad only. If this box 406 is not checked, the VA will come back from a break if the user says "Come back" or presses a predetermined key, such as the star (*) key, on a telephone keypad. If this box 406 is checked, the VA will come back only if a predetermined key, such as the star (*) key, is pressed on the telephone keypad.

VA Greeting

As shown in FIG. 33, in the preferred embodiment, the VA Interaction tab includes VA Greeting settings 408. When a user calls its VA and logs in successfully, the VA responds with a greeting message. There four check boxes 410, 412, 414 and 416 that allow the user to specify the information contained in the greeting message. For example, if user checks check box 414 for the The number of Appointments for today, the VA will tell the user how many appointments it has, and other relevant information about such appointments, for a predetermined period of time, such as one day. Any combination of the boxes 410, 412, 414 and 416 can be checked.

In an alternative embodiment, the greeting information about the user's appointments or tasks could be automatically disabled during a user session if the time since the last user session is a predetermined amount of time, such as ten minutes or less.

In addition, the virtual assistant will provide time-of-day specific greetings to the user based on when the user accesses the virtual assistant. For example, if the user accesses the virtual assistant in the morning, the virtual assistant may greet the user by saying, "Good morning." These time-of-day specific greetings can be automatically disabled during the current user session if the time since the last user session is a predetermined amount of time, such as ten minutes or less.

Setting Up a "Follow Me" Schedule

Returning to FIG. 32, if the Route calls based on schedule setting is enabled, the user should establish a call routing schedule, which causes the VA to route phone calls to the user at different times. In the preferred embodiment, before establishing a call routing schedule, the user should define a contact for himself of herself in Microsoft Outlook. Under this contact, the user should specify each telephone number (home, business, and so on) to which it wants the VA to route calls. Returning to FIG. 31, the user also should specify this contact in the Contact where my information is located 344 on the VA Preferences General tab 332.

Figure 35:
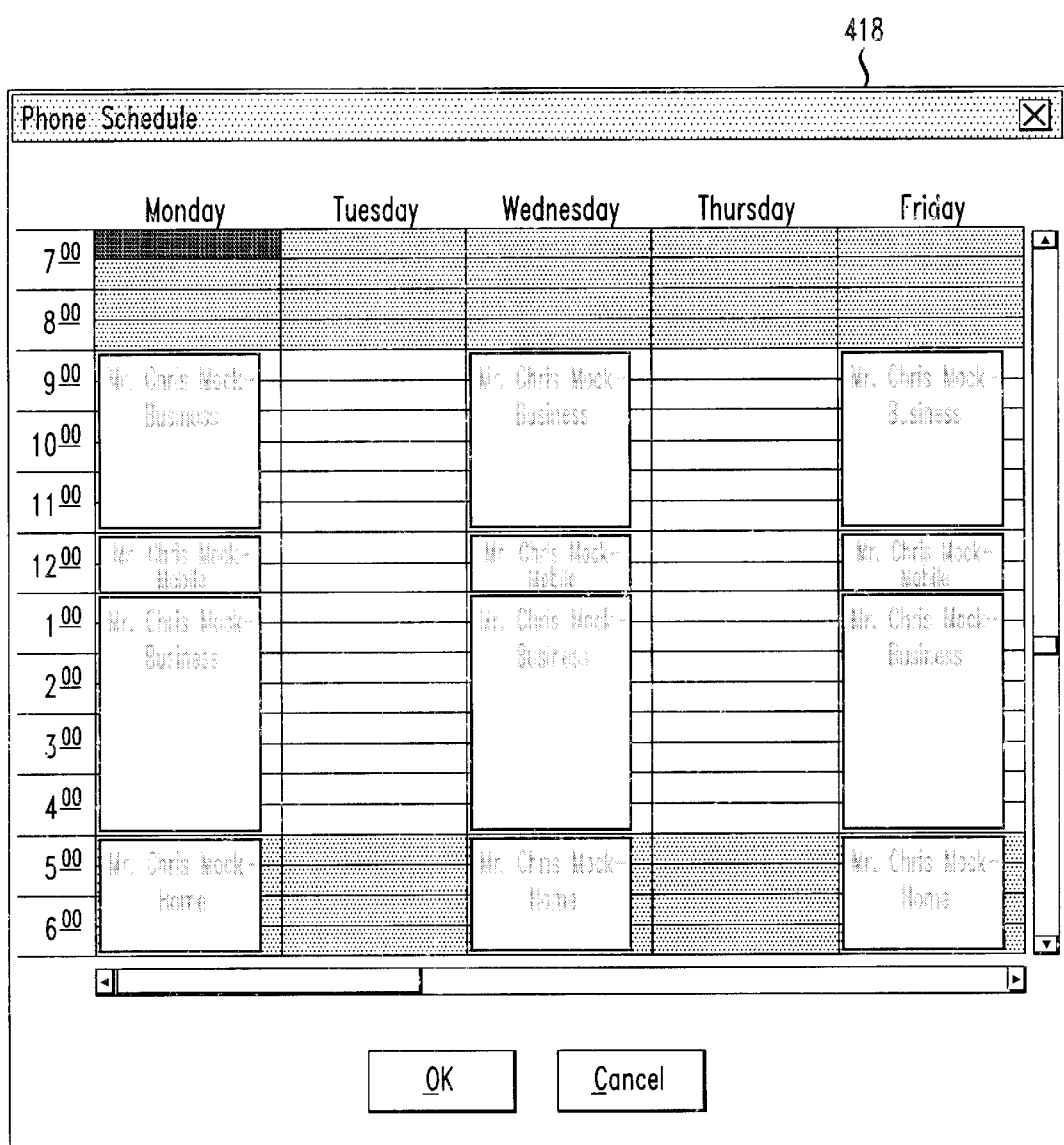
FIG. 35 is a screen shot of the Phone Schedule screen.

Returning to FIG. 32, in the preferred embodiment, to set up a call routing schedule, the user should enable the Route calls based on schedule setting 370 on the Phone/Pager tab 360 and then click the Schedule button 372. Upon clicking the Schedule button 372, as shown in FIG. 35, the Phone Schedule screen 418 is activated. A block of time is selected by clicking the box for the starting date and time and dragging the mouse to the box for the ending date and time. The block of time selected is highlighted in blue. Clicking the right mouse button activates a menu that displays the telephone numbers (for example, home or work) for the contact specified in the Contact where my information is located 344 on the VA Preferences General tab 332. The user selects the telephone number to which the VA should route calls during the specified block of time. To cause the VA to route calls to a contact other than the user, Other can be selected from the menu and then the other contact and telephone number can be selected. In the preferred embodiment, if a contact other than the user is selected, the specified time block changes, for example, to white with a green border.

In the preferred embodiment, a user can select more than one block of time, and can specify a different telephone number for each block of time. In addition, the user can override the call routing schedule with the "Follow me" voice command, which is discussed above. If the user overrides the routing schedule with a voice command, a red line identifies the period of time for which the override is in effect. Also, if the contact where the user's contact information is located is changed, or if the contact to whom calls are being routing is deleted, the VA cannot use the schedule to route calls and a colored border, such as a red border, identifies the affected time blocks. The user should delete these time blocks and redefine them for the new contact.

Other VA Options Set with Outlook

In addition to the preferences that can set on the Virtual assistant Preferences screen, there are other options that can be set with Outlook, including Automatic message notification through the Rules Wizard and Additional contact information.

The VA can notify a user by telephone or pager when the user receives certain types of messages. For example, the user might want to be notified if he or she receives a message from his or her supervisor. In order to use this feature, the user should use the Outlook Rules Wizard to specify the types of messages that trigger automatic notification. Information concerning the use of the Outlook Rules Wizard can be found at the Microsoft web site, www.microsoft.com. To set up a rule for VA notification, the type of message for which the user wants to be notified should be selected. Also, the forward it to people or distribution list setting should be enabled. Under Rule Description, the underlined people or distribution list should be selected and then the VAManager should be selected, which causes the affected messages to be forwarded to the VA, which in turn forwards them to the user. Returning to FIG. 32, in the preferred embodiment, in order for rules notification to function, the Phone setting 390 and/or the Pager setting 392 should be enabled.

Figure 36:
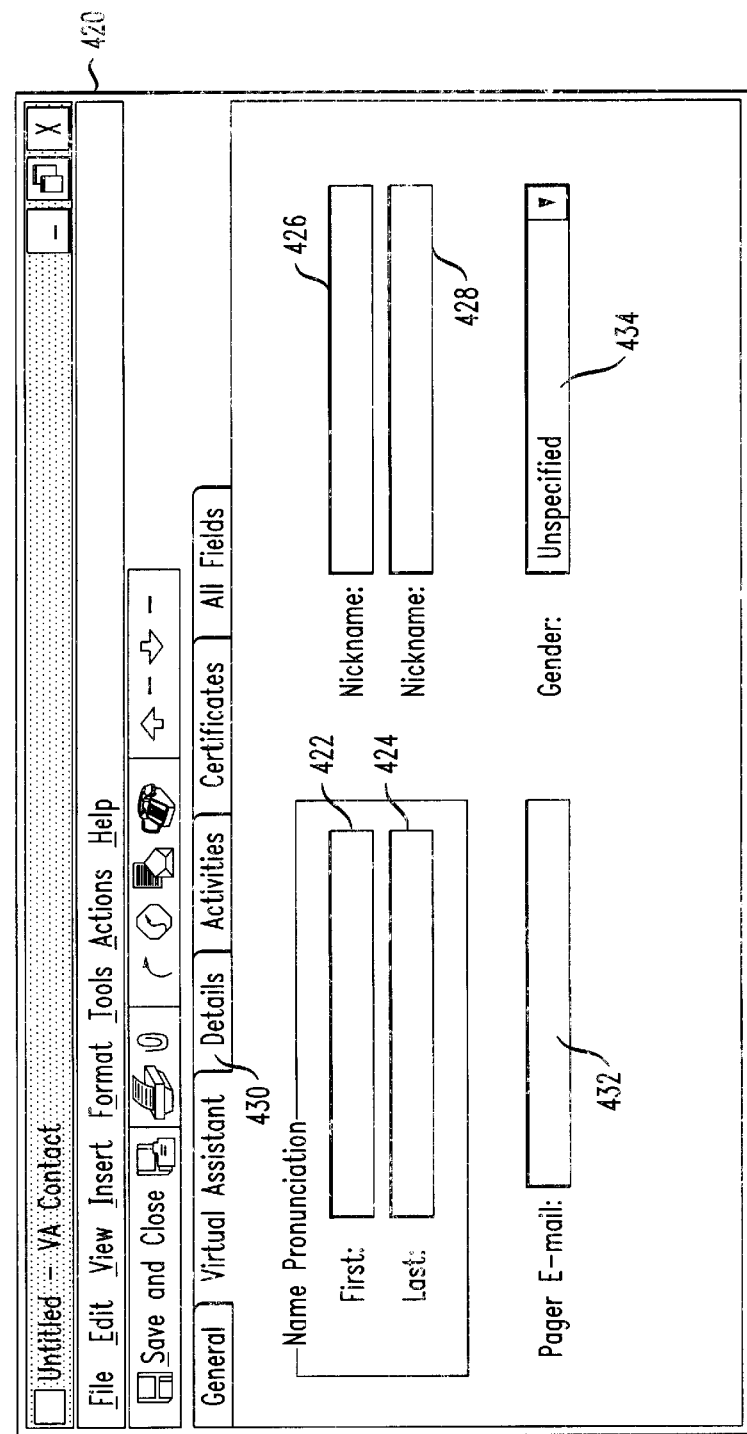
FIG. 36 is a screen shot of the Virtual assistant Tab.

As shown in FIG. 36, when the VA software is installed, it adds a Virtual assistant tab 420 to the Outlook screen for defining contacts. This tab allows the entry of additional contact information for the VA. The VA tab 420 has Name Pronunciation—First 422 and Name Pronunciation—Last fields 424 which allow the entry of a phonetic pronunciation for a contact's first or last name. These fields can be used to enter a phonetic pronunciation if the VA does not pronouncing the contact's name correctly. For example, if a contact named "Conita" is being pronounced "Coneeta," a user could enter "Conighta" in this field to change the pronunciation used by the VA.

The Nickname 426 and Nickname2 428 fields can be used to enter a contact's nickname. If a nickname is entered, the VA can look up that contact using the specified nickname. Alternatively, a contact's nickname can be entered on the Details tab 430.

The Pager E-mail field 432 can be used to enter the e-mail address for a contact's pager.

The Gender field 434 can be used to select the contact's gender. The VA, when interacting with a user, will use words associated with the gender selected. If male is selected, the VA may ask the user, "Would you like to call him?"

Interacting with the VA

In the preferred embodiment, in making utterances to the VA, the user should speak clearly and at a moderate pace. The user also should speak at normal volume level. If the VA has difficulty in understanding the user, different volume levels should be tried. The user should use words and phrases that the VA understands. Background noise will reduce the ability of the VA to understand utterances from the user. A user should interact with the VA in a quiet place. The user should avoid pauses when saying a command. If a user pauses, the VA will interpret the pause as the completion of a command. The user should avoid pauses when saying a number, such as a telephone number because should a pause will be interpreted as the end of the number. The user should pronounce each digit when uttering a number to the VA. For example, if a user's PIN is 2314, the user should say "two, three, one, four." An exception is time; for example, the user can utter either "12 o'clock" or "1200."

If a user has difficulty performing a task, help can be requested by uttering "Help" or "What are my options?" The VA will respond automatically with information to assist the user in performing the current task. Also, if there is a period of silence and the user appears to be having trouble, the VA will offer help by reading a list of possible options.

The VA can provide either global help of context-sensitive help. Global help lists the tasks that can be performed with the VA. To request global help, the user should utter "What are my options?" after the VA says, "What can I do for you?". The VA responds by listing the major tasks that can be performed. The user can then utter the desired option.

When the user is performing a task, any request for help results in a context-sensitive help message for that task. For example, if the user requests to send a message, the VA asks who is to be the intended recipient. If, at this point, the users utters "What are my options?" the VA will tell the user how to provide the contact name for the message recipient.

In the preferred embodiment, as an alternative to uttering commands, the VA allows a user to issue commands with predetermined key, such as the star (*) or "star" key, of the telephone keypad. This method of interaction, known as Star mode, is useful when the VA is having difficulty understanding a user's utterances because of background noise. To enable the Star mode, the star key (*) on the telephone keypad should be pressed. The VA will provide the user information as to the available options. At the time the desired option is being provided, the option can be selected by the user by pressing the * key. The star mode is discussed in more detail below.

If the VA is providing output, and the user desires to interrupt the VA, the VA is programmed to allow the user to "barge in." When a user barges in, the VA stops talking. For example, if the VA is reading a message and user wants to hear the next message before the VA has completed reading the current message, the user can barge in and say "Next." This will cause the VA to begin reading the next message. The barge in feature can be deactivated by pressing a predetermined key, such as the number sign (#) key, on the telephone keypad. When the barge-in feature is deactivated, the VA will continue to respond to user voice commands, but will not allow a user to barge-in while the VA is providing output, by speech or otherwise. The barge-in feature can be reactivated by pressing the # key again. A user might want to deactivate the barge-in off if background noise that will cause recognition errors is anticipated.

A user can stop the VA from performing an action by saying "Cancel" or "Stop." For example, if a user asks the VA to place a telephone call and then decides not to place the call, uttering "Cancel" will stop the VA from placing the call. The cancel function is also useful if a user loses track of what he or she is doing or wants to restart a task. Uttering "Cancel" will stop the current task; the VA will indicate that it is ready to receive the next utterance by saying, "What can I do for you?"

A user can deactivate the VA, that is, put it on hold, at any time by uttering "Take a break." The VA stops the task or action being performed and waits for the user to utter a predetermined command, such as "Come back." After the VA back is reactivated, the VA can continue the task that it was performing when it was deactivated, or begin performing a new task or action.

When a user wants to end a VA session, the user can utter a predetermined phrase, such as "good-bye" or simply hang up. If the VA hears the user utter "good-bye," it will also say "good-bye" and prepare to hang up. A short period between the time when the VA says "good-bye" and the time when it actually hangs up allows the user to restart the session by saying "wait" or any other supported system command.

If the VA does not understand a user utterance, it will ask the user to clarify the utterance. In many cases, the VA will not understand a user utterance because of a recognition error. Recognition errors can be the result of speech problems, syntax problems or inappropriate context.

Speech problems occur when the VA cannot recognize what is being uttered by the user for one of several reasons, such as background noise, bad phone connection, heavily accented speech, speech is too loud, too fast or too slow.

Syntax problems occur when a user utterance does not conform to the syntax recognized by the VA. Although the VA is very flexible in recognizing utterances, it is designed to recognize phrases for specific tasks. If the user does not provide the VA with sufficient information, or an utterance contains extraneous words, the VA might become confused. For example, the VA may not understand the utterance, "What I need to know is the number for John Smith's home extension." However, the utterance, "What is John Smith's home phone number?" can be understood by the VA.

Recognition errors also occur if a user utters a valid command, but the command is inappropriate given the context. For example, if a user is creating an appointment, the VA expects to be provided information about the appointment. If the user utters a command to call a contact before finishing the task of creating the appointment, the VA will not recognize the command as valid.

If the VA is having difficulty understanding user commands, the user can be instructed to take the following actions:

Eliminate background noise.

Speak more loudly.

Speak more distinctly.

Speak at a natural pace—not too slowly.

Eliminate like pauses.

Make sure that those around the user are not speaking at the same time.

Say "Cancel" and start over again.

Instead of speaking commands, press the * key and use Star mode to issue commands.

Let the VA assist in framing a command.

Look up examples of the command to be issued.

The VA can be programmed to provide such instructions automatically, depending on the number and/or frequency of recognition errors.

In the preferred embodiment, the VA automatically disconnects and terminates the user session if it receives a predetermined number of recognition errors. The VA also automatically disconnects after predetermined period of inactivity, for example, approximately 15 seconds. Before disconnecting, the VA should inform the user to call back and try again. The automatic disconnect feature prevents an off-hook VA from staying connected due to background noise. The automatic disconnect feature also allows the user to obtain a better connection if recognition errors are due to a bad connection.

If a user wants to send the system administrator a comment about the VA, the user can utter "Leave a comment." The VA then prompts the user to record and comment and automatically sends it to the system administrator.

Calling the VA and Logging In

When a user calls the VA, it should log in. The system administrator determines the recommended log-in information. If each user has a unique telephone number for his or her VA, then the user need only provide a PIN to log in. If every user uses the same number to reach his or her VA, the user should provide both an account number and a PIN to log in.

After a user has logged in successfully, the VA will respond with a brief tone and a greeting. For example, "You have four e-mail messages. You have two voice mail messages." After the greeting, the VA will provide a prompt such as, "What can I do for you?" This indicates that the VA is ready to receive commands or utterances from the user.

The actual content of the greeting depends on settings specified by the user, as discussed above. In an alternative embodiment, the greetings will automatically change responsive to how the user has previously interacted with the VA. For example, the VA may be initially configured to provide time-of-day specific greetings (for example, "Good morning," "Good afternoon," "Good evening") when the user logs in. Such time-of-day specific greetings may be automatically disabled for a predetermined period of time, such as a day, if the amount of time since the user last accessed the VA is a predetermined amount of time, such as ten minutes or less. The time-of-day specific greetings also could be disabled after the user accesses the VA more than a three times in a day.

Similarly, the VA may be initially configured to provide information to the user about the user's appointments scheduled for, or tasks that are due, the day. Such appointment and/or task information may be automatically disabled for a predetermined period of time, such as the rest of the day, if the amount of time since the user last accessed the VA is a predetermined amount of time, such as ten minutes or less. The providing of such appointment or task information also could be disabled after the user accesses the VA more than a three times in a day.

Overview of Messages

After a user logs in to the VA, the user will likely want to listen to new messages, such as voice mail messages, e-mails, meeting and task requests generated through Microsoft Outlook, and faxes received by the VA and stored as messages.

The VA provides several different options for listening to messages. These options allow a user to quickly determine which messages are important and then obtain more detail about them. The options are listed in the table set forth below:

| Option | Information provided |
| --- | --- |
| Count | Count of messages |
| Browse | Sender and subject |
| List | Sender and subject |
| Read | Sender, subject, body of the message, attachments Note: The VA cannot read faxes to a user To read a faxed message, the user should forward it either to a fax machine or to a personal computer that contains fax display software. |
| More detail | Detail in addition to that provided by the read option; varies according to the type of message. |

"Navigating" is the process of directing the VA to the specific message or messages a user wants to hear. If a user instructs the VA to "Read my messages," the VA reads all messages in order, beginning with the oldest new message. However, there are many options that allow a user to specify which message or messages VA should read.

"New" messages are those that have been received since the user last called the VA (and, perhaps, since the user last checked messages on a personal computer). "Old" messages include all other messages, even if they have not been read. If a user instructs the VA to read messages, it reads the new messages by default, and then will read the user's old messages. If the user instructs the VA to "Read my old messages," the VA starts reading the most recent old message, and then reads the user's most recent old messages.

"Read" messages are those that the VA has read to the user or the user has read with Outlook on a personal computer. "Unread" messages are those that the VA has not read to the user and the user has not read with Outlook.

The "first" message is the most recent message received by the user. The "last" message is the oldest message received by the user. A user can tell the VA read the first or last message by saying "Read my first message" or "Read my last message."

A user can tell the VA to read the next or previous message by saying "Next" or "Previous." In order for these commands to work, the VA should have a message context. That is, it should be listing, reading, or performing a similar activity. If the VA says, "What can I do for you?" and a user says "Next," a misrecognition will likely occur. As discussed above, a user is not required to wait for the VA to finish reading the current message; when the user wants to hear the next message, the user can barge in and request the VA to read the next message.

A user can filter, or tag, the messages the user wants to access by providing additional descriptive information to the VA. For example, if a user instructs the VA to "Read my new messages," the VA reads all new messages beginning with the first new message. However, if a user is expecting an important message from a particular person, e.g., John Smith, the VA will read only messages from John Smith if the user instructs the VA to "Read my new messages from John Smith."

Listening to Messages

A user can request the VA to provide a count of messages by saying, "How many messages do I have?" The VA will respond, for example, by saying, "You have four messages. Two of these are e-mail messages, and two are voice mail messages."

The following table shows other options available to a user in requesting a count of messages.

| Option | Example |
| --- | --- |
| Message type:<br>• E-mail<br>• Voice mail<br>• Meeting requests<br>• Task requests | How many e-mail messages do I have?<br>Do I have any voice mail messages? |
| Message status:<br>• New or Old<br>• Read or Unread<br>• Urgent | How many old messages do I have? |
| A combination of the other options | How many new meeting requests do I have? |

A user can browse messages by saying, "Browse my messages." The VA responds by reading the sender and subject for each message, beginning with the first message. For example, "Sally Jones . . . Need your timesheet," and "James Ford . . . Lunch today?" If a user wants the VA to read a message, the user can barge in while the VA is reading the subject and say, "Read it." The user should say, "Read it" before the VA begins the next message. If the VA begins reading the next message before the user says, "Read it," the user can say "Previous" to get back to the message. For voice messages, the VA plays back a recording of the sender's name. For faxes, the VA reads the number of the sending fax machine.

A user lists messages by saying, "List my messages." The VA responds by reading the sender, delivery date, and subject for each message, beginning with the first message. Listing is an efficient way for a user to review messages and determine which ones are the most important. If the user wants the VA to read the current message it is listing, the user can barge in and say "Read it." The following table shows other options available to a user in requesting a list of messages:

| Option | Examples |
| --- | --- |
| Message type:<br>• E-mail<br>• Voice mail<br>• Meeting requests<br>• Task requests | List my voice mail messages<br>List my meeting requests |
| Sender or subject | List my messages by sender |
| Message status:<br>• New or Old<br>• Read or Unread<br>• Urgent | List my unread messages |
| A combination of the other options | List my e-mail messages by sender |

In order to hear the body of a message, the user should ask the VA to read it. The most basic command for reading messages is simply "Read my messages." This causes the VA to read all of a user's messages.

The VA reads different types of messages in different ways, based on the information available for the type of message. In general, however, the VA reads messages as follows:

Message description
Message text
Message attachments

As mentioned above, the VA cannot read faxes. To read a faxed message, a user should forward it either to a fax machine or to a personal computer that contains fax display software.

The message description contains the information necessary for a user to identify a message. The VA reads this information first so the user can decide whether to listen to the message. The message description is different for different message types, as shown in the following table:

| For this message type . . . | The message description contains the following: |
| --- | --- |
| E-mail | Sender, delivery date, and subject |
| Voice mail | Message type, caller's name, delivery date, and callback number |
| Meeting requests | Sender, delivery date, and subject |
| Task requests | Sender, delivery date, and subject |
| Faxes | Telephone number of the machine that sent the fax |

When a user instructs the VA to read messages, the messages can be filtered as follows:

| Option | Example |
| --- | --- |
| Message type:<br>• E-mail<br>• Voice mail<br>• Meeting requests<br>• Task requests | Read my voice mail messages |
| Sender | Read my messages from John Smith |
| Message status:<br>• First or Last<br>• New or Old<br>• Read or Unread<br>• Deleted<br>• Urgent | Read my first message<br>Read my urgent messages |
| A combination of the other options | Read my e-mail messages from John Smith |

When the VA finishes reading the text of a message, it reads (or plays) any attachments included with the message. Before reading an attachment, the VA tells the user its type and name. If user asks for more detail, the VA tells the user the attachment's file size. In the preferred embodiment, the VA can read text, rich text, HTML, and sound files (e.g., .wav files). The VA informs a user if an attachment cannot be read. If a message contains more than one attachment, a user has the following navigation options:

First
Last
Next
Previous

If a user wants more detailed information about a message than the VA provides automatically by reading, the user can say, "Get more detail." The VA will respond by providing additional detail, depending on the type of message.

If a user wants to remove a message from the Inbox and retain a copy, the user can move it to an archive folder. To move a message from Inbox to an archive folder, say, "File this message." Once a message is archived, the user can access it from the VA only if it is returned to the Inbox by saying "Restore" immediately, before issuing the next command. Before a user can archive messages, an archive folder should be created under Microsoft Outlook, and the name of the archive folder should be specified in the user preferences, which is discussed above.

As user can delete any message from the Inbox by saying, "Delete this message." The message to be deleted should be the current message, that is, the message the VA is describing or reading. If a user wants to restore a deleted message, it can do so by saying "Restore this message" immediately, i.e., before the user continues to the next command. Once the user issues the next command, the VA cannot restore the deleted message. When the user ends the current session, all deleted messages are moved to the Microsoft Outlook Deleted Items folder. Messages in the Deleted Items folder are subject to the permanent deletion policy defined with Outlook. If a user tells the VA to delete a meeting or task request, the VA will ask the user if it wants to respond to the sender with a rejection before deleting the message.

Managing Contacts

A user can browse contacts by saying, "Browse my contacts." The VA responds by telling how many contacts in the contact list and reading the name of each contact (in alphabetical order).

If a user wants more information than browsing provides, a user can list contacts by saying, "List my contacts." The VA responds by telling how many contacts in contact the list, and reading the name and company of each contact. If the user wants more detailed information about the current contact that the VA is listing, the user can barge in and say "Read it."

If the user wants more information than listing provides, the user can read contacts by saying "Read my contacts." The VA responds by telling how many contacts in the contact list, and reading each contact's name, title, company, telephone numbers, and e-mail address.

If the user wants more detailed information about a contact than the VA provides by reading, the user can say, "Get more detail." The VA responds by reading the contact name, job title, birthday, spouse name, gender, anniversary and other telephone numbers.

To access a specific field of information (for example, a telephone number or e-mail address) for a specific contact, the user can use any of the following commands:

Look up a contact
Look up John Smith
Who is John Smith?
What is John Smith's telephone number?
What is John Smith's work telephone number?
What is John Smith's address?
What is John Smith's e-mail?

When a user inquires about a contact, the user should identify the contact for the VA. The user can use any of the following to identify a contact:

First name and last name
Last name only
First name only
Nickname1
Nickname2
Nickname and last name The more information provided, the more precisely the VA can identify the contact. For example, if a user asks for a contact by last name only and the contact list contains more than one contact with that last name, the VA cannot immediately determine which contact the user wants. If the VA finds more than one matching contact, it begins with the first contact and asks whether this is the one the user wants. The user can respond by saying either "Yes" or "No" until the user identifies the desired contact.

To create a new contact, the user can say "Add a contact." The VA prompts the user to provide first name, last name, e-mail address, work telephone number and home telephone number.

When prompting for a name, the VA first asks the user to say the name. The VA then repeats the name and asks if it is correct. If the name is correct, the user will say "Yes" and the VA prompts the user for the next piece of information. If the name is not correct, the user can either say "Try again" to say the name again, or say "No" to spell the name one letter at a time, with the VA confirming each letter. When the VA confirms the last letter of the name, that user can say, "That's it" to continue.

When spelling a contact's name or e-mail address, the user has the following options:

Say the letter (for example, "B")
Say the International Phonetic Alphabet word for the letter (for example, "Bravo" for B) because the VA is morel likely to understand a word than a single letter.
Press the button on the telephone keypad that corresponds to the letter. The VA recites the International Phonetic Alphabet word for each letter on the button (for example, "Alpha Bravo Charlie"). The user can then say the word for the letter.

When spelling an e-mail address, user can say "At" for the at sign @ and "Dot" for a period (.).

A user can create a new contact from an e-mail message. The e-mail should be the current message the VA is reading. To create a new contact from an e-mail message, the user can say "Add this contact." The VA adds the sender of the e-mail to the user's contact list, if that person is not already in the contact list.

Sending Messages

A user can send a new message to any contact in the contact list by saying "Send a message." The message is recorded as a sound file (.wav) and attached to an e-mail message. The recipient of the e-mail message should have some means of playing sound files. The user can specify the name of the contact in the command (for example, "Send a message to John Smith"). If the user says, "Send a message," the VA asks for the name of the contact. If the contact has more than one e-mail address, the VA asks to specify which e-mail address to use. The user can specify the name of a distribution list (for example, "Send a message to Quality Team") instead of a contact. The VA sends the message to each contact in the distribution list. When the contact name and e-mail address have been resolved, the VA asks whether to record a subject for the message. If the user says, "Yes," the VA directs the user to record the subject. After requesting the subject, the VA asks to begin recording the body of the message. When finished recording the body, the VA asks whether to send the message.

A user can reply to a message in Inbox by saying "Reply to this message." The message replied to should be the current message, that is, the message the VA is describing or reading. The reply is recorded as a sound file (.wav) and included as an attachment. A user can also record a sound file for the subject of the reply. The original message is included in the reply. All attachments (except those created by the VA) are stripped from the reply. The original message is appended to the reply message. If the user replies to a voice mail message, the VA attempts to call the person who left the message.

A user can forward any message in Inbox to a contact on the contact list by saying "Forward this message." The message forwarded should be the current message, that is the message the VA is describing or reading. The VA handles forwarded messages in much the same way as it handles replies, except that the original attachments are included. The user can specify the name of a contact when forwarding a message. If the user says, "Forward this message," the VA asks for the name of the contact. If the contact has more than one e-mail address, the VA asks to specify which e-mail address to use.

The user can fax a message by saying, "Fax this message." The message to be faxed should be the current message, that is, the message the VA is describing or reading. A user can fax a message to either an existing contact in the contact list (the user should specify the name of the contact and the VA faxes the message to the contact's fax number) or a fax number that is recited to the VA at the time of the fax request. Attachments are included in a faxed message only if the fax software recognizes them.

Managing Telephone Calls

The VA handles incoming calls from the user and from other callers attempting to reach the user. When the VA receives an incoming call, it asks for the caller's name. If the user is the caller, the user identifies itself by saying, "It's me," and logging in using the account number (if required) and PIN. The user can then start issuing commands to the VA. If another caller is attempting to reach the user, the caller should record a name when the VA asks for it. The VA then asks whether the caller wants to be connected to the user or leave a message. If the caller asks to be connected, the VA handles the call based on the user preference settings:

| If . . . | Then the VA . . . |
| --- | --- |
| the "follow me" feature is enabled | attempts to forward the call to the "follow me" telephone number specified. |
| • the "follow me feature" is disabled, or<br>• the VA cannot reach the user, or<br>• the "do not disturb" feature is enabled<br>• the user rejects the call | asks the caller to record a message. |

After recording a message, the VA asks if the caller wants to send the message. If the caller does not respond immediately, the VA recites a list of options (for example, send the message, review the message or cancel). The caller can select the desired option by saying the correct phrase. The caller's message, including the recorded name and telephone number, is sent to the Inbox as a voice mail message. The user can then listen to this voice mail message the next time the user accesses the VA.

The VA assigns a line number to each inbound and outbound call. This is useful if the user needs to keep track of multiple calls or if the user is involved in a conference call. If the user has several active calls, the user can use the following calls to determine which caller is on which line:

| Command | Description |
| --- | --- |
| Who is on line? | Tells which caller is on each line |
| Who is on line <x>? | Tells which caller is on the specified line |

After the VA connects a call, it become temporarily inactive, that is, it "goes to sleep." While sleeping, the VA only responds to a specific wake-up command. This allows the user to talk with the calling or called party without interference from the VA. The user can interrupt a call and reactivate, or "wake up," the VA at any time by saying "Come back." The VA responds by saying, "I'm here." The user can then issue commands to the VA again. If the user does not want the other party to the call to hear the dialog with the VA, the user can say "Go private." When a call is completed, the VA returns to continue performing tasks.

A user can terminate a call by either hanging up (this also terminates the call with the VA) or saying one of the following commands:

| Command | Description |
| --- | --- |
| Drop line <x> | Terminates the call assigned to line <x> but keeps the call with the VA open |
| Drop all lines | Terminates all calls on all lines but keeps the call with the VA open |

If a user receives an incoming telephone call while already on a call, the VA interrupts with a tone. This tone is referred to as a "whisper," since it is audible only to the user, that is, no other parties on the line can hear the tone. When the user hears the whisper, the user can break from the current call and speak to the VA by saying, "Come back." The VA gives the user more detail about the call and allows the user to accept it by saying, "Take the call" or reject it by saying, "Reject the call." If the user does not respond in a predetermined amount of time, the VA sends the call to voice mail.

The VA prompts incoming callers to provide a name. If the user has the "follow me" feature enabled, the VA attempts to reach the user by telephone and inform the user of the incoming call. When the VA contacts the user, it recites the recorded name of the caller. The user then has the option to accept or reject the call. If the user accepts, the VA connects the caller. If the VA cannot transfer the call because the user rejected the call, the VA could not reach the user or the user as the Do Not Disturb feature enabled, it asks the caller to leave a message. The VA only attempts to reach the user at one number. The user can change this number at any time. The user also can set this number to change at different times of the day.

A user can set options for the "follow me" feature in the Microsoft Outlook VA user preferences, which is discussed above. The user can issue the following commands to override the user preferences for the "follow me" feature:

| Command | Description |
|---|---|
| Follow me | Use this command to turn "follow me" on or to override the current call routing schedule. The VA asks to specify the duration of the override and the telephone number at which the user can be reached. |
| Hold my calls | Use this command to enable on the "do not disturb" option. The VA asks the user to specify the duration. |

When the VA asks for the duration of an override ("How long . . . ?"), the user can specify any of the following:

<x> hours (where x is a number from 1 through 96)

<y> minutes (where y is 15, 30, 45, or 90)

<x> hours,<y> minutes

All day

Forever

Until I tell you different

An override command expires when the specified duration has passed. The user can also cancel an override command at any time by saying "Put me on schedule." When an override command expires or is canceled, the user preference "follow me" settings are reinstated.

The user can command the VA to call to a contact from the user's Microsoft Outlook list by:

Saying "Call<contact name>" (for example, "Call John Smith").

Inquiring about the contact's telephone number (for example, "What is John Smith's work phone number"). The VA provides the requested number and then asks if the user wants to call it.

Before placing a call to a contact, the VA recites the contact's name and location and then remains silent or a short period. This period of silence allows the user to correct a mistake or cancel the call. If the contact has more than one telephone number, the VA asks which number to call. If the user has previously called a contact with more than one telephone number, the VA will automatically call the contact at the telephone number last used by the VA to call the contact. If no telephone number exists for the contact, the VA informs the user of this and returns to the main menu. If the contact's telephone number includes an extension, the VA reminds the user of the extension before placing the call. The VA determines whether the call is long distance or local and adjusts the number accordingly.

A user can command the VA to place a call to any telephone number from two to eleven digits long. To place a call to a telephone number, say "Call<phone number>" (for example, "Call 803-366-4509.") Before placing the call, the VA repeats the number and the user has a short period of time to correct any mistakes.

The user can instruct the VA to call back a person who left a voice mail message. The voice mail message should be the current message, that is, message the VA is listing or reading. To instruct the VA to call back, say "Give them a call." The VA should be able to determine the caller's telephone number. Either the caller should leave a number, or the VA should capture the number from which the call was placed. The VA informs the user if it cannot determine the caller's telephone number.

The VA uses the concept of a "conference room" to enable a user to make conference calls. If a user puts a call in the conference room, that person can hear and speak to all of the other parties in the conference room. If the user "goes private" with a line, none of the other parties on other private lines or in the conference room can hear the user. There are three ways a call can be placed in the conference room:

If the user is already talking to someone and accepts an incoming call without "going private," the new call is placed in the conference room.

If the user is talking to someone and asks the VA to call another party without "going private," the new call is placed in the conference room.

The user can instruct the VA to place a call or calls in the conference room.

The user can have both "private" and "conference room" calls active at the same time. The following table lists commands that the user can use to manage conference calls:

| Command | Description |
|---|---|
| Put line <x> in the conference room | Puts the specified line in the conference room |
| Put everyone in the conference room | Puts all of the user's current calls in the conference room |
| Put me in the conference room | Switches the user from a private call to the conference room. |
| Who is in the conference room? | Lists all calls that are in the conference room |

Managing A Schedule

A user can obtain a summary of appointments by saying "Summarize my appointments." The VA responds by asking for the date, in response to which the user can say "Today," "Tomorrow," or a specific date, for example, February 19th. When the user has provided the date, the VA recites the number of meetings, all day events, and appointments.

A user can browse his or her schedule by saying, "Browse my appointments." The VA responds by asking for the date. When the user provides the date, the VA recites the subject and start time for each appointment.

A user can request a list of all appointments by saying, "List my appointments" or "What are my appointments?" The VA responds by asking for the date. When the user has provided the date, the VA tells the user how many appointments he or she has and recites the start time, duration, and subject for each appointment.

A user can filter the appointment list by any of the following:

| Type of Filter | Example |
|---|---|
| Date (today or tomorrow) | List my appointments today |
| First or last | List my first appointment |
| Next or previous | List my next appointment |
| A combination of the other filters | List my first appointment today |

A user can request that the VA read all appointments by saying "Read my appointments." The VA tells the user how many appointments he or she has, and then reads the start time, duration and subject for each appointment.

A user can filter the appointments to be read by the same criteria that used to filter an appointment list:

| Type of Filter | Example |
| --- | --- |
| Date (today or tomorrow) | Read my appointments for today |
| First or last | Read my first appointment |
| Next or previous | Read my next appointment |
| A combination of the other filters | Read my first appointment tomorrow |

If a user needs more detailed information about an appointment than the VA provides by reading, the user can say, "Get more detail," and the VA responds by providing information regarding whether or not the appointment is recurring, attendees and location.

A user can respond to a meeting request by saying "Reply" or "Forward" while the VA is listing or reading it. When a user says, "Reply," the VA lists the options for replying to a meeting request, which are Accept, Tentatively accept, Decline, Forward and Reply.

When a user responds to a meeting request, the VA asks if the user wants to add an annotation. If a user accepts a meeting request, the VA deletes it from the Inbox and moves it to the Calendar folder. If the user chooses to forward a meeting request, the VA requests the name of the contact to whom the user is forwarding it.

A user can ask the VA to find free time in his or her schedule using the following commands:

Find free time (the VA will then ask the user to specify the date)

Find free time today

Find free time tomorrow

To add an appointment to a user's schedule, say, "Schedule an appointment." (The user can also specify "Today" or "Tomorrow" in the command; for example, "Schedule an appointment tomorrow.") The VA then asks the user to specify the following the duration of the appointment, date (if not specified in the original command), starting time and subject. The VA automatically checks free time when a user schedules an appointment.

The VA can remind a user of his or her appointments, by either telephone or pager or both. When notifying the user of a reminder by telephone, the VA plays a "whisper" tone. This tone is different from the "whisper" tone for an incoming call. The VA does not actually deliver the reminder until the user either completes or cancels the current function. When a user schedules an appointment, the VA uses the default reminder time specified for the Microsoft Outlook Calendar. In order for the VA to deliver reminders, the user should first set the correct notification options in the Microsoft Outlook VA user preferences. The option that controls reminder notification is notify me on reminders via on the VA Preferences Phone/Pager tab.

A user can delete an appointment by saying, "Delete this appointment" while the VA is describing or reading it.

A user can use the VA to deliver a wake-up call by creating an appointment with a reminder for the time the user wants to be awakened. To deliver wake-up calls the user should ensure that telephone reminders are enabled in the Microsoft Outlook user preferences.

A user can use the following commands to request the date and time:

What day is it?

What time is it?

If a user travels to a different time zone, the user can cause the VA adjust the time for e-mails, appointments, and tasks accordingly. To change time zone, say, "Change my time zone." The VA asks for the current local time, which it uses to compute the new time zone.

Managing Tasks

A user can use the VA to manage task information stored in the Outlook Tasks folder. A user can do any of the following with the VA:

Request task summary

Browse tasks

List tasks

Read tasks

Get more detail about a task

Create a task

Set reminders

Respond to a task request

Delete a task

Mark a task as complete

A user can receive task requests that other people send (task requests are treated as incoming messages by the VA). However, a user cannot use the VA to generate and send task requests.

A user can request a summary of tasks by saying, "What are my tasks?" The VA responds by telling the user how many tasks the user has that are due today, overdue, due in the future or have no due date.

A user can browse tasks by saying, "Browse my tasks." The VA responds by reading the subject and due date for each task, beginning with the first task.

A user can request a list of all tasks by saying, "List my tasks." The VA responds by telling the user how many tasks the user has, then reading the subject and due date for each task.

A user can filter the task list by any of the following:

| Type of Filter | Example |
| --- | --- |
| Category (future, due today, due tomorrow, overdue, no due date) | List my tasks due today |
| First or last | List my first task |
| Next or previous | List my next task |
| A combination of the other filters | List my first task due today |

A user can request that the VA read all tasks by saying, "Read my tasks." The VA tells the user how many tasks the user has, then reads the subject, date, whether a reminder has been set, and, if so, the reminder and time, and the body, for each task.

A user can filter the tasks to be read by the same criteria as a task list:

| Type of Filter | Example |
| --- | --- |
| Category (future, due today, due tomorrow, overdue, no due date) | Read my tasks due today |
| First or last | Read my first task |
| Next or previous | Read my next task |
| A combination of the other filters | Read my first task due today |

If a user needs more detailed information about a task than the VA provides by reading, the user can say, "Get more detail," and the VA responds by providing the information regarding subject, due date, person who assigned the task, whether a reminder has been set, start date, status, priority, and percent complete.

To create a new task, the user should say, "Create a task." The VA then asks the user to specify the task subject (description), due date, and whether the user wants a reminder.

A user can set a reminder so that the VA will remind the user of a task. A user can choose to be reminded either by telephone or by pager. The VA plays a "whisper" tone to notify the user of a reminder. This tone is different from the "whisper" tone for an incoming call. The VA does not actually deliver the reminder until the user either completes or cancels the current function. In order for the VA to deliver reminders, a user should first set the correct options in the Microsoft Outlook user preferences. The option that controls reminders is Notify me on reminders via on the VA Preferences Phone/Pager tab.

A user can respond to a task request by saying, "Reply" while the VA is listing or reading it. The VA then lists the following options: Reply or Forward.

When a user responds to a task request, the VA asks if the user wants to add an annotation. If a user chooses to forward a task request, the VA requests the name of the contact to whom the user is forwarding the task.

To delete a task, the user should say, "Delete this task." The task that user deletes should be the current task (that is, the task that the VA is listing or reading. The VA responds with "Deleting task . . . done." When a user attempts to delete a task request, the VA asks if the user wants to send a rejection message to the sender.

To mark a task as complete, the user should say, "Mark it as complete" while the VA is listing or reading the task. The VA responds with "Done. Task marked as complete."

Using the Telephone Keypad to Issue Commands

As an alternative to voice commands, the VA allows a user to use the telephone keypad to issue commands. To use this feature, the user should press a predetermined key, such as the star key (*), to enable a choice prompt mode. When the choice prompt mode is enabled, the VA prompts the user with the available choices. A user can then use the keypad to select the desired choice.

If conditions are favorable for speech recognition, for example, the user is in a quiet car, the user may elect to interact with the virtual assistant by speech. If, however, conditions are not favorable for accurate speech recognition, for example, there is background noise or signal quality on a wireless handset is low, the user may elect to enter a choice prompt mode, as described above. As mentioned above, the user could selectively enter choice prompt mode by pressing a predetermined key, such as the star key, on a telephone keypad.

Figure 37:
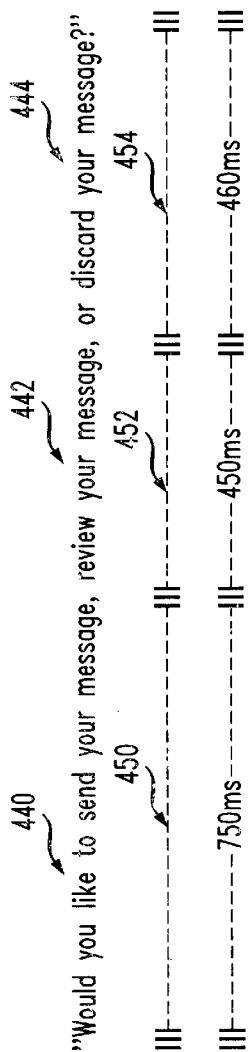
FIG. 37 is a diagram of a choice prompt stream with corresponding active segments.

A choice prompt is a prompt, that is, output, from the virtual assistant that prompts the user to indicate a choice or take some specific action. As shown in FIG. 37, the choice prompt is divided into active segments, which correspond to the choices that are selectable by the user. User input during a particular active segment indicates that the user desires to select the choice being provided during the active segment of the choice prompt. For example, as illustrated in FIG. 37, the choice prompts could be, "Would you like to send your message (prompt 1) 440, review your message (prompt 2) 442, or discard your message (prompt 3) 444?" The corresponding active segments are 450, 452 and 454, respectively. The user can depress a predetermined key on the telephone keypad, or speak a predetermined utterance, during the active segment that corresponds to the desired choice. Thus, by pressing the star key, or saying "Yes," while prompt 1 440 is being spoken would signify the user elected "send the message." Similarly, by pressing the star key, or saying "Yes," while prompt 2 442 is being spoken would signify the user has selected "review the message." Finally, by pressing the star key, or saying "Yes," while prompt 3 444 is being spoken would signify the user has selected "discard the message." It should be noted that saying "Yes" or pressing the star key would have no selective effect outside of the active window of the choice prompt stream.

Once in choice prompt mode, the virtual assistant could be configured to accept only DTMF input. In other words, voice input would not be possible because the speech recognition engine would not interpret spoken utterances. Similarly, the ability of a user to "barge in" would be disabled. Thus, no sounds, whether spoken or extraneous background noises, would interrupt the virtual assistant. The only acceptable input would be the predetermined DTMF.

Alternatively, a user could select to enter a choice prompt mode where only specific voice commands, such as "yes" and "no" would be interpreted by the speech recognition engine. The user could selectively exit choice prompt mode by pressing the star key again.

Alternatively, the virtual assistant could be configured to permit the user to exit the voice interface and enter the choice prompt mode to complete a specific task. Then, once the specific task is complete, the user would automatically exit the choice prompt mode and re-enter the voice use interface for further interaction with the virtual assistant by speech.

In an alternative embodiment, the default option is the first option recited by the VA. If the user knows that its intends to choose the default option, the user can press the star key twice (**), which enables the Star mode and chooses the default option in one step.

A user can use a combination of voice and keypad commands to perform a task.

The above description of the preferred embodiments detail many ways in which the present invention can provide its intended purposes. Programmers skilled in the art are able to produce workable computer programs to practice the teachings set forth above. While several preferred embodiments are described in detail hereinabove, it is apparent that various changes might be made without departing from the scope of the invention, which is set forth in the accompanying claims.

What is claimed is:

1. A computer based method for performing a first command via a voice user interface on information stored in a computer memory, wherein the information upon which the first command is to be performed is comprised of a subset of objects specified by the user, the subset being selected from a set of objects, wherein each object in the set of objects has an object type, at least one taggable field associated with the object type, and a corresponding value for the at least one taggable field, the method comprising the steps of:

(a) storing the set of objects in the computer memory;
 (b) receiving from the user via the voice user interface an utterance, the utterance being comprised of a first command, an object type selection, a taggable field selection, and a value for the selected taggable field;
 (c) responsive to the utterance, retrieving a subset of objects from the set of objects, the subset containing at least one object, the at least one object being of the object type selected by the user, having a value in the taggable field selection that matches the taggable field value received from the user;
 (d) performing the first command on the retrieved subset of objects; and
 (e) wherein the object type selected is comprised of text, converting the text to voice output, responsive to the first command.

2. The method of claim 1, wherein the object type is an email message.

3. The method of claim 2, wherein the taggable field for the email message type is selected from the group consisting of sender, delivery date, subject and status.

4. The method of claim 3, wherein the taggable field value for the status field is selected from the group consisting of first, last, new, old, read, unread, deleted and urgent.

5. The method of claim 1, wherein the first command is selected from the group consisting of count, browse, list and read.

6. The method of claim 1, wherein the object type is a contact.

7. The method of claim 6, wherein the taggable field is selected from the group consisting of first name, last name and nickname.

8. The method of claim 6, wherein the first command is selected from the group consisting of count, browse, list and read.

9. The method of claim 1, further including the step of:
   (a) receiving a second command from the user, the second command to be performed on an active object in the subset of objects, the at least one active object being the object upon which the first command was performed;
   (b) performing the second command on the active object; and
   (c) wherein the object type selected is comprised of text, converting the text to voice output, responsive to the second command.

10. The method of claim 9, wherein the second command is selected from the group consisting of next, previous, first, last, read, get more detail, file, delete and restore.

11. A computer readable medium containing instructions for controlling a computer system to perform a first command via a voice user interface on information stored in a computer memory, wherein the information upon which the first command is to be performed is comprised of a subset of objects specified by the user, the subset being selected from a set of objects, wherein each object in the set of objects has an object type, at least one taggable field associated with the object type, and a corresponding value for the at least one taggable field, by:
   (a) storing the set of objects in the computer memory;
   (b) receiving from the user via the voice user interface an utterance, the utterance being comprised of a first command, an object type selection, a taggable field selection, and a value for the selected taggable field;
   (c) responsive to the utterance, retrieving a subset of objects from the set of objects, the subset containing at least one object, the at least one object being of the object type selected by the user, having a value in the taggable field selection that matches the taggable field value received from the user;
   (d) performing the first command on the retrieved subset of objects; and
   (e) wherein the object type selected is comprised of text, converting the text to voice output, responsive to the first command.

12. A computer readable medium containing instructions for controlling a computer system to perform a first command via a voice user interface on information stored in a computer memory, wherein the information upon which the first command is to be performed is comprised of a subset of objects specified by the user, the subset being selected from a set of objects, wherein each object in the set of objects has an object type, at least one taggable field associated with the object type, and a corresponding value for the at least one taggable field, by:
   (a) storing the set of objects in the computer memory;
   (b) receiving from the user via the voice user interface an utterance, the utterance being comprised of a first command, an object type section, a taggable field selection, and a value for the selected taggable field;
   (c) responsive to the utterance, retrieving a subset of objects from the set of objects, the subset containing at least one object, the at least one object being of the object type selected by the user, having a value in the taggable field selection that matches the taggable field value received from the user;
   (d) performing the first command on the retrieved subset of objects;
   (e) wherein the object type selected is comprised of text, converting the text to voice output, responsive to the first command;
   (f) receiving a second command from the user, the second command to be performed on an active object in the subset of objects, the at least one active object being the object upon which the first command was performed;
   (g) performing the second command on the active object; and
   (h) wherein the object type selected is comprised of text, converting the text to voice output, responsive to the second command.

* * * * *